US011985214B2

(12) United States Patent
Seemann et al.

(10) Patent No.: US 11,985,214 B2
(45) Date of Patent: *May 14, 2024

(54) UNIVERSAL PROTOCOL TRANSLATOR

(71) Applicant: Resolution Products, LLC, St. Paul, MN (US)

(72) Inventors: Brian K. Seemann, Lakeville, MN (US); David J. Mayne, Eagan, MN (US); Paul G. Saldin, Stillwater, MN (US); Daniel Mondor, Somerset, WI (US); Joshua Hauser, New Brighton, MN (US)

(73) Assignee: Resolution Products, LLC, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,380

(22) Filed: Jul. 11, 2022

(65) Prior Publication Data

US 2022/0345548 A1     Oct. 27, 2022

Related U.S. Application Data

(63) Continuation of application No. 16/725,597, filed on Dec. 23, 2019, now Pat. No. 11,388,266, which is a
(Continued)

(51) Int. Cl.
*H04L 69/08*     (2022.01)
*H04L 12/12*     (2006.01)
*H04W 52/02*     (2009.01)

(52) U.S. Cl.
CPC .............. *H04L 69/08* (2013.01); *H04L 12/12* (2013.01); *H04W 52/02* (2013.01); *Y02D 30/70* (2020.08)

(58) Field of Classification Search
CPC . G05B 2219/2614; H04L 12/12; H04L 67/12; H04L 69/08; Y02D 70/1224;
(Continued)

(56) References Cited

U.S. PATENT DOCUMENTS 4,855,713 A    8/1989   Brunius
5,686,885 A    11/1997   Bergman
(Continued)

FOREIGN PATENT DOCUMENTS

CA          2509884       5/2004
CN         101362575      2/2009
(Continued)

OTHER PUBLICATIONS

ADEMCO 5800RP RF Repeater Module, Installation and Setup Guide, Jun. 2002, 4 pgs.
(Continued)

*Primary Examiner* — Eric Nowlin
(74) *Attorney, Agent, or Firm* — Barnes & Thornburg LLP

(57) ABSTRACT

In one implementation, a universal translator device for translating protocols, the device includes one or more peripheral device interfaces through which communication from one or more peripheral devices is received using any of a plurality of protocols; a protocol translator that is (i) preconfigured with translation mappings to translate between each possible permutation of the plurality of protocols and (ii) programmed to translate, using the translation mappings, signals received from the peripheral devices into at least one target protocol; and a wireless interface that is configured to transmit wireless signals in the target protocol, the wireless signals having been translated into the target protocol by the protocol translator.

19 Claims, 34 Drawing Sheets

Related U.S. Application Data continuation of application No. 15/473,521, filed on Mar. 29, 2017, now Pat. No. 10,516,765.

(60) Provisional application No. 62/314,976, filed on Mar. 29, 2016.

(58) Field of Classification Search
CPC .. Y02D 70/142; Y02D 70/144; Y02D 70/162; Y02D 70/164; Y02D 70/26
See application file for complete search history.

(56) References Cited

U.S. PATENT DOCUMENTS

| | | |
|---|---|---|
| 5,686,896 A | 11/1997 | Bergman |
| 5,761,206 A | 6/1998 | Kackman |
| 5,801,626 A | 9/1998 | Addy |
| 5,894,478 A | 4/1999 | Barzegar et al. |
| 6,247,062 B1 | 6/2001 | Arkar et al. |
| 6,437,692 B1 | 8/2002 | Petitie |
| 6,624,750 B1 | 9/2003 | Mannan et al. |
| 6,678,535 B1 | 1/2004 | Narayanaswami |
| 6,832,251 B1 | 12/2004 | Gelvin et al. |
| 6,987,450 B2 | 1/2006 | Marino et al. |
| 7,020,701 B1 | 3/2006 | Gelvin et al. |
| 7,030,752 B2 | 4/2006 | Tyroler |
| 7,119,658 B2 | 10/2006 | Stilp |
| 7,120,795 B2 | 10/2006 | Raphael et al. |
| 7,468,661 B2 | 12/2008 | Petitie et al. |
| 7,576,646 B2 | 8/2009 | Hayden et al. |
| 7,587,221 B2 | 9/2009 | Mishina et al. |
| 7,804,403 B2 | 9/2010 | Chantelou et al. |
| 7,839,280 B2 | 11/2010 | Peters et al. |
| 8,160,574 B1 | 4/2012 | Nelson |
| 8,209,400 B2 | 6/2012 | Baum et al. |
| 8,279,810 B1 | 10/2012 | Li et al. |
| 8,456,278 B1 | 6/2013 | Bergman et al. |
| 8,537,855 B2 | 9/2013 | Wieslawa |
| 8,693,481 B2 | 4/2014 | Matsumoto et al. |
| 8,730,844 B2 | 5/2014 | Johnson et al. |
| 8,966,235 B2 * | 2/2015 | Dicks ...................... G06F 8/61 |
| | | 713/2 |
| 9,311,793 B2 | 4/2016 | Lohbihler |
| 9,467,863 B2 | 10/2016 | Kaushik |
| 9,532,094 B2 * | 12/2016 | Karp ................. H04N 21/4431 |
| 9,584,227 B2 * | 2/2017 | Wiley ..................... H04L 69/08 |
| 9,621,656 B2 * | 4/2017 | Fukui ..................... H04L 67/12 |
| 9,622,103 B2 | 4/2017 | Suzuki et al. |
| 9,755,894 B2 * | 9/2017 | Matthieu ............ H04L 41/0806 |
| 9,760,363 B2 * | 9/2017 | Dicks ..................... G06F 8/65 |
| 9,788,039 B2 * | 10/2017 | Karp ................. G08B 13/1672 |
| 9,800,611 B2 | 10/2017 | Kaushik |
| 9,853,826 B2 * | 12/2017 | Shuman ............. H04L 12/2809 |
| 9,874,858 B2 * | 1/2018 | Emerson ................ H04L 69/08 |
| 9,967,343 B2 * | 5/2018 | Kim ..................... G06F 9/5061 |
| 9,990,363 B2 * | 6/2018 | Gade ..................... G06F 16/148 |
| 10,003,654 B2 | 6/2018 | Chen et al. |
| 10,037,685 B2 | 7/2018 | Martin |
| 10,057,384 B2 * | 8/2018 | Endo ..................... H04L 69/08 |
| 10,089,610 B2 | 10/2018 | Chow et al. |
| 10,102,738 B2 * | 10/2018 | Tung .................. G08B 21/0423 |
| 10,126,809 B2 | 11/2018 | Wendel |
| 10,256,987 B2 * | 4/2019 | Lee ........................ H04L 69/18 |
| 10,257,783 B2 | 4/2019 | Qi et al. |
| 10,282,227 B2 | 5/2019 | Lueh et al. |
| 10,298,723 B2 * | 5/2019 | Shon ...................... H04L 69/08 |
| 10,389,553 B2 * | 8/2019 | Nelsen ................... H04L 67/12 |
| 10,432,704 B2 * | 10/2019 | Jolfaei ................. H04L 67/565 |
| 10,462,844 B2 | 10/2019 | Yeo et al. |
| 10,528,927 B2 | 1/2020 | Chow et al. |
| 10,743,192 B2 | 8/2020 | Hwang et al. |
| 10,791,177 B2 * | 9/2020 | Moustafa ............. H04L 67/125 |
| 10,911,515 B2 | 2/2021 | Biasi et al. |
| 11,115,510 B1 * | 9/2021 | Abdul-Gaffoor ...... H01Q 21/08 |
| 11,146,416 B2 * | 10/2021 | Li .......................... H04L 69/08 |
| 11,283,908 B1 * | 3/2022 | Zhao ..................... H01Q 1/243 |
| 11,388,266 B2 * | 7/2022 | Seemann ................ H04L 69/08 |
| 11,424,029 B2 * | 8/2022 | Biasi ....................... H04L 67/02 |
| 11,622,031 B2 * | 4/2023 | Zhao ..................... H01Q 1/242 |
| | | 455/552.1 |
| 11,627,186 B2 * | 4/2023 | Schechter ............. H04L 67/12 |
| | | 709/202 |
| 2001/0010490 A1 | 8/2001 | Bellin |
| 2002/0125998 A1 | 9/2002 | Petitie |
| 2003/0147420 A1 | 8/2003 | Beckwith |
| 2003/0158954 A1 | 8/2003 | Williams |
| 2004/0083128 A1 * | 4/2004 | Buckingham ........... H04L 9/40 |
| | | 709/223 |
| 2004/0123149 A1 * | 6/2004 | Tyroler ................... G06F 21/82 |
| | | 709/230 |
| 2004/0212500 A1 | 10/2004 | Stilp |
| 2004/0213172 A1 | 10/2004 | Myers et al. |
| 2005/0063416 A1 | 3/2005 | Shin |
| 2006/0052099 A1 * | 3/2006 | Parker ................. H04W 80/045 |
| | | 455/426.1 |
| 2006/0082220 A1 | 4/2006 | Karam et al. |
| 2006/0092010 A1 | 5/2006 | Simon et al. |
| 2006/0181406 A1 | 8/2006 | Petitie et al. |
| 2006/0190458 A1 | 8/2006 | Mishina et al. |
| 2006/0215692 A1 * | 9/2006 | Yang ................... H04L 61/5038 |
| | | 370/466 |
| 2007/0110092 A1 | 5/2007 | Kangude |
| 2007/0210917 A1 | 9/2007 | Collins et al. |
| 2008/0201503 A1 | 8/2008 | McKim et al. |
| 2009/0077622 A1 | 3/2009 | Baum et al. |
| 2009/0077624 A1 | 3/2009 | Baum et al. |
| 2010/0165957 A1 | 7/2010 | Hedge et al. |
| 2010/0318627 A1 | 12/2010 | Edwards et al. |
| 2011/0001605 A1 | 1/2011 | Kiani et al. |
| 2011/0004694 A1 | 1/2011 | Taylor |
| 2011/0050461 A1 | 3/2011 | Pixley et al. |
| 2011/0179405 A1 * | 7/2011 | Dicks ..................... G16H 40/40 |
| | | 717/168 |
| 2011/0255445 A1 | 10/2011 | Johnson et al. |
| 2012/0044954 A1 | 2/2012 | Matsumoto et al. |
| 2012/0057196 A1 | 3/2012 | Kamei |
| 2012/0109340 A1 | 5/2012 | Vezza et al. |
| 2012/0214477 A1 | 8/2012 | Wieslawa |
| 2013/0033379 A1 | 2/2013 | Jentoft |
| 2013/0099922 A1 | 4/2013 | Lohbihler |
| 2013/0132032 A1 | 5/2013 | Mckeown |
| 2013/0265158 A1 | 10/2013 | Bergman |
| 2013/0311140 A1 * | 11/2013 | Schechter ........... H04W 80/085 |
| | | 702/188 |
| 2013/0317753 A1 | 11/2013 | Kamen et al. |
| 2014/0241354 A1 * | 8/2014 | Shuman ................... H04W 4/08 |
| | | 370/390 |
| 2015/0142965 A1 * | 5/2015 | Fukui ..................... H04L 67/12 |
| | | 709/224 |
| 2015/0154364 A1 | 6/2015 | Biasi et al. |
| 2015/0169314 A1 * | 6/2015 | Dicks ...................... G06F 8/61 |
| | | 713/2 |
| 2015/0201022 A1 * | 7/2015 | Kim .................... H04W 12/068 |
| | | 709/203 |
| 2015/0229705 A1 * | 8/2015 | Suzuki ................... H04L 67/12 |
| | | 709/217 |
| 2015/0358432 A1 * | 12/2015 | Endo ..................... H04L 69/08 |
| | | 370/466 |
| 2016/0057004 A1 * | 2/2016 | Ge ........................ H04W 4/70 |
| | | 370/254 |
| 2016/0072670 A1 * | 3/2016 | Matthieu ................ H04L 69/18 |
| | | 709/204 |
| 2016/0093198 A1 * | 3/2016 | Tung .................. G08B 21/0423 |
| | | 340/539.11 |
| 2016/0100039 A1 * | 4/2016 | Shon ................... H04L 12/2803 |
| | | 370/467 |
| 2016/0112878 A1 | 4/2016 | Kaushik |
| 2016/0134932 A1 * | 5/2016 | Karp ..................... H04L 67/125 |
| | | 348/207.11 |
| 2016/0139574 A1 | 5/2016 | Lee et al. |
| 2016/0142758 A1 * | 5/2016 | Karp ...................... G08B 17/10 |
| | | 725/25 |

(56) References Cited

U.S. PATENT DOCUMENTS

| | | | |
|---|---|---|---|
| 2016/0211985 A1 | 7/2016 | Castillo et al. | |
| 2016/0277948 A1 | 9/2016 | Yeo et al. | |
| 2016/0277955 A1 | 9/2016 | Suzuki et al. | |
| 2017/0019186 A1* | 1/2017 | Wiley | H04B 10/801 |
| 2017/0026408 A1 | 1/2017 | Kaushik | |
| 2017/0064045 A1* | 3/2017 | Pai | H04W 4/70 |
| 2017/0142653 A1 | 5/2017 | Qi et al. | |
| 2017/0237633 A1 | 8/2017 | Hegde et al. | |
| 2017/0279874 A1* | 9/2017 | Jolfaei | H04L 67/565 |
| 2017/0280394 A1 | 9/2017 | Kim et al. | |
| 2017/0284691 A1 | 10/2017 | Sinha et al. | |
| 2017/0289317 A1 | 10/2017 | Seeman et al. | |
| 2017/0374490 A1* | 12/2017 | Schoppmeier | H04L 67/12 |
| 2018/0069895 A1 | 3/2018 | Kaushik | |
| 2018/0091506 A1 | 3/2018 | Chow et al. | |
| 2018/0097886 A1* | 4/2018 | Inoue | G06F 16/438 |
| 2018/0115612 A1 | 4/2018 | Chen et al. | |
| 2018/0130339 A1 | 5/2018 | Dziwirek et al. | |
| 2018/0295535 A1 | 10/2018 | Kavas et al. | |
| 2018/0351763 A1 | 12/2018 | Ock et al. | |
| 2018/0352443 A1 | 12/2018 | Hwang et al. | |
| 2018/0367617 A1* | 12/2018 | Moustafa | H04L 43/04 |
| 2019/0011283 A1 | 1/2019 | Souter et al. | |
| 2019/0026710 A1 | 1/2019 | Chow et al. | |
| 2019/0045033 A1 | 2/2019 | Agerstam et al. | |
| 2020/0374611 A1* | 11/2020 | Kim | H04R 1/021 |
| 2022/0256019 A1* | 8/2022 | Zhao | H01Q 1/523 |
| 2022/0391654 A1* | 12/2022 | Forster | G06K 19/0724 |
| 2023/0353555 A1* | 11/2023 | Kim | G16Y 30/10 |

FOREIGN PATENT DOCUMENTS

| | | | | |
|---|---|---|---|---|
| CN | 202696650 | | 1/2013 | |
| CN | 105005215 | | 10/2015 | |
| CN | 105075185 A | * | 11/2015 | H04L 12/2803 |
| CN | 105261175 | | 1/2016 | |
| CN | 106155009 | | 11/2016 | |
| CN | 207037357 | | 2/2018 | |
| CN | 103945017 | | 9/2018 | |
| CN | 105075185 B | * | 11/2018 | H04L 12/2803 |
| CN | 113824474 A | * | 12/2021 | H04B 7/0404 |
| CN | 114915675 A | * | 8/2022 | H01Q 1/125 |
| DE | 102021113772 A1 | * | 12/2021 | H04B 7/0404 |
| DE | 102022100940 A1 | * | 8/2022 | H01Q 1/125 |
| EP | 1648125 | | 4/2006 | |
| EP | 2277111 | | 1/2011 | |
| EP | 2420936 | | 2/2012 | |
| EP | 2874068 A1 | * | 5/2015 | G06F 8/61 |
| EP | 2874068 B1 | * | 11/2017 | G06F 8/61 |
| GB | 2596644 A | * | 1/2022 | H04B 7/0404 |
| GB | 2603646 A | * | 8/2022 | H01Q 1/125 |
| JP | 5194074 | | 5/2013 | |
| JP | 2016515328 A | * | 5/2016 | |
| KR | 20140008667 A | * | 1/2014 | |
| KR | 101392868 B1 | * | 5/2014 | |
| KR | 20150122199 A | * | 10/2015 | |
| KR | 102281737 | | 7/2021 | |
| WO | WO 2004043030 | | 5/2004 | |
| WO | WO 2009124054 | | 10/2009 | |
| WO | WO-2014010784 A1 | * | 1/2014 | G06F 8/61 |
| WO | WO-2014131038 A1 | * | 8/2014 | H04L 12/2803 |

OTHER PUBLICATIONS

ADEMCO 5800RP, Data Sheet, Apr. 2003, 1 pg.

European Search Report in Application No. 17776599.7, dated Oct. 14, 2019, 15 pages.

GE 600-1025 OEM Transceiver Module, Installation Instructions, May 2005, 2 pgs.

GE ID Repeater Daughter Board 600-1031, Installation Instructions, Apr. 2005, 4 pgs.

GE Interlogix QuikBridge Node repeater, Installation Instructions, Jul. 24, 2003, 8 pgs.

International Search Report and Written Opinion in International Application No. PCT/US17/24856, dated Aug. 11, 2017.

Invitation to Pay Additional Fees and, Where Applicable, Protest Fee in Application No. PCT/US17/24856, dated Jun. 8, 2017, 2 pages.

ITI SX-V to Learn Mode Translator, Installation Instructions, Nov. 30, 2001, 4 pgs.

OEM Transceiver Module with Crystal Transmitter 600-1046-95, Installation Instructions, Feb. 2006, 2 pgs.

\* cited by examiner

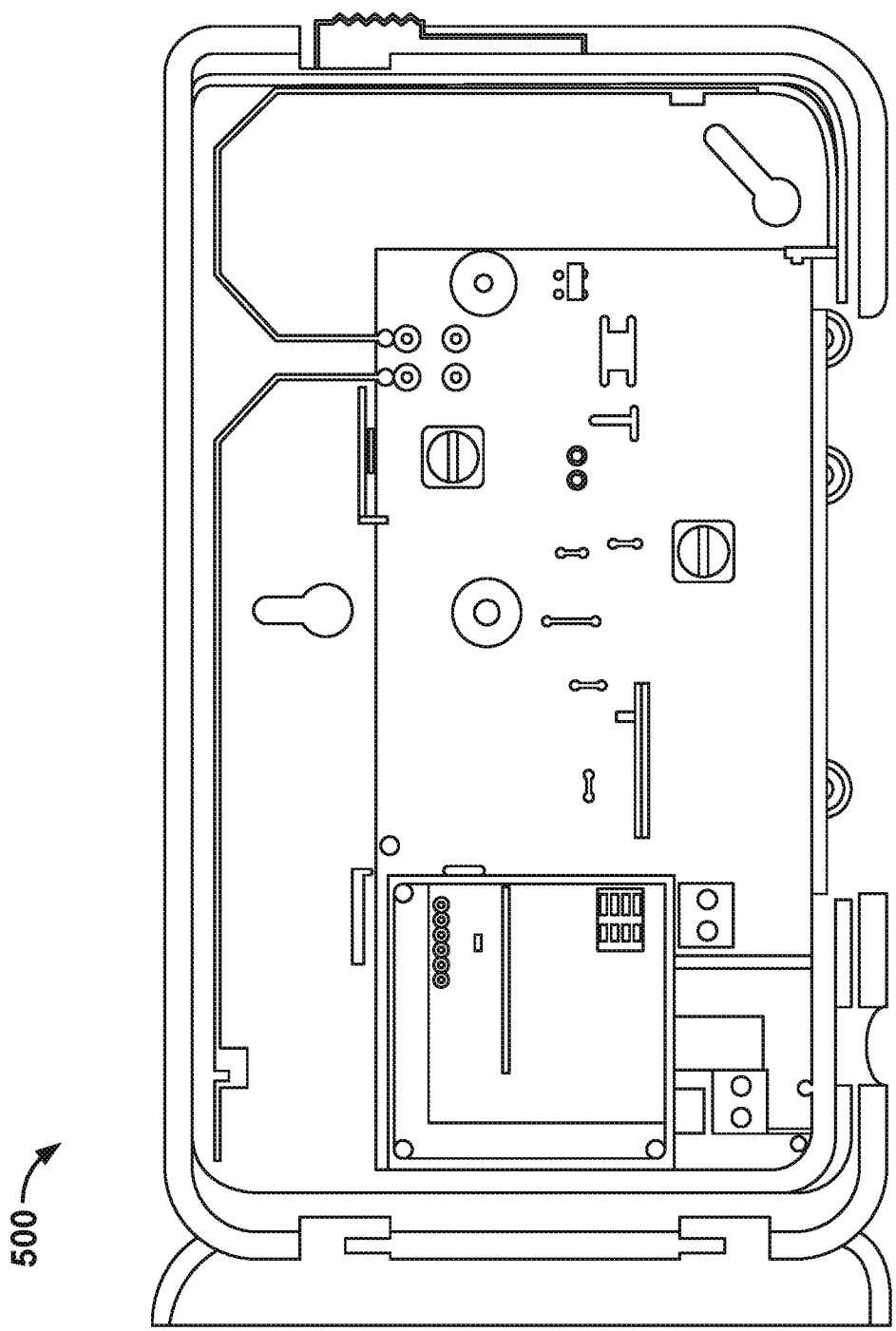

PACKET PROTOCOL #1

| BIT NOS. | NUMBER OF BITS | NAME / FUNCTION |
|---|---|---|
| B0-B14 | 15 | 1 PRE-START BIT AND 14 SYNCHRONIZATION BITS |
| B15 | 1 | START BIT |
| B16-B39 | 24 | UNIQUE IDENTIFY CODE FOR SENSOR (DEVICE ID) |
| B40 | 1 | PIN 1 (SENSOR STATE INFORMATION) |
| B41 | 1 | PIN 2 (SENSOR STATE INFORMATION) |
| B42 | 1 | PIN 3 (SENSOR STATE INFORMATION) |
| B43 | 1 | PIN 4 (SENSOR STATE INFORMATION) |
| B44 | 1 | LOW BATTERY |
| B45 | 1 | SUPERVISORY |
| B46 | 1 | POWER-UP |
| B47 | 1 | SUPERVISORY SIGNAL CAPABILITY |
| B48-B63 | 16 | CYCLICAL REDUNDANCY CHECK (CRC) FOR ERROR CHECKING |

FIG. 13B

| PACKET PROTOCOL #2 ||||
|---|---|---|---|
| BIT NOS. | NUMBER OF BITS | NAME / FUNCTION ||
| B0-B14 | 15 | SYNCHRONIZATION BITS ||
| B15 | 1 | START BIT ||
| B16-B35 | 20 | UNIQUE IDENTIFY CODE FOR SENSOR (DEVICE ID) ||
| B36-B39 | 4 | DEVICE TYPE ||
| B40-B42 | 3 | PACKET COUNT BITS ||
| B43 | 1 | SENSOR STATE INFORMATION | LOW BATTERY |
| B44 | 1 | | F1 STATE |
| B45 | 1 | | F1 LATCH |
| B46 | 1 | | F2 STATE |
| B47 | 1 | | F2 LATCH |
| B48 | 1 | | F3 STATE |
| B49 | 1 | | F3 LATCH |
| B50 | 1 | | F4 STATE |
| B51 | 1 | | F4 LATCH |
| B52 | 1 | | F5 POSITIVE LATCH |
| B53 | 1 | | F5 STATE |
| B54 | 1 | | F5 NEGATIVE LATCH |
| B55-B57 | 8 | PARITY BITS FOR ERROR CHECKING ||
| B58 | 1 | STOP BIT ||

FIG. 13C

UNIVERSAL PROTOCOL TRANSLATOR

CROSS-REFERENCE TO RELATED APPLICATIONS

This application is a continuation of U.S. application Ser. No. 16/725,597, filed Dec. 23, 2019, and is a continuation of U.S. application Ser. No. 15/473,521, filed Mar. 29, 2017, which claims the benefit of priority to U.S. Provisional Application Ser. No. 62/314,976, filed Mar. 29, 2016, all entitled UNIVERSAL PROTOCOL TRANSLATOR, the entire contents of which are hereby incorporated by reference.

TECHNICAL FIELD

This specification generally relates to a protocol translator to translate wired and/or wireless transmissions between protocols.

BACKGROUND

In the developing connected and secure home, the services layer can garner value from the multitude of information coming from the multitude of sensors pre-existing in homes, buildings, and other locations. For example, at present, many homes include multiple different sensors that transmit information about one or more components/systems within the homes, such as information indicating whether doors/windows are open or closed, motion sensor information, alarm status information, environmental information, and other information that sensors are capable of detecting. A large portion of installed sensors are wireless—meaning that they transmit at least some information wirelessly using one or more wireless protocols. The information from these sensors can have a variety of uses, such as being used to chart, classify and model consumer habits, initiate actions outside the home, automate devices and functions inside the home, and provide core security, life safety and home infrastructure monitoring and response.

To obtain and use information from wireless sensors, a wireless system can recognize, enroll, and configure wireless sensors into its system. For example, a wireless system can be configured to connect to particular types of sensors provided by particular manufacturers. Enrolling such sensors with this wireless system can include, for example, a user/installer manually connecting/identifying each sensor with the wireless system. Such a conventional wireless system may not be configured or readily capable of enrolling wireless sensors outside of those that the wireless system is preconfigured to use.

Enrolling sensors with a third-party wireless system (system not preconfigured to use or connect with particular sensors) can be a non-trivial operation. For instance, the wireless air can be considered one large, common channel over which all sensors are talking. Generally, an installer can enroll a sensor with a wireless system by causing a unique, uncommon transmission to be sent by the sensor, in order to ensure the correct sensor among many is being enrolled. Or, in another example, a unique identifier can be known for a sensor and entered into the wireless system. In a further example, installing old sensors with a wireless system (takeover installations of old sensors) can include the installer identifying the make, model and function of each old sensor, which can be time-consuming and can require a fair amount of installer expertise.

SUMMARY

This document generally describes systems, devices, computer program products, and techniques for translating transmissions between protocols. For example, universal translator devices are configured to receive transmission over various different protocols, to map the transmissions between protocols, and to retransmit the transmission using a different protocol. Such translator devices can, for instance, map each and every protocol into each and every other protocol. Translator devices can be configured to map and translate between various radio frequency (RF) frequencies and protocols, as well as hardwired contacts, such as mapping protocols between both wired and wireless sensors, and controllers, hubs, control panels, and/or other appropriate devices.

Such universal translators can be standalone devices or they can be incorporated as a component of a larger device or system, such as a unit that replaces a security system that may already exist at a premises (e.g., home, business or other location). For instance, such a unit can be a device that is able to interface with all existing zones within a premises, and other devices (e.g., sensors, systems) previously installed at the premises, while providing an interface through which a user is able to manage hardwired and wireless zones. For instance, universal translator devices can be used with and/or incorporated into other devices/systems so as to provide a panel that is easy to program and use with original equipment previously installed at a premises.

For instance, wireless and wired sensors (and other devices/systems) can be taken over using universal translator devices and made accessible, for example, to other devices/systems using a variety of techniques. For instance, auto detection of existing wireless sensors (and other wireless devices/systems) at a premises can be performed, such as through a device scanning for and selecting one or more proper RF frequencies and protocols that are being used at the premises. This can allow an installer to install existing sensors (and other devices/systems) without having to be specially trained in the identification of wireless sensor types. Similarly, hardwired sensors can be easily taken-over by simply hooking up existing hardwire cables to respective zones and having the zones in non-alarm states. This can, again, be accomplished without the installer needing to know the particular hardwired sensor types. A variety of details regarding each zone can be automatically determined, such as whether the zone is normally open or closed, what the end-of-line resistor is, or even if it exists. The installer will not have to do discovery on such details.

In both cases, the existing sensors (and other devices/systems) can be readily added to and used in the same manner as native sensors through universal translator devices, which can readily and automatically convert a multitude of different protocols into one or more specific protocols. To prevent tampering and subsequent takeover of device/system by competitors, the system can be "locked" upon completion of the installation by locking the device, which can include cutting a lock wire or other appropriate action. Locking actions can include, for example, removing another physical component, physically locking an access panel, or restricting access to an installation mode through a security setting, such as using a code or personal identification number (PIN). In some implementations, if a technician neglects to perform one of these locking steps, the system can automatically lock after a threshold period of time has elapsed during normal operation (e.g., locking after 12 hours, 24 hours, 5 days, 14 days, 30 days, or some other period of normal operation). In some implementations, the threshold period of time can depend on a type of location of the installation, such as having different threshold periods of time for home versus business installations. Locking can have the effect of fixing the current settings on a translator device/system so that they can no longer be changed or modified, including preventing the translator device/system from subsequently being reset (e.g., restored to factory default) or from enrolled sensors/devices being deleted from the system.

In one implementation, a device for translating protocols includes one or more peripheral device interfaces through which communication from one or more peripheral devices is received using any of a plurality of protocols; a protocol translator that is (i) preconfigured with translation mappings among the plurality of protocols and (ii) programmed to translate signals received from the peripheral devices into at least a target protocol used by a hub device; and a wireless interface that is configured to wirelessly transmit wireless signals in the target protocol to the hub device, the wireless signals having been translated into the target protocol by the protocol translator.

Such an implementation can optionally include one or more of the following features. The protocol translator can further be programmed to automatically discover one or more particular protocols and device types for the one or more peripheral devices based on signals that are communicated by the one or more peripheral devices. The signal communications by the one or more peripheral devices can be wireless signals transmitted by the one or more peripheral devices. The signal communications by the one or more peripheral devices can be wired signals transmitted over one or more hardwired connections between by the one or more peripheral devices and the protocol translator. The protocol translator can further include a first selector through which a user is able to designate one or more particular protocols and/or device types for the one or more peripheral devices. The protocol translator can further include a second selector through which a user is able to designate the target protocol. The protocol translator can further include a configuration lock mechanism through which a protocol mapping used between the one or more peripheral devices and the hub device is permanently locked. The configuration lock mechanism can be a wire that, when cut, permanently locks the protocol mapping. The protocol translator can be a universal translator device.

This document also generally describes systems, devices, computer program products, and techniques to allow for the vast majority of existing sensors to be serve-able, meaning they can be connected to by a wireless system. This can include connecting a wireless system with a sensor population that includes sensors from different manufacturers, using different protocols, doing different sensing functions, and being different operational models and vintages. Such a wireless system can automatically connect to a diverse sensor population like this without needing to be configured or programmed regarding the specifics of each sensor, but can instead learn such specifics by observing, evaluating, and analyzing wireless signals transmitted through the wireless space.

In one implementation, a method for detecting a configuration of wireless sensors within a vicinity includes detecting and evaluating wireless energies at the vicinity; identifying a plurality of wireless sensors from the wireless energies; determining wireless parameters and protocols for the plurality of wireless sensors; determining manufacturers for the plurality of wireless sensors based, at least in part, on the wireless parameters and protocols; differentiating between local sensors and neighbor sensors in the plurality of wireless sensors based on signal strengths and protocols for the plurality of wireless sensors; determining sensor identifiers and types for the local sensors; and determining locations where the local sensors are placed at the vicinity based, at least in part, on the sensor identifiers and types.

In one implementation, a universal translator device for translating protocols, the device includes one or more peripheral device interfaces through which communication from one or more peripheral devices is received using any of a plurality of protocols; a protocol translator that is (i) preconfigured with translation mappings to translate between each possible permutation of the plurality of protocols and (ii) programmed to translate, using the translation mappings, signals received from the peripheral devices into at least one target protocol; and a wireless interface that is configured to transmit wireless signals in the target protocol, the wireless signals having been translated into the target protocol by the protocol translator.

Such an implementation can optionally include one or more of the following features, including all possible combinations and sub-combinations thereof. The protocol translator can be further programmed to automatically discover one or more particular protocols and device types for the one or more peripheral devices based on signals that are communicated by the one or more peripheral devices and without explicit identification by a human operator of the one or more particular protocols or the device types. The signals communications by the one or more peripheral devices can be wireless signals transmitted by the one or more peripheral devices. The one or more protocols and the device types can be automatically discovered based on the wireless signal. The automatic discovery can include determining a configuration for the target protocol based on identified changes in particular bits in wireless packets transmitted over time by the one or more peripheral devices. The signals communicated by the one or more peripheral devices can be wired signals transmitted over one or more hardwired connections between by the one or more peripheral devices and the device. Configuration of the one or more hardwired connections can be automatically discovered based on the wired signals. The automatic discovery of the one or more protocols and the device types can include, at least, (i) automatically dropping power, by the device, to the one or more peripheral devices and (ii) identifying whether electrical behavior on the one or more wires of the one or more hardwired connections changes in response to the power being automatically dropped. The device can further include an external power source adapter to connect to an external power source for powering the device; and a backup battery to provide power to the device in the event that insufficient power is received from the external power source. The one or more peripheral devices can include at least (i) perimeter sensors that monitor breaches to a perimeter of the building, and (ii) internal sensors that monitor an internal environment within the building. The protocol translator can further programmed to, while external power source is not supplying power, (i) detect the charge condition of the backup battery for powering the device, and (ii) to automatically cut power to, at least, the internal sensors in response to identifying the charge condition. The device can further include a first selector through which a user is able to designate one or more particular protocols for the one or more peripheral devices; and a second selector through which a user is able to designate the target protocol. The device can further include a configuration lock mechanism through which a protocol mapping used between the one or more peripheral devices and the target protocol is permanently locked. The configuration lock mechanism can includes one or more of: a wire that, when cut, permanently locks the protocol mapping, and a timer that is automatically started when the device is initially programmed with the protocol mapping and that, when expired, permanently locks the protocol mapping. The device can further include a local repository of verified wireless characteristics of wireless signals transmitted by the one or more peripheral devices. The protocol translator can be programmed to perform an anti-spoofing check on wireless signals purported to be from the one or more peripheral devices before translating the signals using the translation mappings. The anti-spoofing check can include (i) identifying received wireless characteristics for the wireless signals purported to be from the one or more peripheral devices, (ii) comparing the received wireless characteristics to the verified wireless characteristics for the one or more peripheral devices, and (iii) blocking any wireless signals from being translated that have corresponding received wireless characteristics that do not correspond to the verified wireless characteristics for the one or more peripheral devices. In response to certain unique conditions of the device being powered down and then being powered back up, the protocol translator can automatically transition to operating in a configuration mode of operation, to further configure devices already enrolled (in the translator) for a period of time. The protocol translator can be further programmed to, while external power source is not supplying power, automatically restore power to the internal sensors, while still operating under the battery backup, in response to detecting that the perimeter sensors indicate that the perimeter of the building has been breached. Further in response to certain unique conditions of the device being powered down and then being powered back up, the protocol translator can automatically transition back to operating in a normal translation mode of operation after expiration of the period of time.

In one implementation, a universal wireless system translator is configured to receive wireless transmissions from wireless sensor-transmitters utilizing any of multiple different wireless transmission protocols, and communicate translated wireless sensor-transmissions to a control panel utilizing any of multiple different wireless transmission protocols; and utilizing an intermediate protocol in a process of translating a wireless transmission received from a sensor-transmitter in a first wireless transmission protocol to a wireless transmission sent to a control panel in a second wireless transmission protocol.

Such an implementation can optionally include one or more of the following features, including all possible combinations and sub-combinations thereof. The intermediate protocol can be a superset of the multiple different protocols.

In one implementation, a universal wireless system translator is configured to receive wireless transmissions from wireless sensor-transmitters utilizing any of multiple different wireless transmission protocols, and communicate translated wireless sensor-transmissions to a control panel utilizing any of multiple different wireless transmission protocols; and having a multiple channel buffering structure, wherein each channel of the multiple channel buffering structure is configured to store transmissions from one of a plurality of sensor-transmitters before translating a received wireless transmission from a sensor-transmitter in a first wireless transmission protocol to a wireless transmission to be sent to a control panel in a second wireless transmission protocol.

Such an implementation can optionally include one or more of the following features, including all possible combinations and sub-combinations thereof. Each channel can be configured to store multiple different states for one of the plurality of sensor-transmitters. The wireless transmission protocols can each be one-way protocols that use multiple duplicate transmissions to increase a probability of accurate receipt in view of possible collision with other wireless transmissions. The translator can be configured to determine whether a received wireless transmission from a sensor-transmitter already has previously stored message in a channel of the buffering structure with the same state as the received wireless transmission, and if so treat that received wireless transmission as a duplicate. The translator can be configured to translate and wireless transmit multiple duplicate wireless transmissions for each received wireless transmission stored in a channel of the buffer structure with a particular state. The translator can be processing a wireless transmission stored in a first channel of the buffer structure having a first state, the translator processes wireless transmissions stored in second and higher channels of the buffer structure even if the first channel requires more transmissions be sent for that first state or includes a second state, and cycles through the wireless transmissions stored in the buffer channels by transmitting packets alternately from each channel until all transmissions are sent.

In one implementations, a method of enrolling a multiple-input sensor-transmitter into a translator device that receives wireless transmissions from wireless sensor-transmitters utilizing a first wireless transmission protocol and communicates translated wireless sensor-transmissions to a control panel utilizing a second wireless transmission protocol, includes enrolling a multiple-input sensor-transmitter into a translator device using a wireless transmission in a first wireless transmission protocol sent from the multiple-input sensor-transmitter, wherein the first wireless transmission protocol includes multiple different fields each corresponding to one of multiple different sensor inputs for a multiple-input sensor-transmitter; and after enrollment of the multiple-input sensor-transmitter, the translator determining whether the multiple different fields in subsequent wireless transmissions include a state change, and if so further storing in the translator configuration information indicating which of the inputs of the multiple-input sensor is being utilized.

In one implementation, a method of configuring a wireless system including a control panel and one or more wireless sensor-transmitters includes placing an assistance device in a user selectable assist mode in which the assistance device is operable to assist in configuring a wireless sensor-transmitter into a control panel; receiving at the assistance device a first wireless transmission from a sensor-transmitter when the assistance device is placed in the user selectable assist mode; and upon receiving the first wireless transmission, transmitting, by the assistance device, subsequent wireless transmissions on behalf of the sensor-transmitter and for receipt by the control panel, the subsequent wireless transmissions having a predefined characteristic that causes a configuration process to be performed with respect to the sensor-transmitter in the control panel.

Such an implementation can optionally include one or more of the following features, including all possible combinations and sub-combinations thereof. A user selectable assist mode can be selected by having a normally closed cover of the assistance device open. The assistance device can be a translator. Different protocols can be received and transmitted from assistance device. The configuration process can be enrollment of sensor. The transmission to the control panel can be on-off sequence predefined for enrollment. The received transmission can be a transmission induced by a change in state of a sensor associated with the sensor-transmitter. The received transmission can be a special transmission predefined in a configuration process for the sensor-transmitter.

Certain implementations may provide one or more advantages. For example, a person installing a wireless system can connect to existing sensors and use their information without having to identifying the sensors' protocols, parameters, or functionality, and without having to configure the system to use them. Instead, the wireless system can automatically learn the wireless sensor environment in which it exists, which can make the information provided by the wireless sensors available without the technical hurdle of configuring the wireless system for each of the sensors. This can allow for installation expertise and training to be reduced, and for the value of existing sensors to be increased by making the data more widely and easily available.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

FIGS. 1A-D are example systems that incorporate universal translator devices to incorporate new and existing sensors/systems with a control device/system.

Figure 4A:
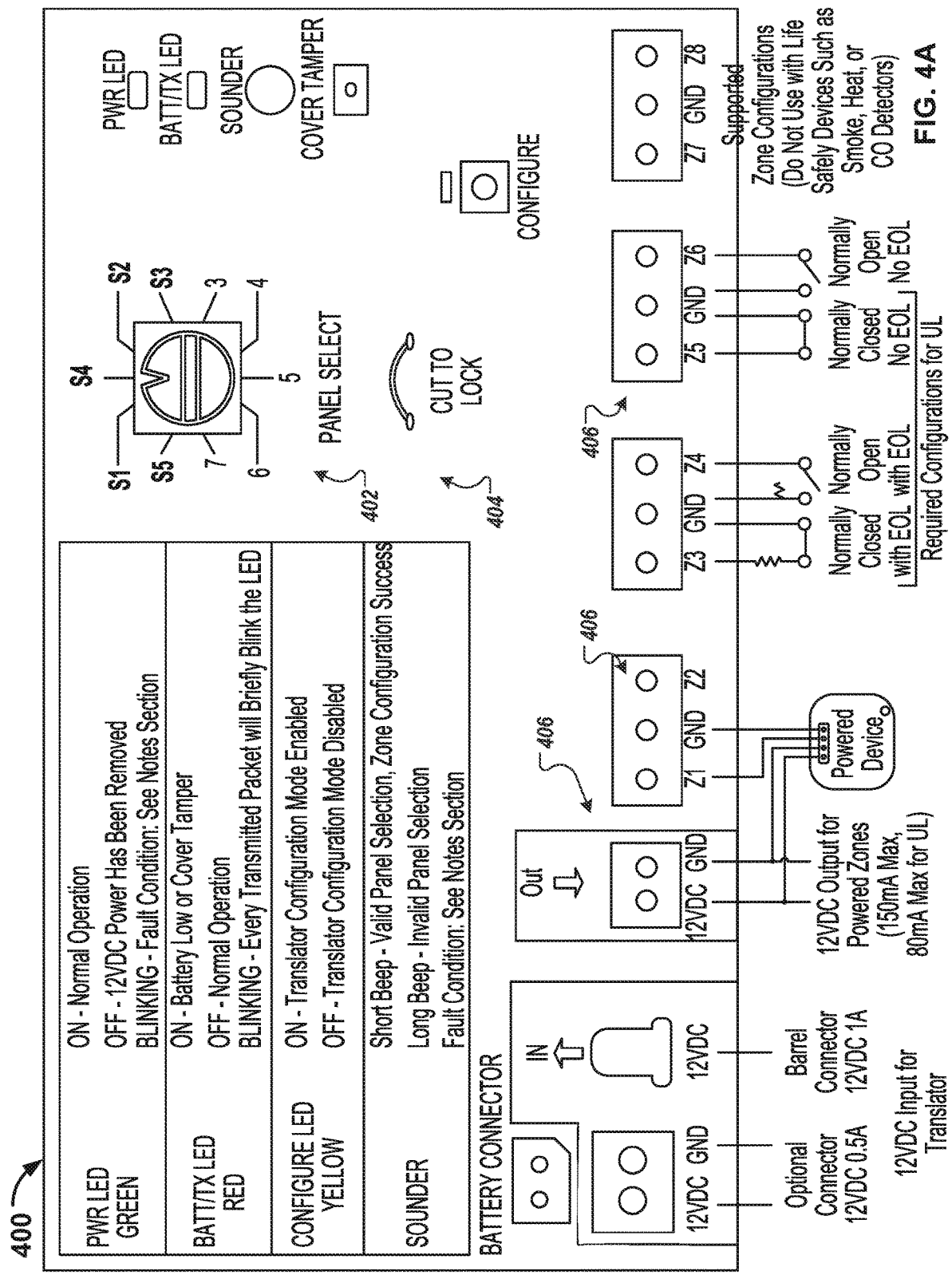
Figure 4B:
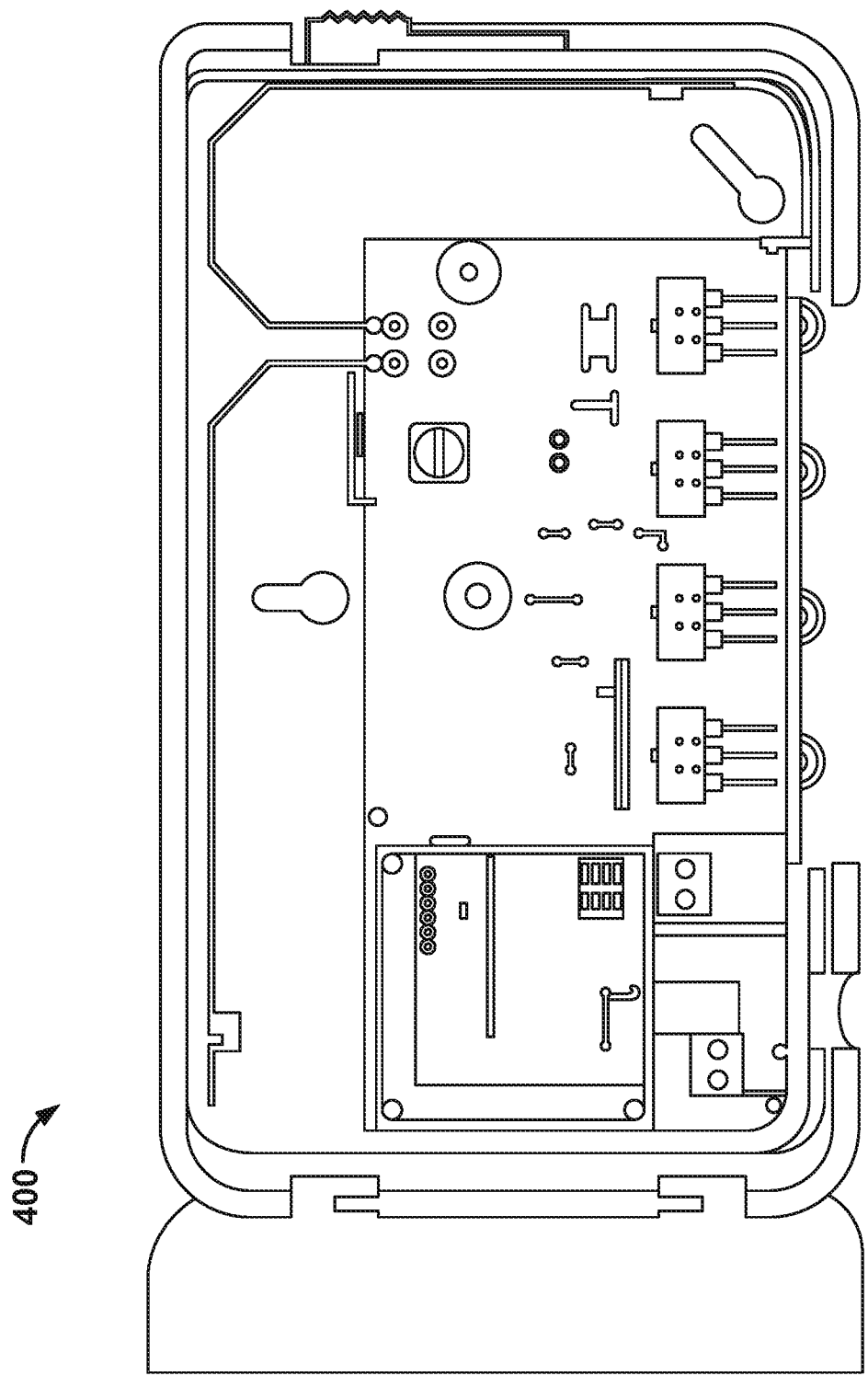

FIGS. 4A-B depict an example translator device.

Figure 4C:
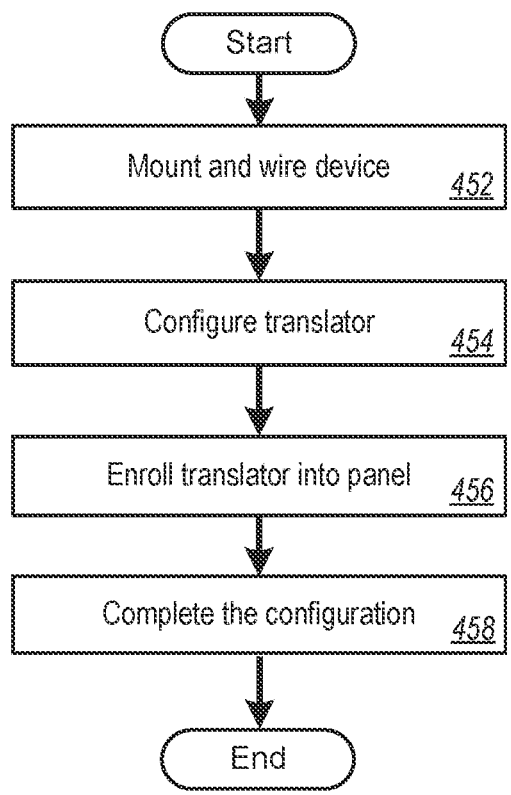

FIG. 4C is a flowchart of an example set-up process for setting up and configuring the device.

Figure 5A:
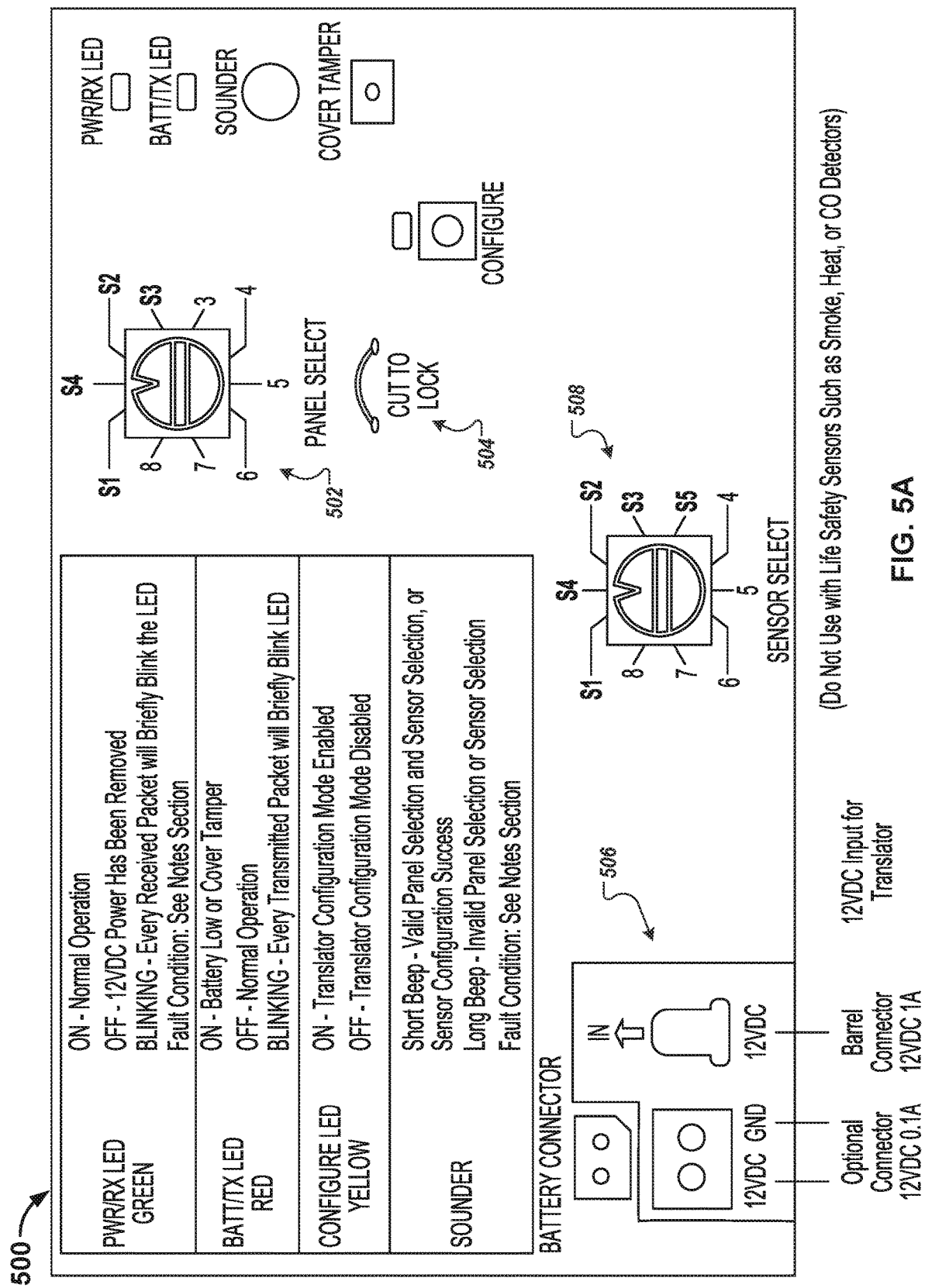

FIGS. 5A-B depict an example translator device.

Figure 6:
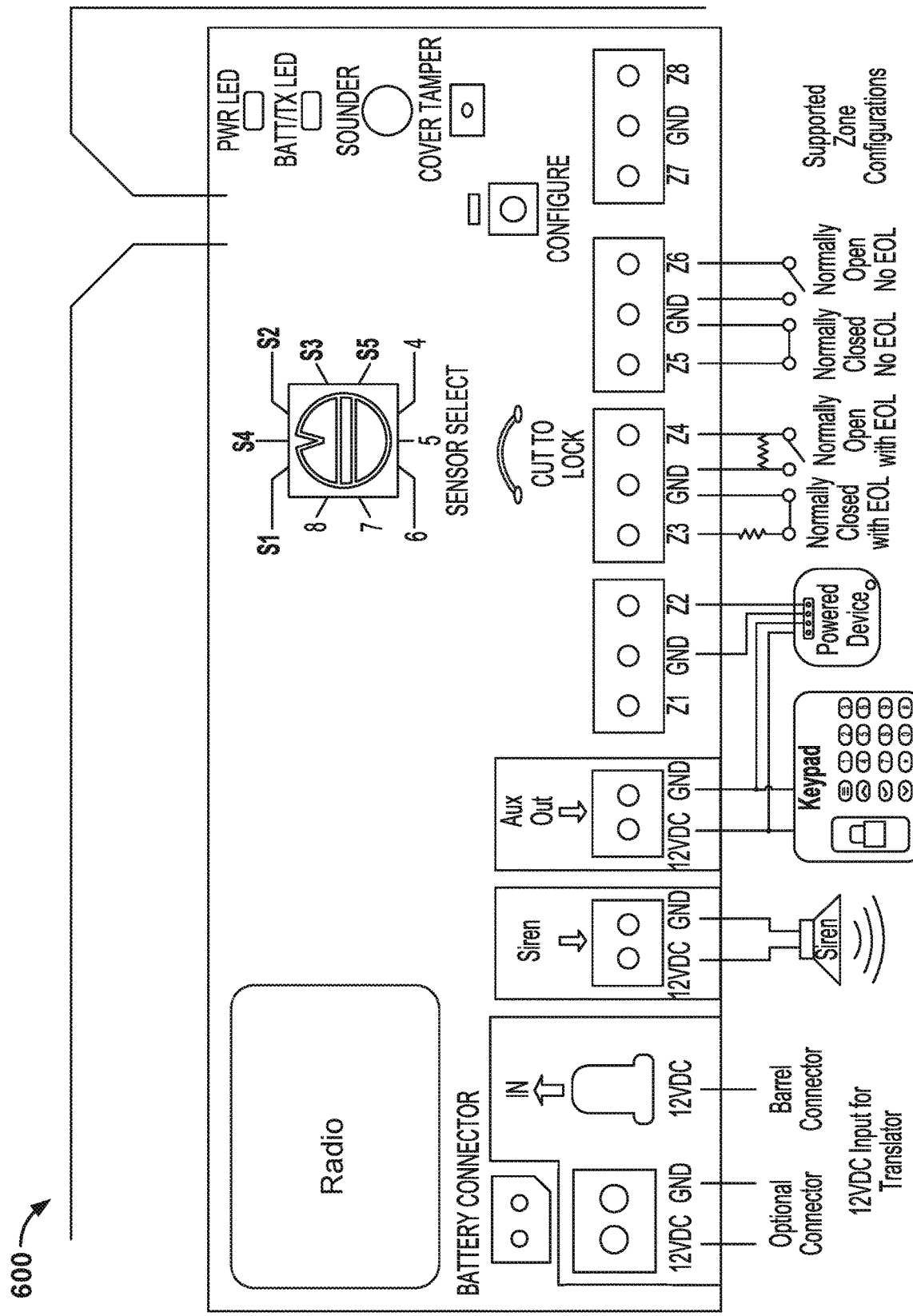

FIG. 6 depicts an example translator/replacement panel device.

Figure 7:
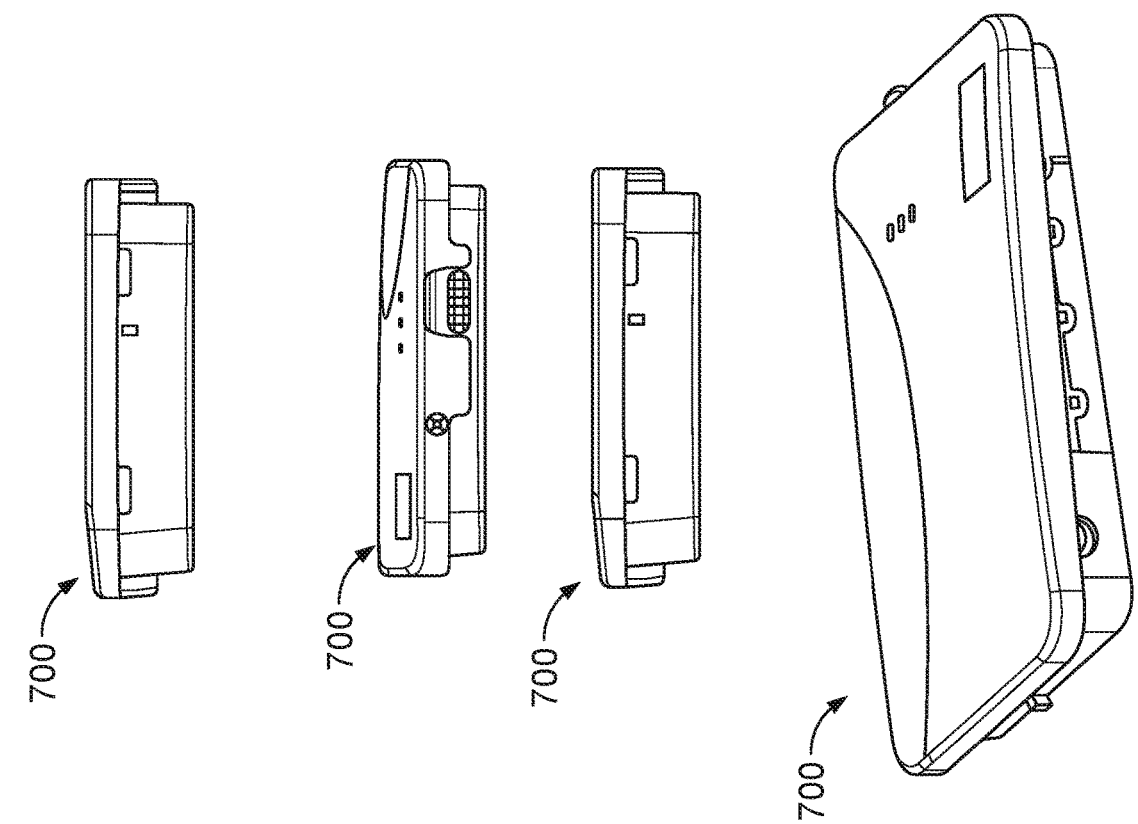
Figure 7:
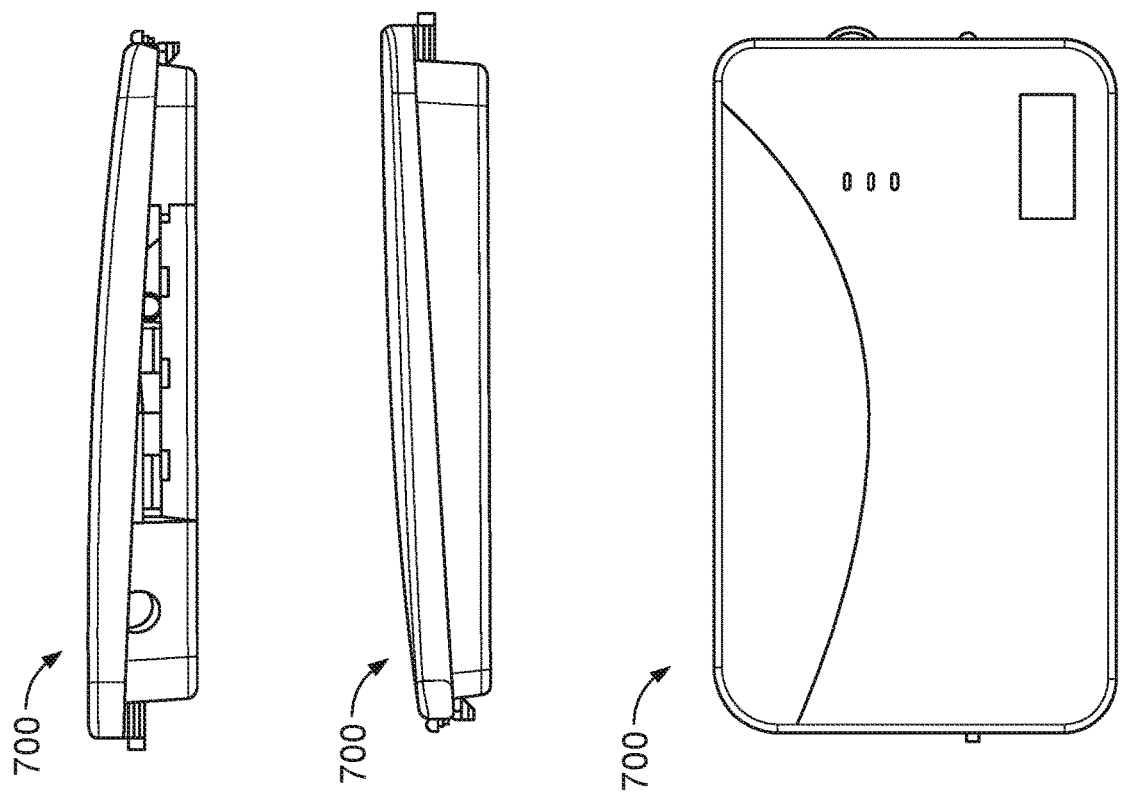

FIG. 7 depicts various views of an example device housing.

Figure 8:
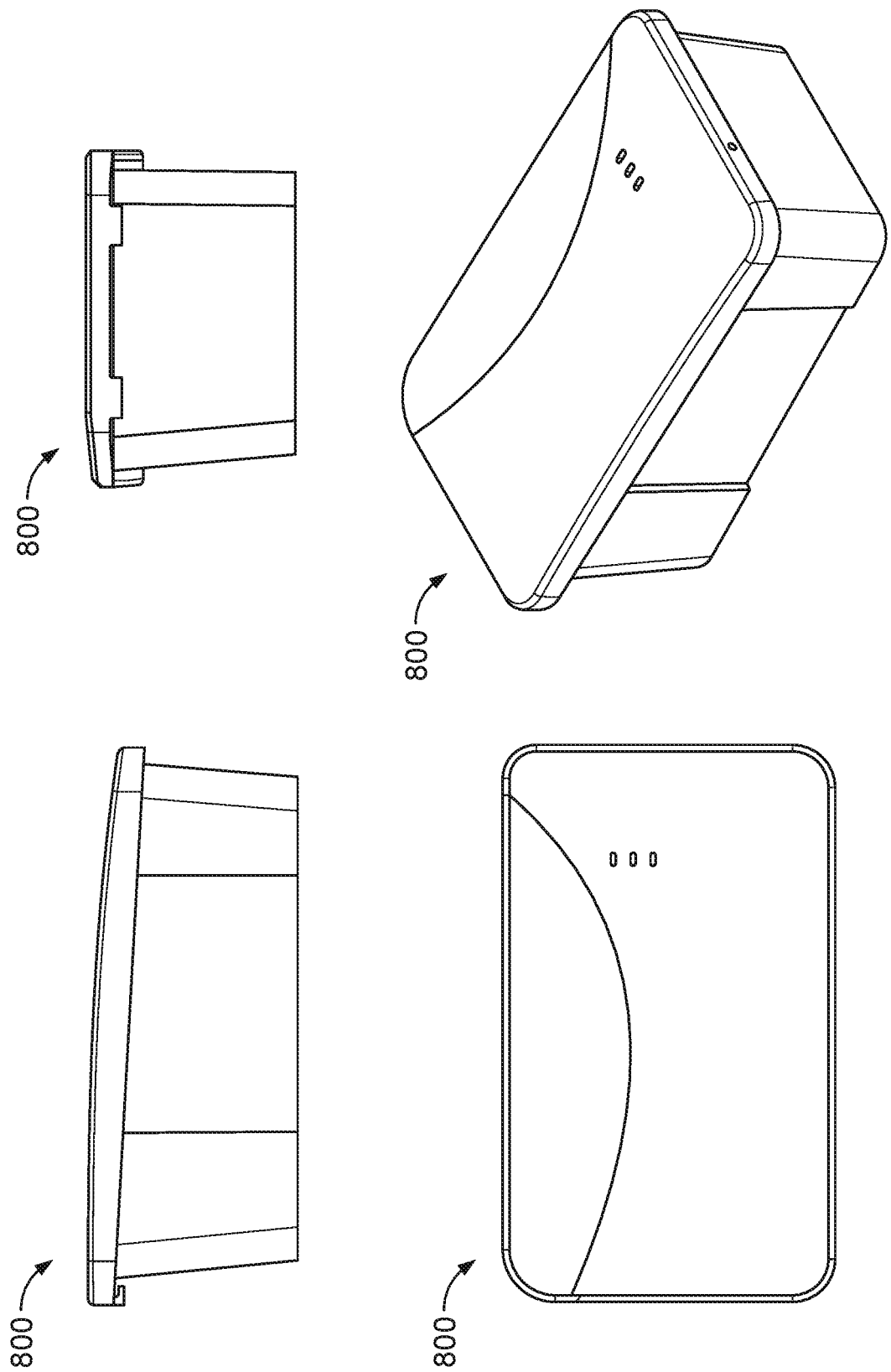

FIG. 8 depicts various views of an example device housing.

Figure 9:
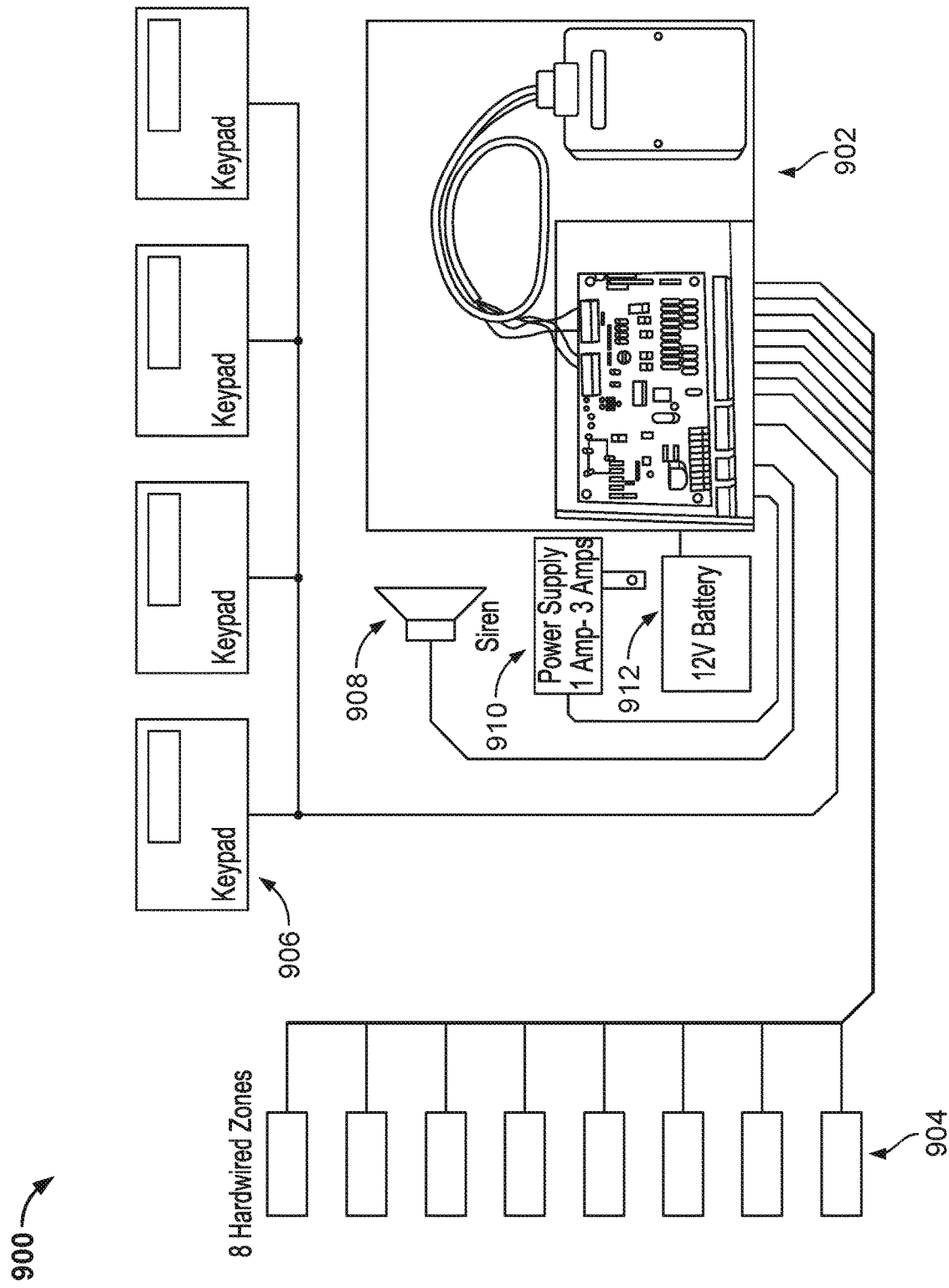

FIG. 9 depicts a system that includes an example device that is hard-wired to example zones and example keypads.

Figure 10A:
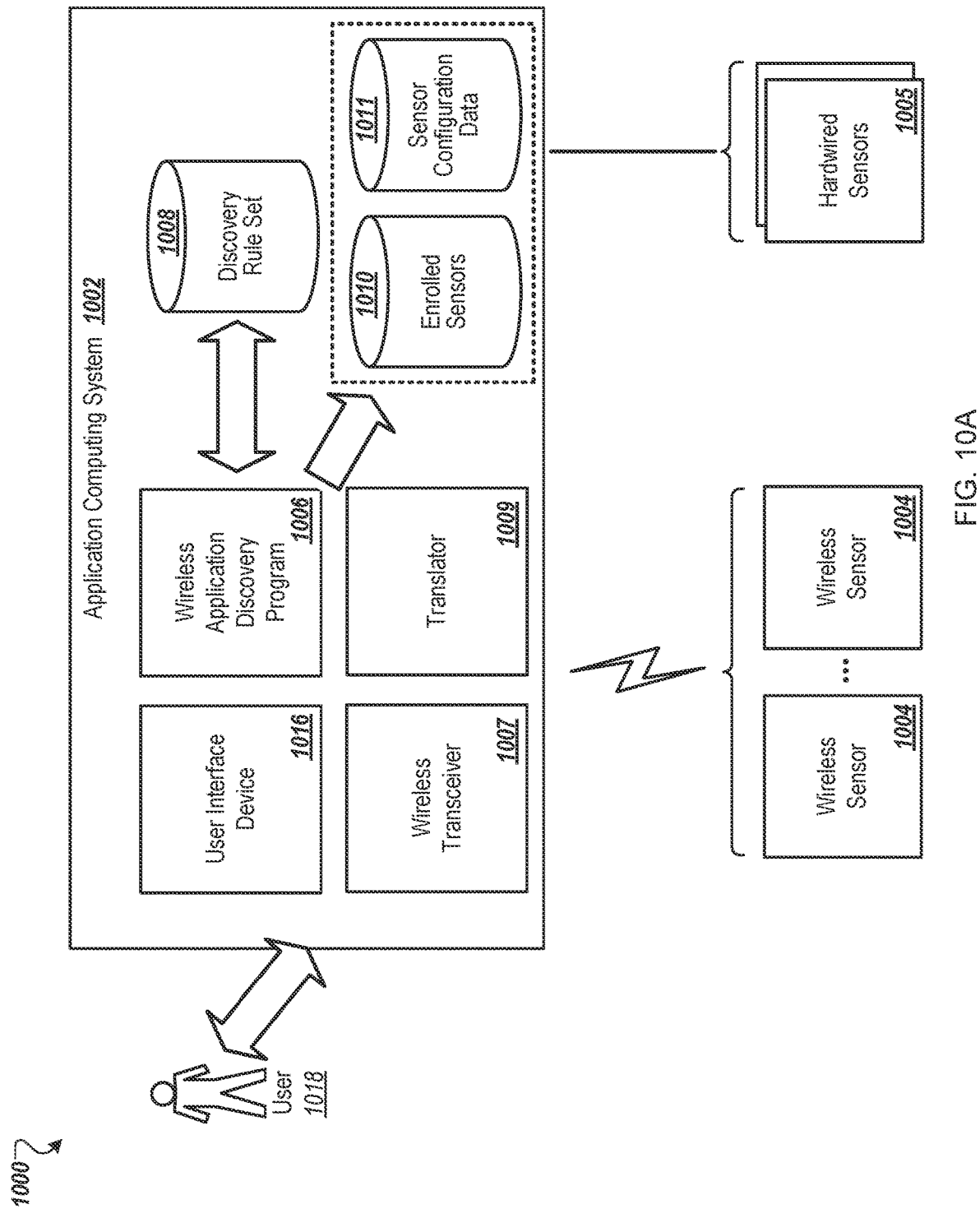

FIG. 10A is a block diagram of an example environment in which an application computing system discovers sensors.

Figure 10B:
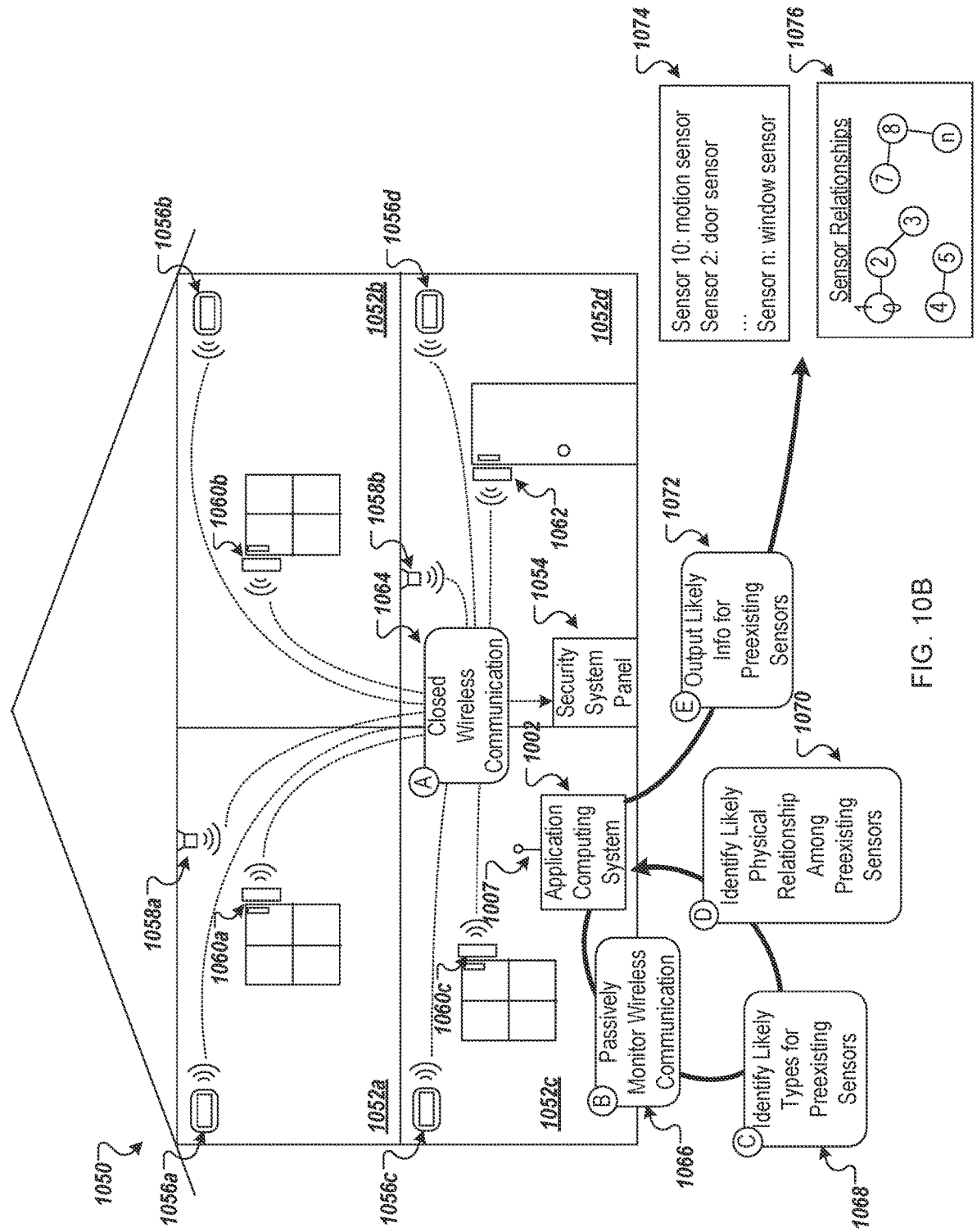
Figure 10C:
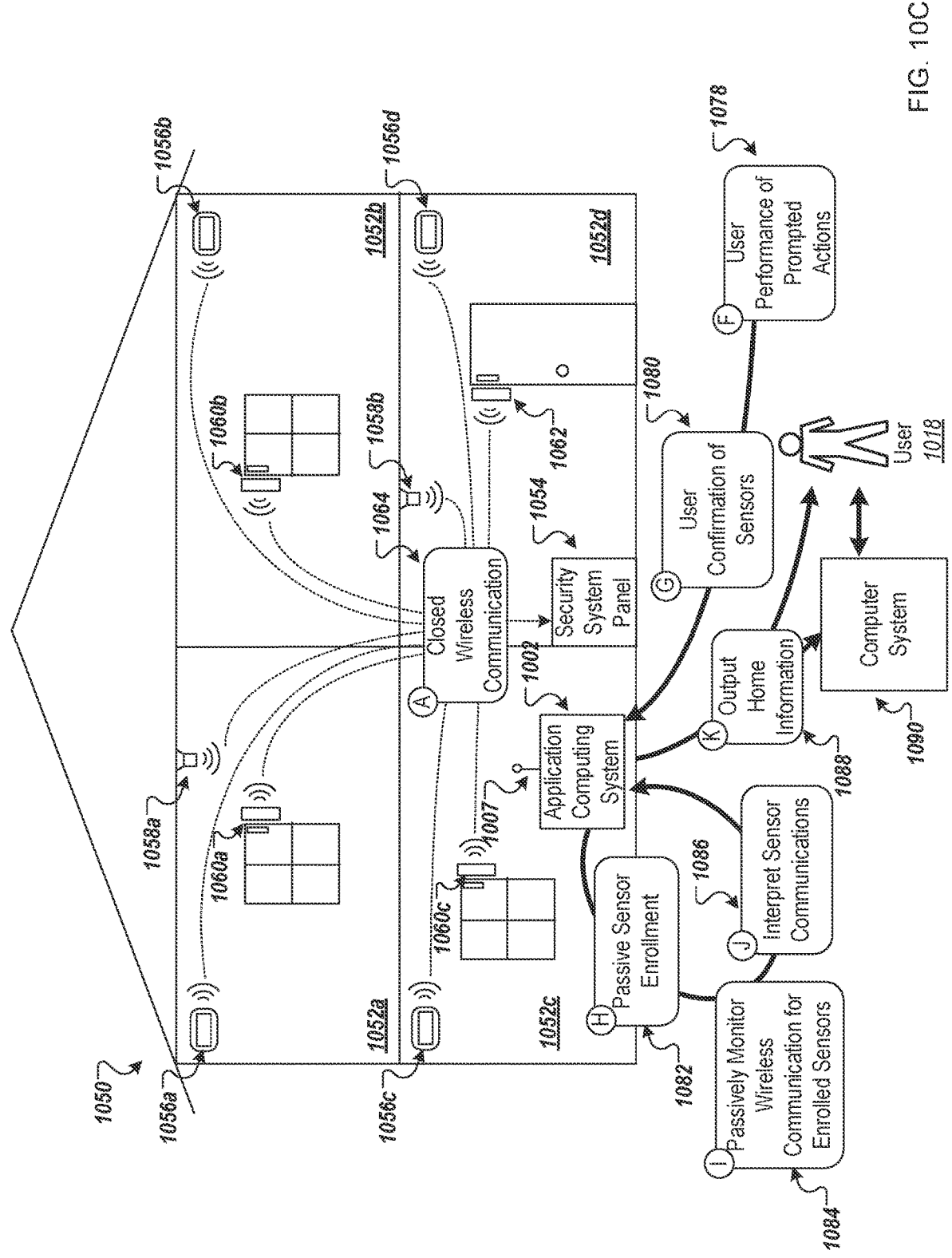

FIGS. 10B-C are conceptual diagrams of an example system passively detecting and enrolling various wireless sensors.

Figure 11:
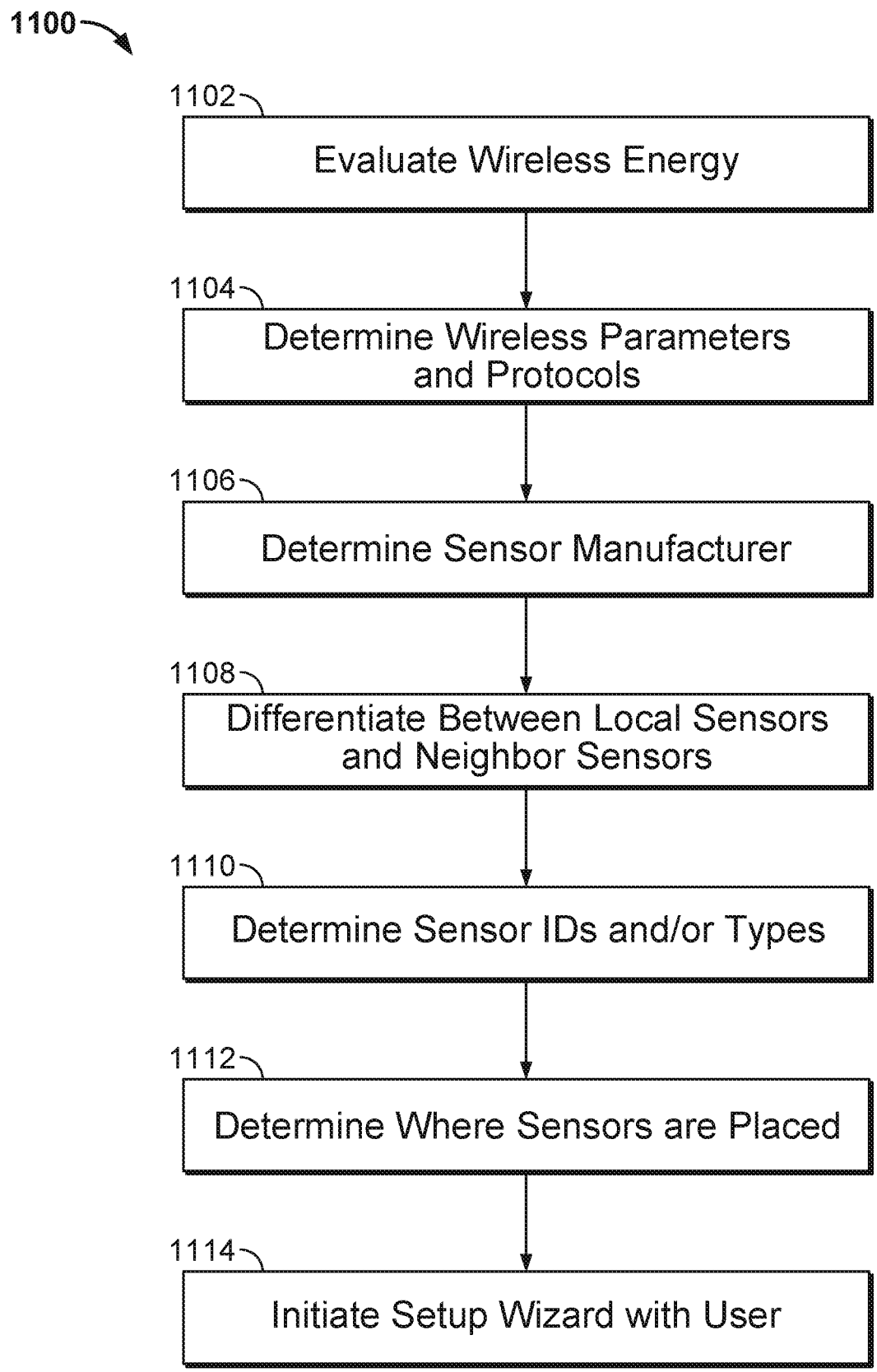

FIG. 11 is a flowchart of an example technique for automatically connecting a wireless system to sensors, such as existing sensors.

Figure 12:
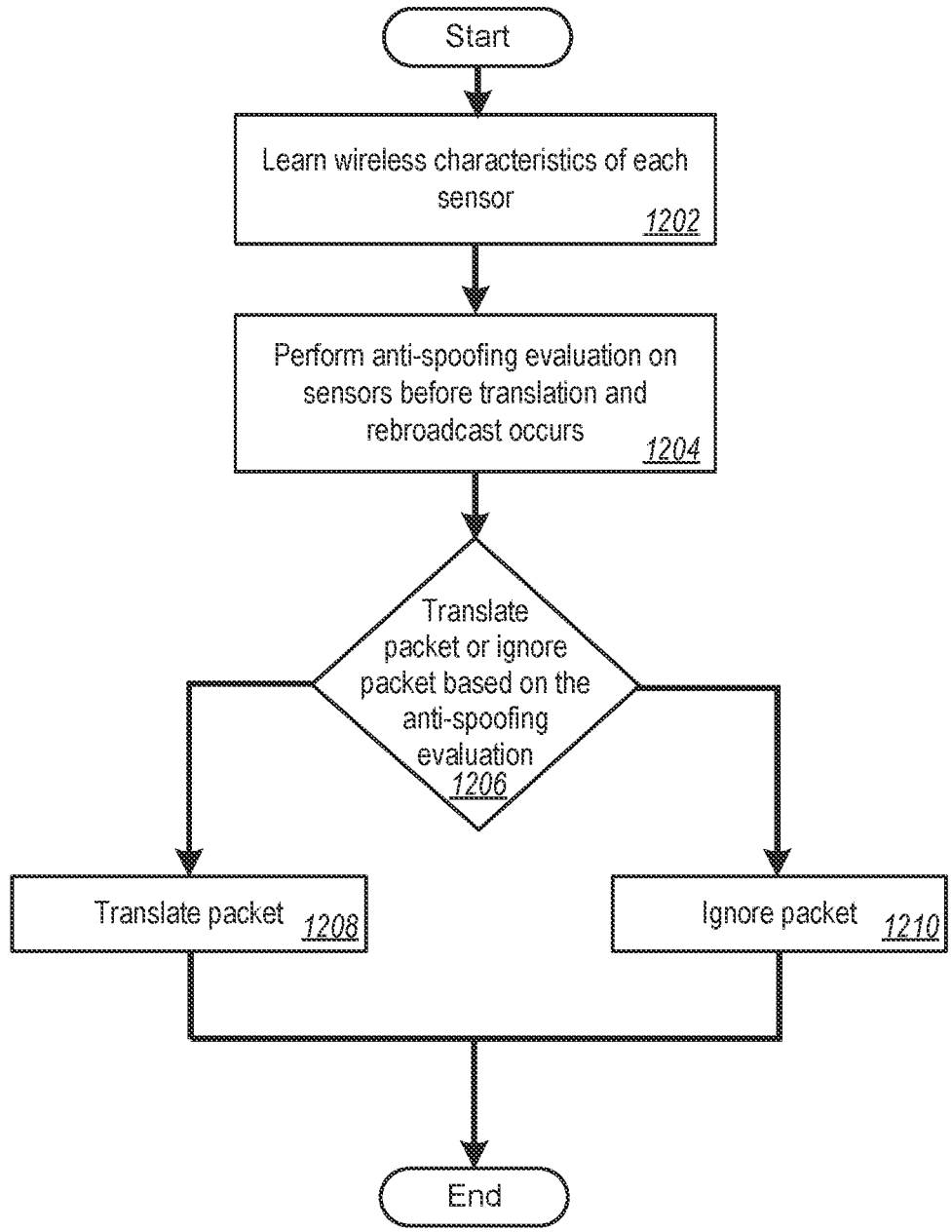

FIG. 12 is a flow chart of an example process for evaluating packets.

Figure 13A:
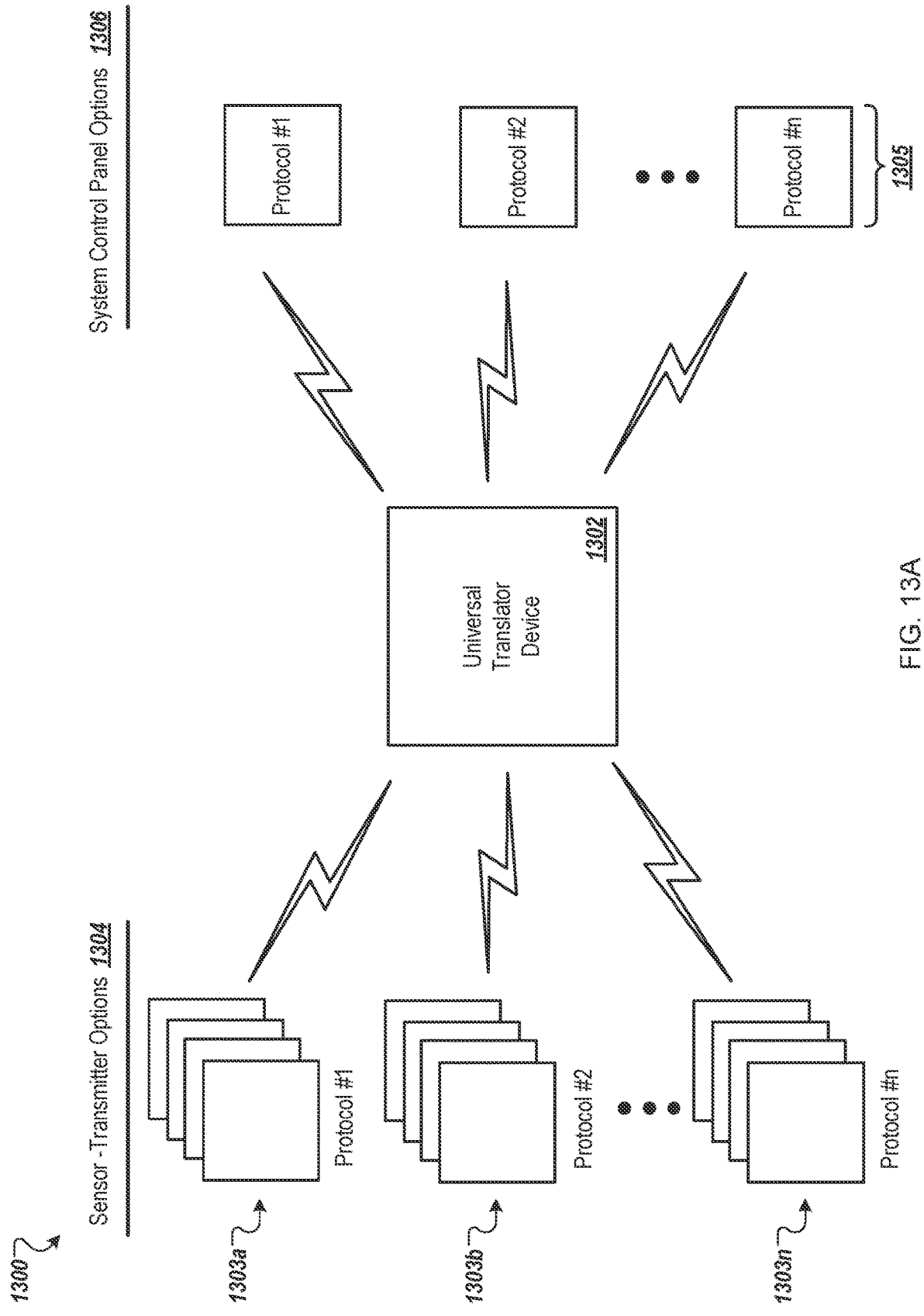

FIG. 13A is a block diagram of an example environment for translating protocol.

FIGS. 13B and 13C are charts that show two different example communication protocols that may be used for wireless communications in a wireless security systems.

Figure 14:
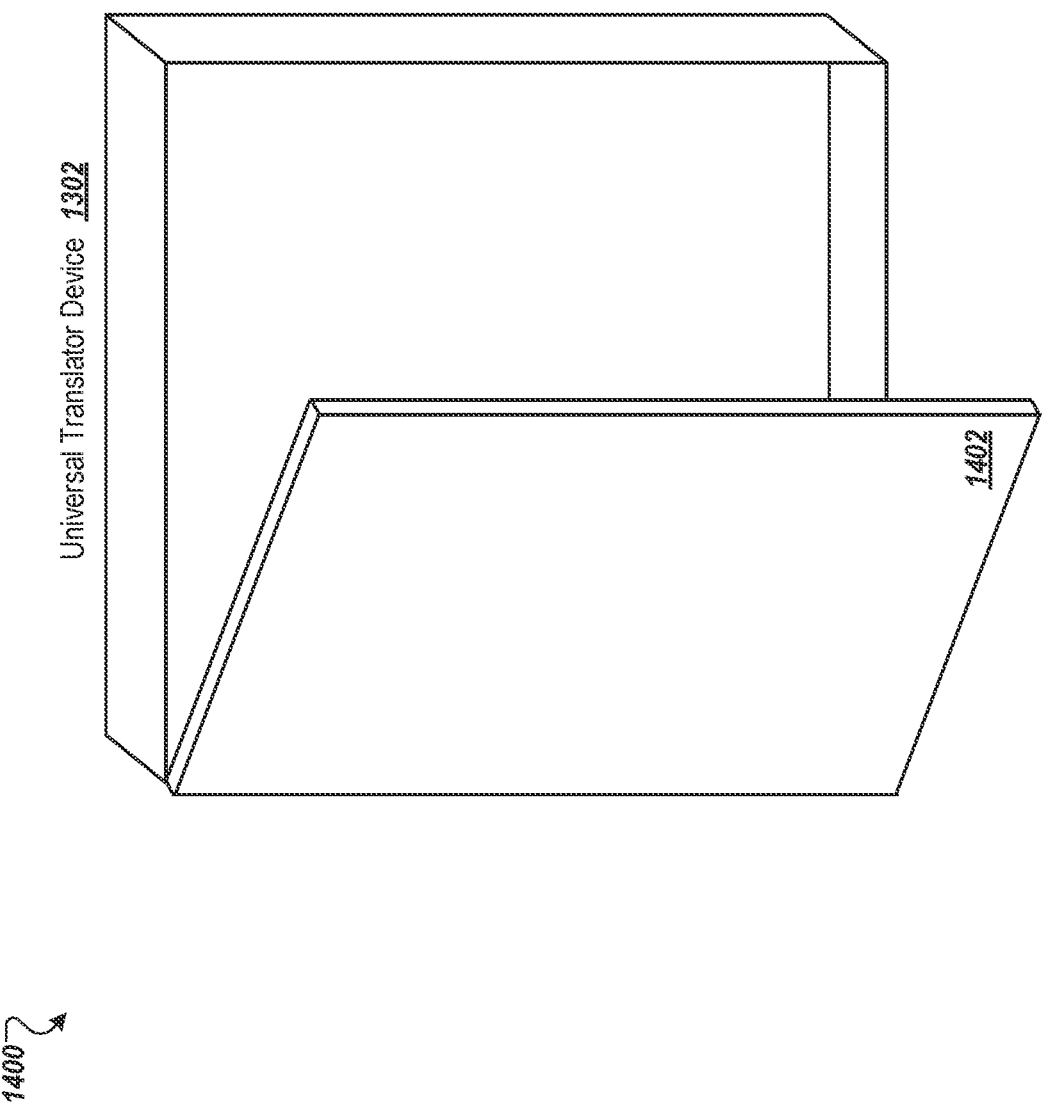

FIG. 14 is a diagram of an example box for the universal translator device of FIG. 13A.

Figure 15:
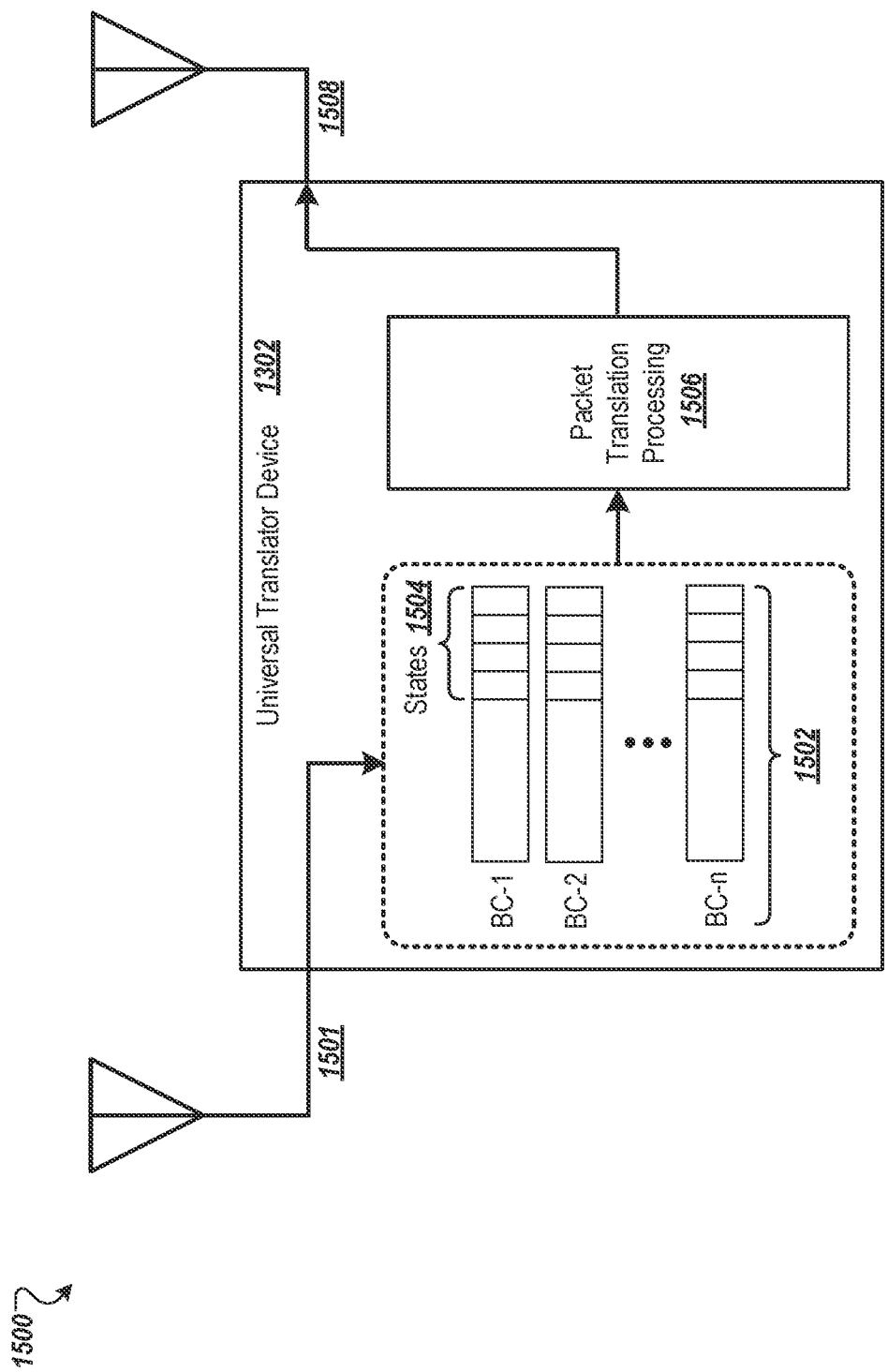

FIG. 15 is a schematic diagram of an example translation configuration for the universal translator device of FIG. 13A.

Figure 16A:
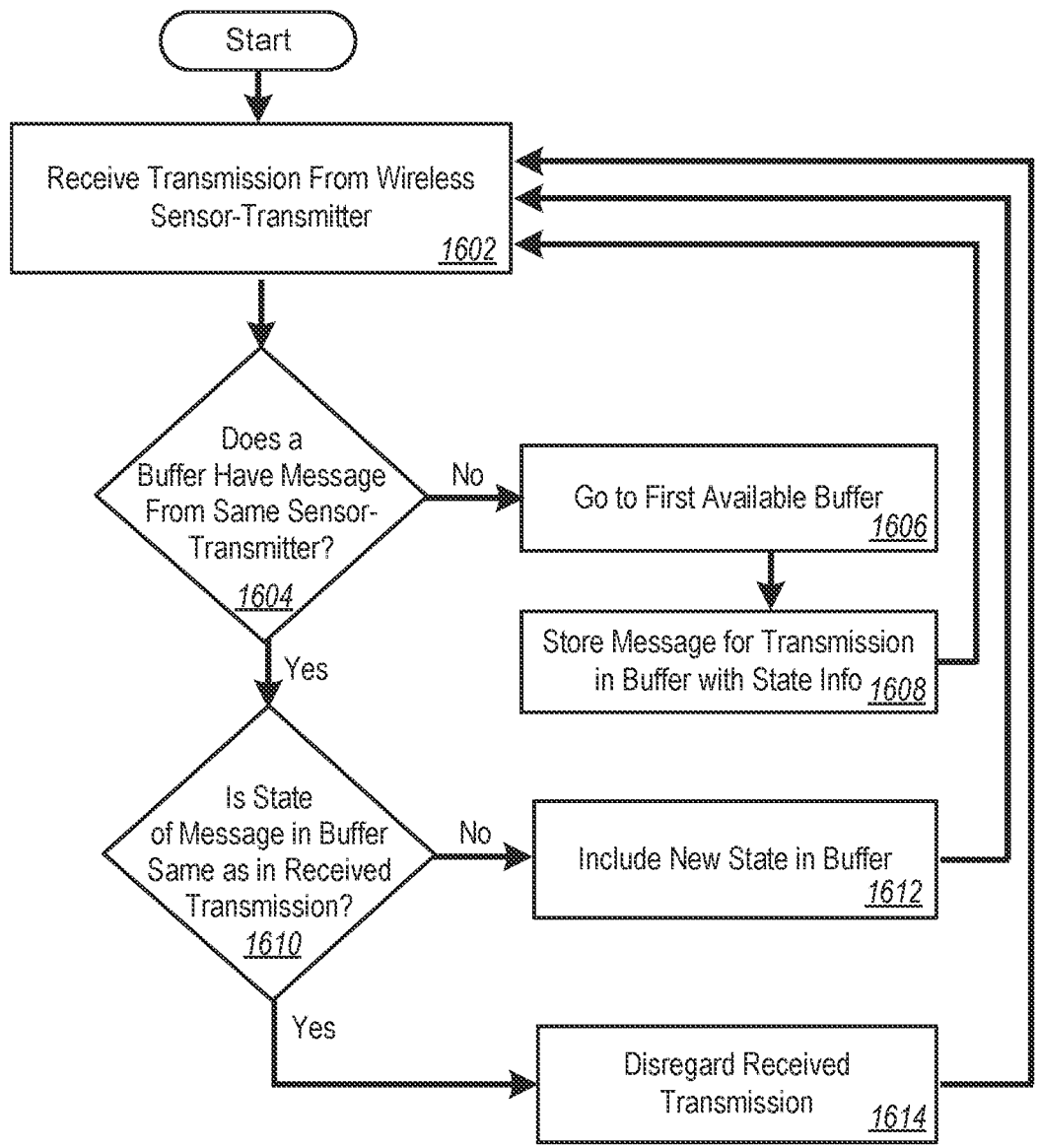

FIG. 16A is a flowchart of an example process for buffer processing.

Figure 16B:
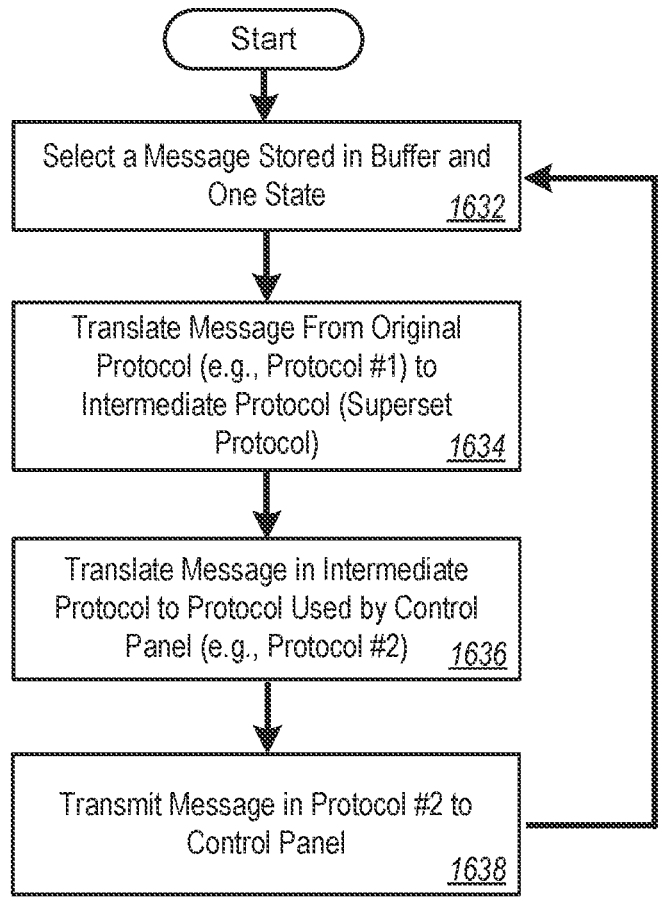

FIG. 16B is a flowchart of an example process for message processing.

Figure 16C:
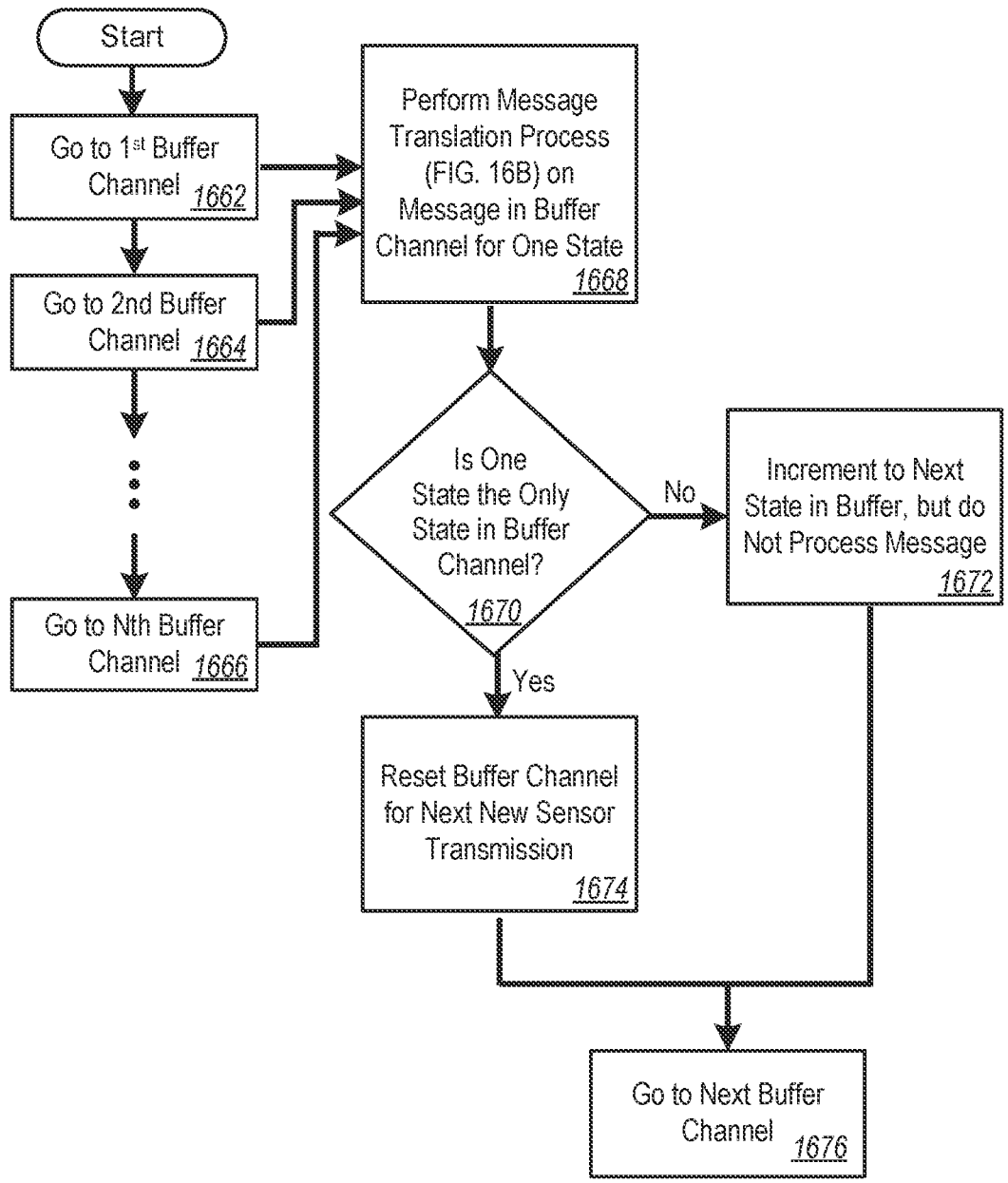

FIG. 16C is a flowchart of an example process for buffer mapping.

Figure 17:
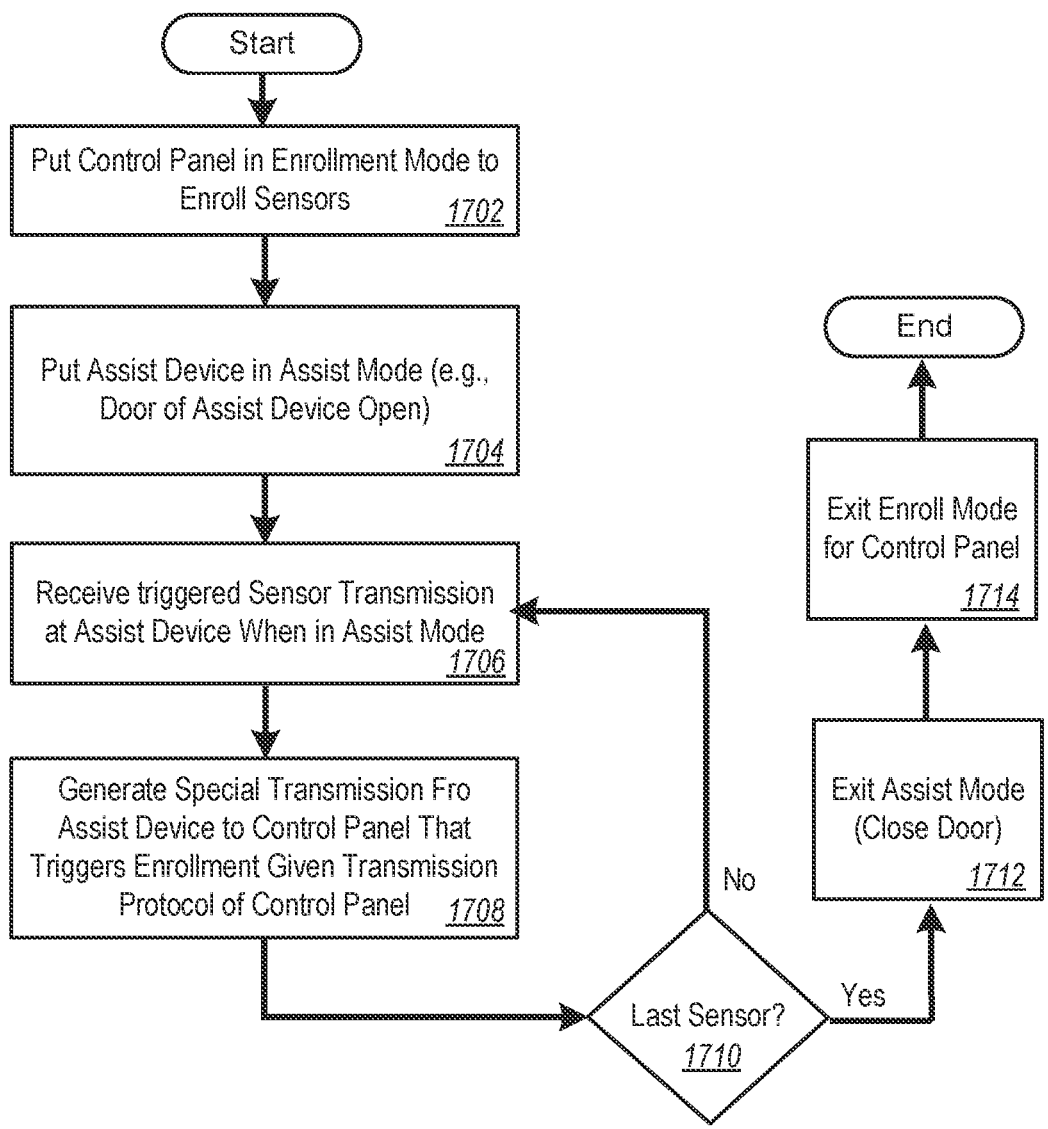

FIG. 17 is a flow chart of an example process for enrollment with translator assistance.

Figure 18:
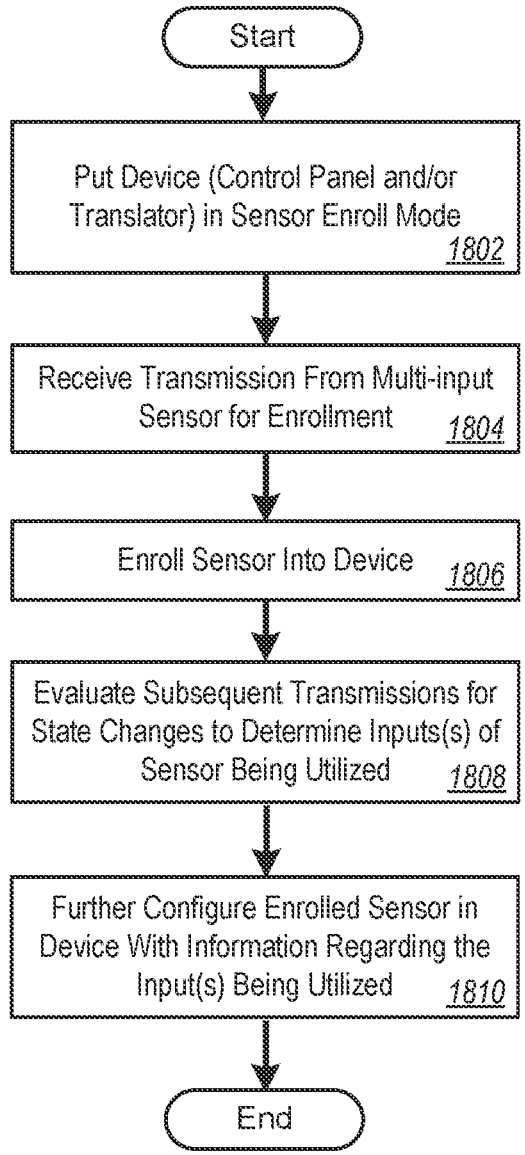

FIG. 18 is a flow chart of an example process for multi-input sensor enrollment with translator assistance.

Figure 19:
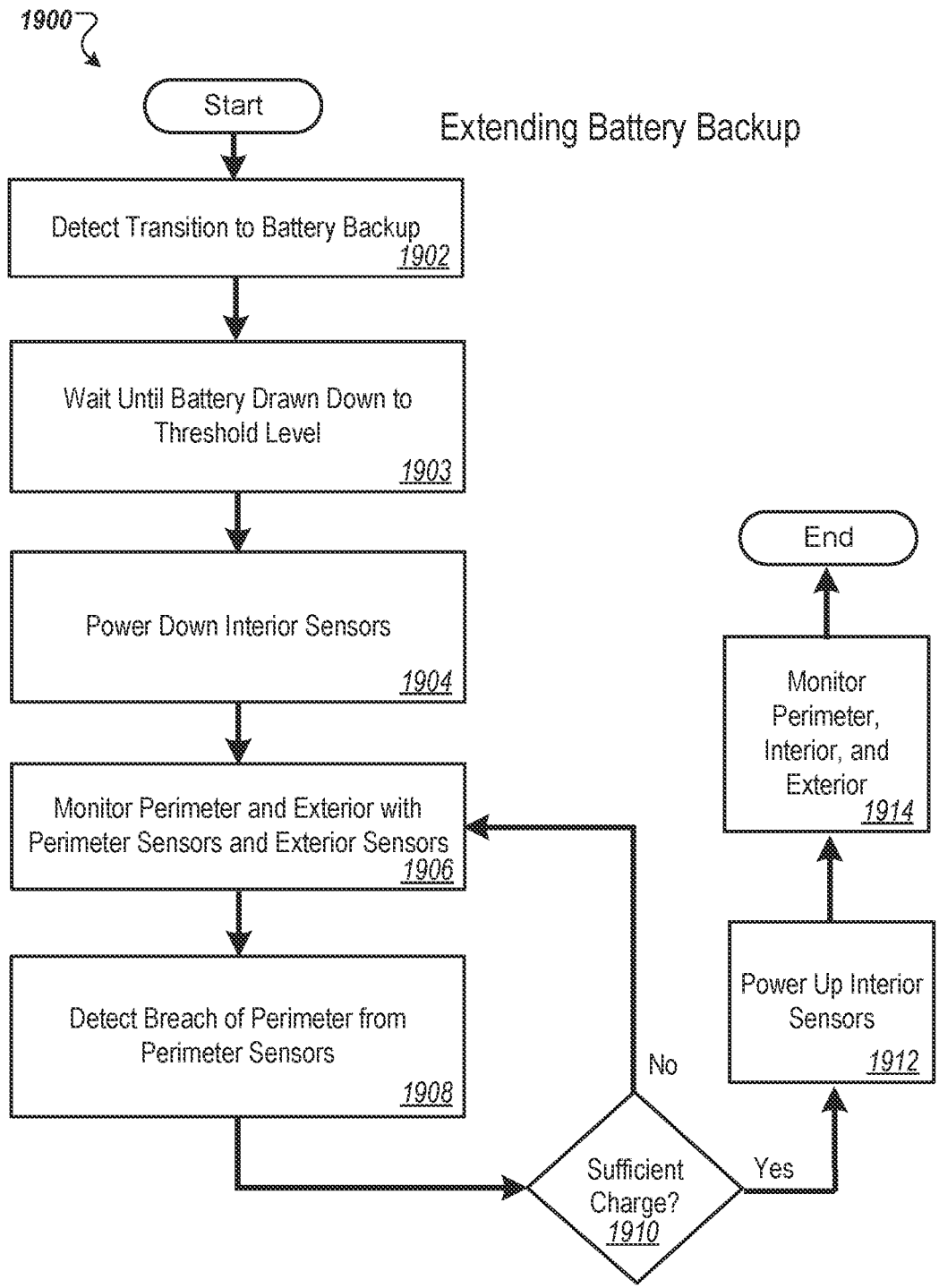

FIG. 19 is a flow chart of an example process for extending the battery life of a backup battery for a translator assistance.

Figure 20:
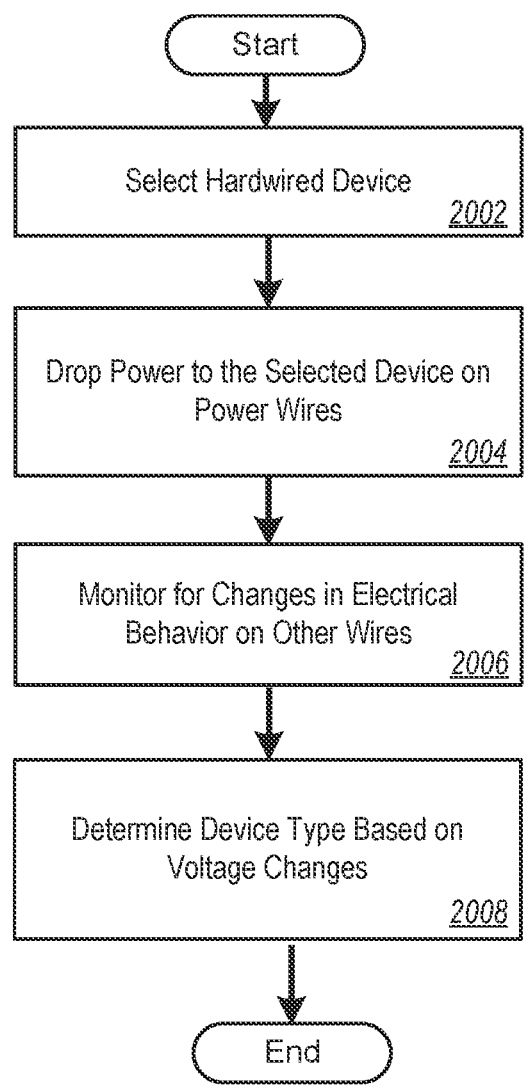

FIG. 20 is a flow chart of an example process for automatically detecting hardwire configurations for hardwired sensors/devices.

Figure 21:
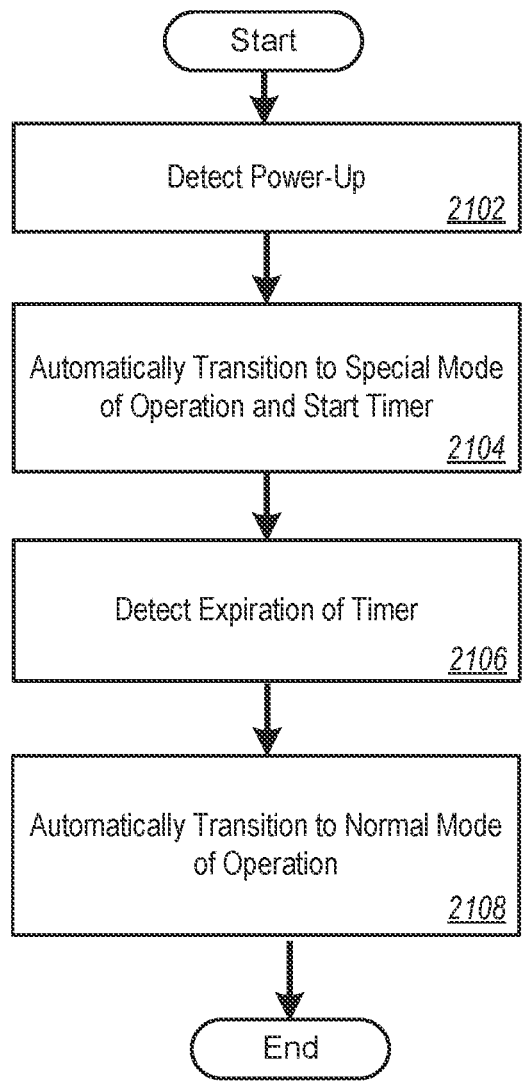

FIG. 21 is a flow chart of an example process for automatically changing the mode of operation for a device after powering-up.

Figure 22:
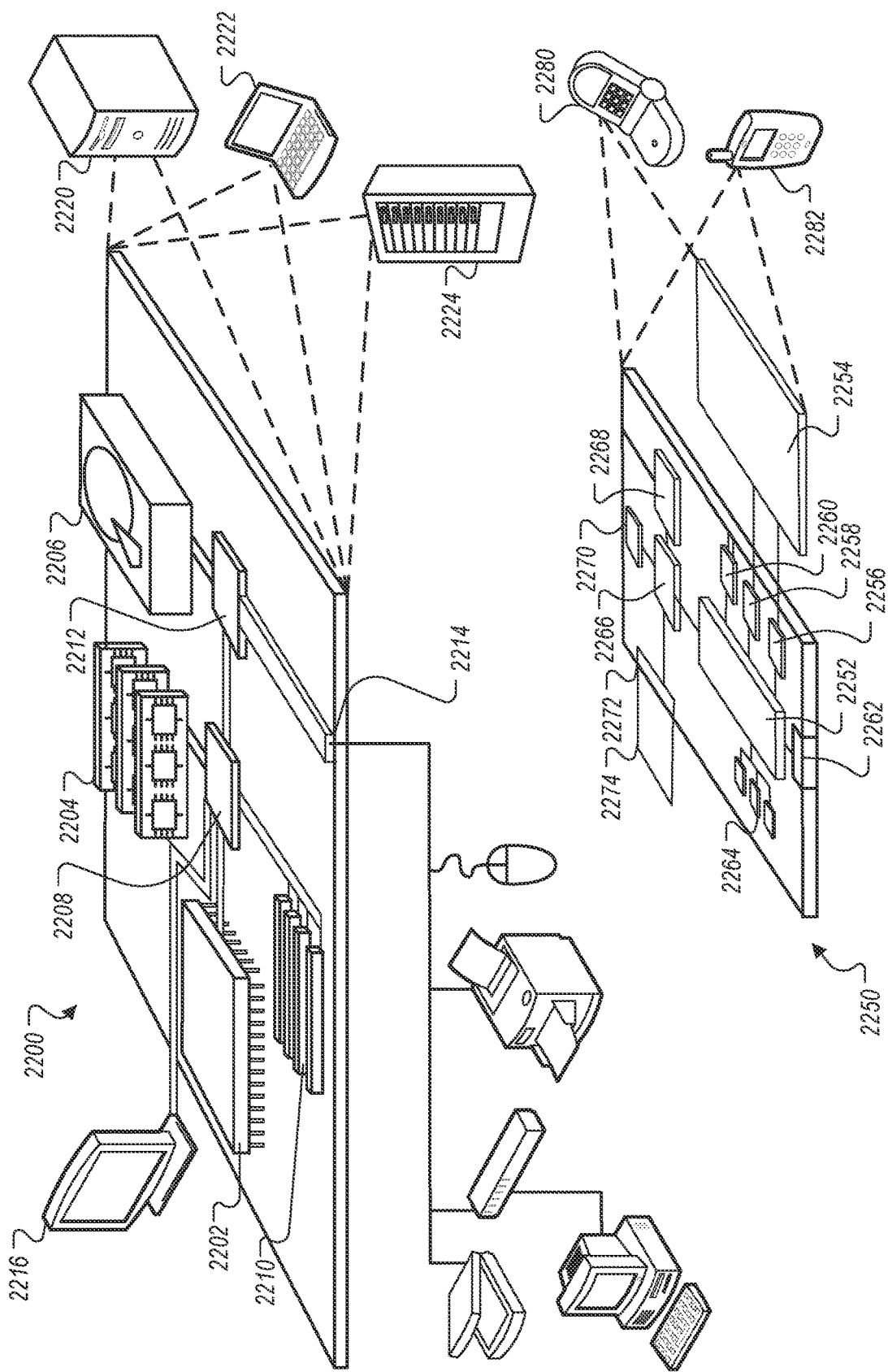

FIG. 22 is a block diagram of example computing devices.

Like reference numbers and designations in the various drawings indicate like elements.

DETAILED DESCRIPTION

This document generally describes device, systems, and techniques used for translating protocols can include one or more peripheral device interfaces through which communication from one or more peripheral devices is received using any of a plurality of protocols. The device can also include a protocol translator that is (i) preconfigured with translation mappings among the plurality of protocols, and (ii) programmed to translate signals received from the peripheral devices into at least target protocol used by a hub device. The device can also include a wireless interface that is configured to wirelessly transmit wireless signals in the target protocol to the hub device. The wireless signals can be translated into the target protocol by the protocol translator.

FIGS. 1A-D are example systems that incorporate universal translator devices to incorporate new and existing sensors/systems with a control device/system.

Figure 1A:
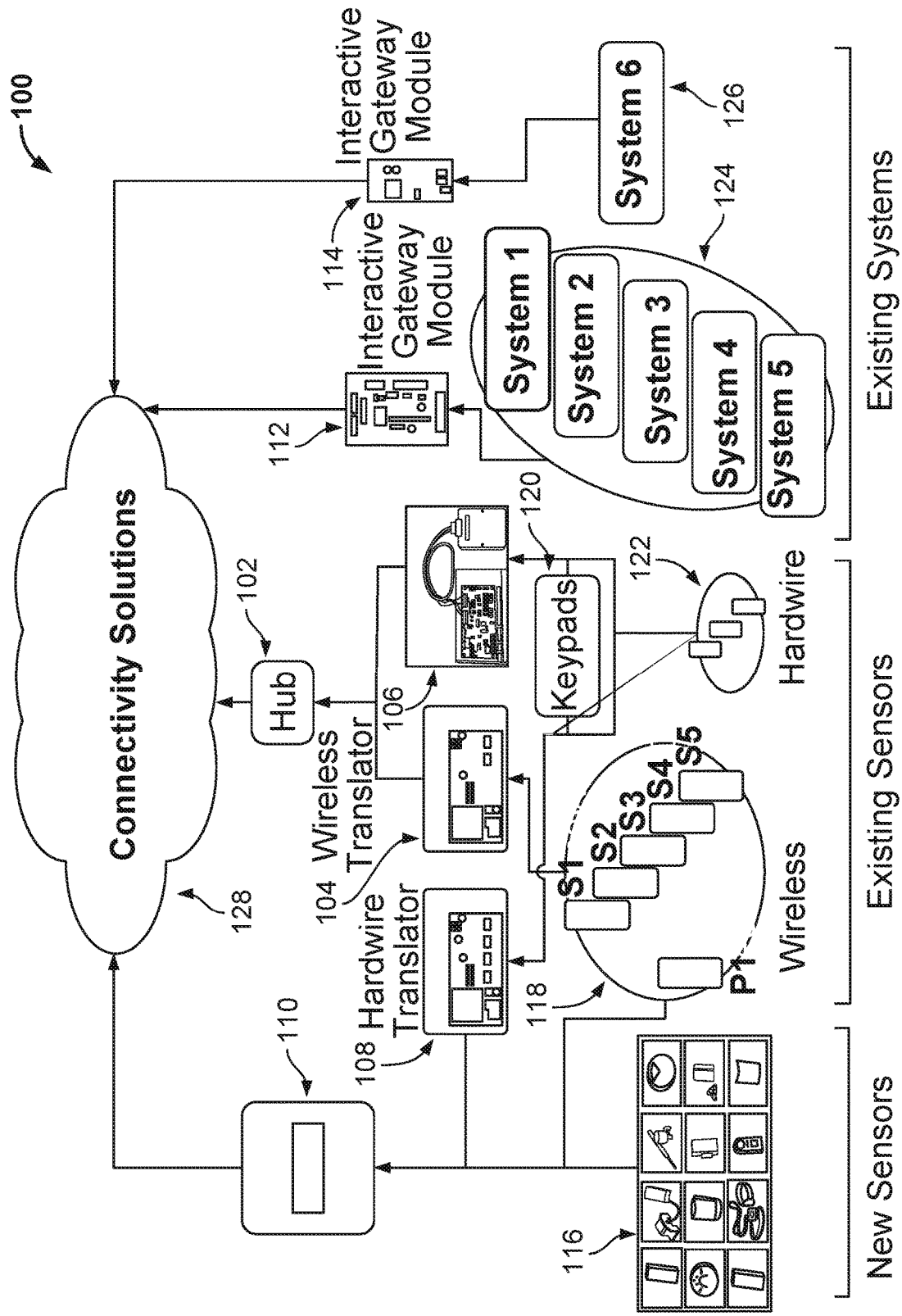

FIG. 1A depicts an example system 100 in which an example wireless translator device 104 and an example hardwire translator device 108 are used to translate protocols from existing wireless sensors 118, existing hardware sensors 122, and other devices/systems (e.g., keypads 120) for a control/automation hub 102 and a security hub 110. Although they are depicted as being separate, the control/automation hub 102 and the security hub 110 may be the same device and/or part of the same system. Alternatively, the hubs 102 and 110 can be physically separate devices that are part of different systems, but which are supplied with protocol translation by the translators 104 and/or 108. The control/automation hub 102 can be configured to provide control and/or automation for devices and systems within a premises, such as Internet of Things (IoT) devices that permit remote monitoring and/or control by a user and/or automated system. For example, the hub 102 can be the XFINITY HOME-AUTOMATION HUB provided by COMCAST.

The hub 102 can be connected to a remote computer system (e.g., cloud-based system) and client devices through one or more networks 128 (e.g., internet, local area network (LAN), wide area network (WAN), virtual private network (VPN)). The security hub 110 can provide similar features to the hub 102 (control and automation), but may additionally include various security protocols (e.g., alarm conditions that are monitored) and be connected to various security services (e.g., emergency services) through the one or more networks 128. For example, the hub 110 can be a security gateway that is smartphone enabled and Underwriter Laboratories (UL) compliant, and that is sold to the professional security channel and related connected home markets. For instance, the hub 110 can be the HELIX device provided by RESOLUTION PRODUCTS.

In the depicted example system, the wireless translator 104 can detect wireless transmissions from any of a variety of different existing wireless sensors 118 (example sensor manufacturers are depicted, other manufacturers are also possible), can translate the wireless transmissions, which may be across one or more different protocols, into a protocol that is used by the hub 102, and can retransmit the translated wireless signals to the hub 102. The wireless translator 104 can aid in discovery of the existing wireless sensors 118 by automatically detecting the RF frequencies and protocols that are used by the sensors 118, so as to permit an installer to take over the sensors 118 without knowing the sensor types or manufacturers. The wireless translator 104 can additionally perform automated detection and translation operations for other devices and systems wirelessly transmitting information, such as for existing wireless devices (e.g., keypad device 120) and/or systems (e.g., existing systems 124, 126).

The hardwire translator 108 can perform similar operations for the existing hardwire sensors 122 and other hardwired devices, such as the keypads 120. The hardwire translator 108 can provide protocol translation and automated discovery for the hub 102 and/or the hub 110, similar to the wireless translator 104.

The wireless translator 104 and/or the hardwire translator 108 can perform the automated detection in concert with the hub 102, the hub 110, and/or a other device/system 106. For example, one or more of these devices (hubs 102 and 110, other device/system 106) can direct the translators 104 and/or 108 to automatically discover sensor, device, and/or system types through frequency and protocol analysis, and can provide an interface through which installers can be provided with information identifying the automatically discovered sensor, device, and/or system types. An installer may then simply confirm that the automated detection appears accurate and/or has completed without needing specific knowledge of the sensor, device, and/or system types.

The other device/system 106 can be a device that is configured to interface with the hub 102 to takeover existing sensors 118 and 122 (and possibly new sensors 116) within a premises. The other device/system 106 can be part of the same device as the hardwire translator 108 and/or the wireless translator, or can use the translated protocols provided by the translators 104 and/or 108. The other device/system 106, the hub 102, and/or the hub 110 can use both forward and backward translation through the translators 104 and/or 108, so that information can be obtained from and provided to sensors, devices, and/or systems.

In addition to using translated protocols from existing sensors, the hub 110 (and the hub 102) can be configured to operate natively (without translation) with one or more different types of new sensors 116 (and other devices/systems). For example, the new sensors 116 can include a full line of intrusion and life-safety sensors and detectors servicing the professional security industry for which the hub 110 is designed to monitor without the use of the translators 104 and 108. The hub 102 can additionally or alternatively be configured to natively interact with one or more new sensors 116.

The translators 104 and 108 can be any of a variety of different types of translator devices. For example, the translator 108 can be the RE508X model translator device provided by RESOLUTION PRODUCTS, and the translator 104 can be the RE524X model translator device provided by RESOLUTION PRODUCTS. The translators 104 and 108 can additionally and/or alternatively be other makes and models.

The example system 100 can also include, in some implementations, example interactive gateway modules 112 and 114 that are communication devices that connect to various existing systems 124 and 126, including commonly installed professional security platforms such as Honeywell Vista, DSC PowerSeries, Interlogix Concord, NX and Simon panels. These devices 112 and 114 can provide Ethernet, Wi-Fi or cellular connectivity between these legacy panels and smartphone interactive service platforms.

Figure 1B:
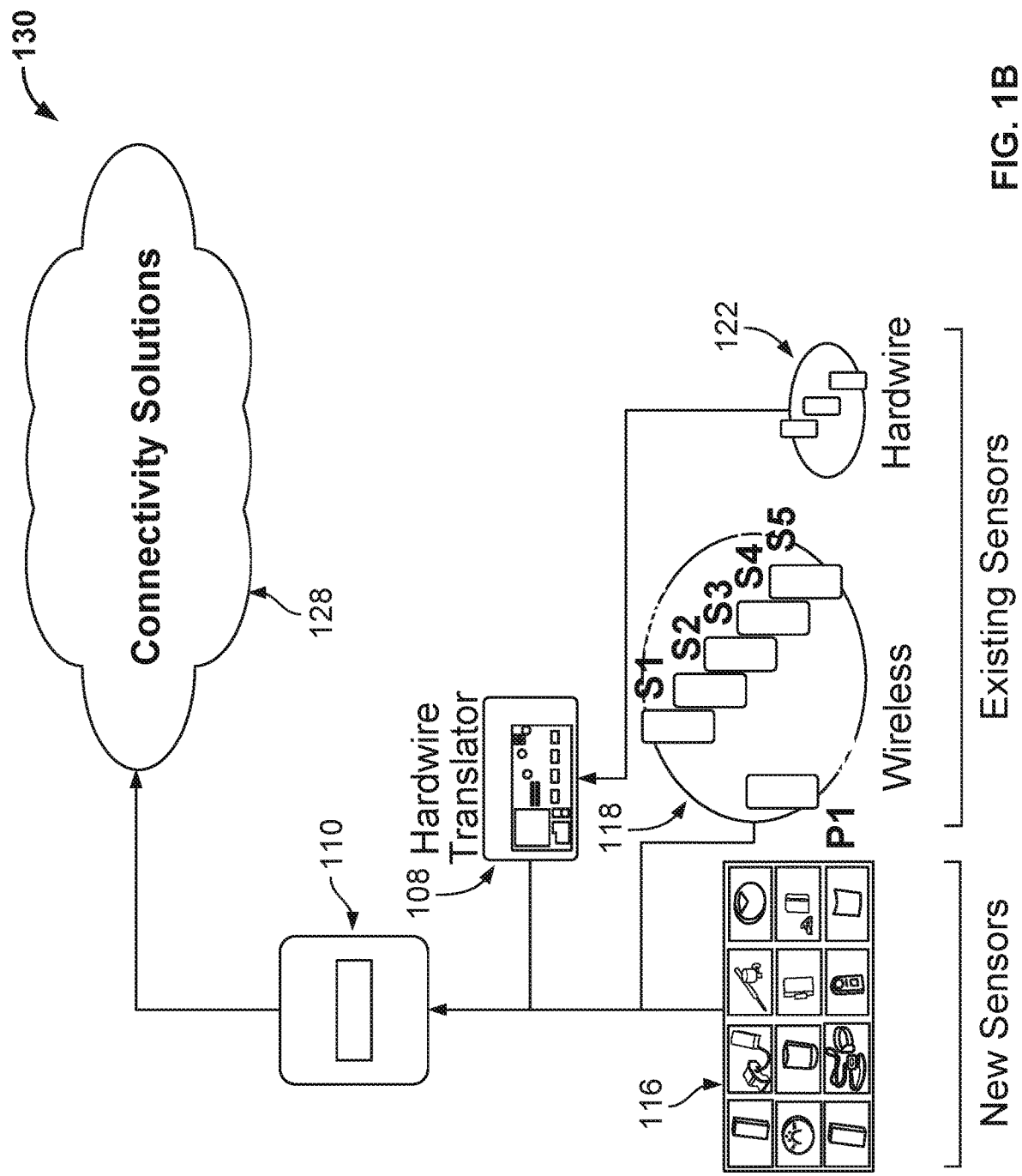

FIG. 1B depicts an example system 130 in which the example hardwire translator device 108 is used to translate protocols from existing hardwire sensors 122 for the example security hub 110. In this example, the security hub 110 is configured to interact natively (without a protocol translator) with a variety of new sensors 116 and existing wireless sensors 118, and to use the translator 108 for hardwire translations. A similar configuration can, in some implementations, additionally and/or alternatively be used for the hub 102.

Figure 1C:
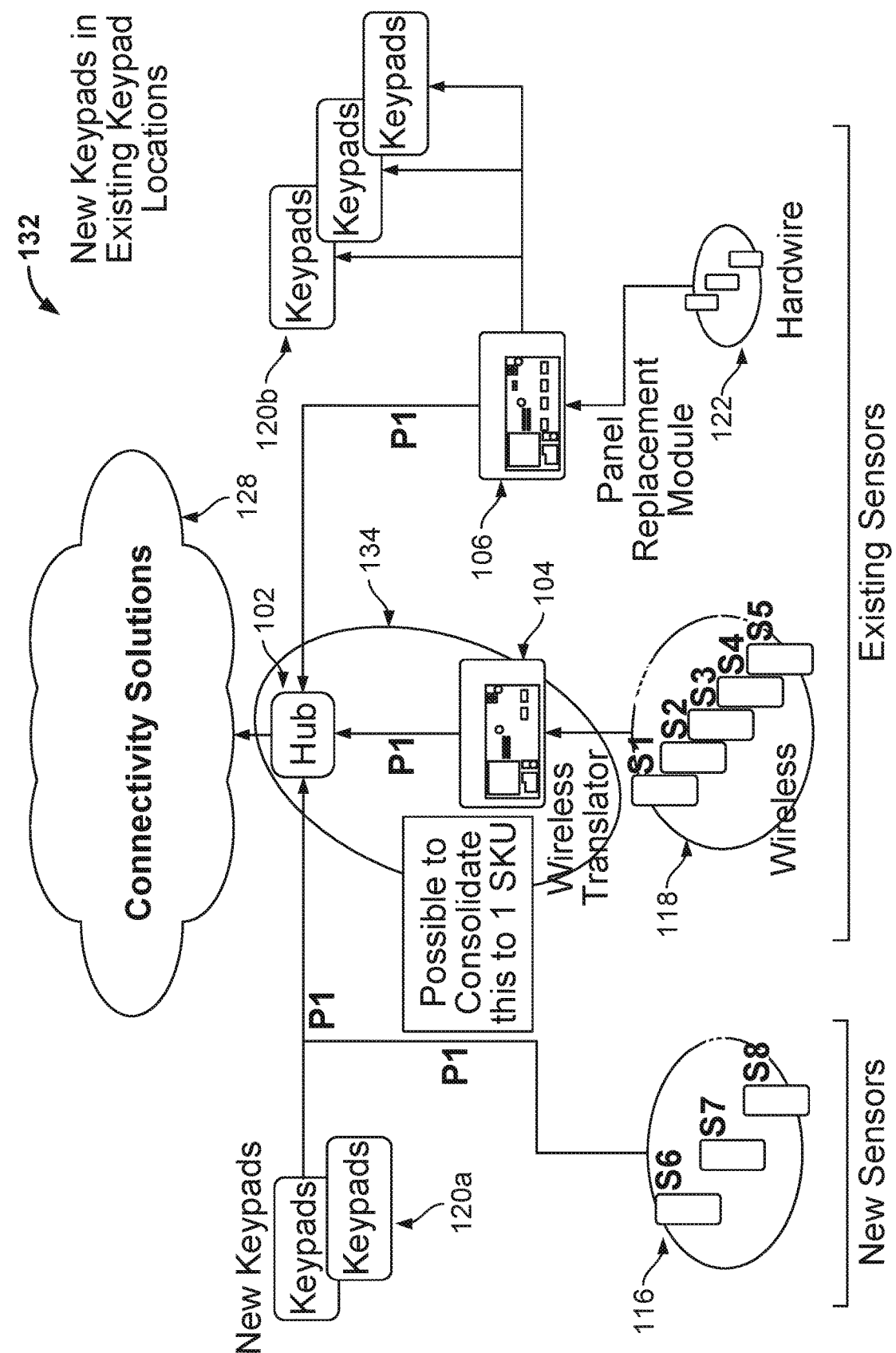

FIG. 1C depicts an example system 132 in which the hub 102 is able to communicate natively with the new sensors 116 and new keypads 120a (hardwired and/or wireless). However, in the example system 132, the wireless translator 104 is used to translate wireless transmissions from the existing wireless sensors 118, and the other device/system 106 is used to translate hardwire transmissions within the existing hardwire infrastructure (existing hardwire sensors 122 and new keypads in existing keypad locations 120b). In this example, the other device/system 106 is combined with the hardwire translator 108 to provide protocol translation for the existing hardwire infrastructure. Although depicted as separate devices, the hub 102 may be combined with the wireless translator 104 into a single device 134. The communication with the hub 102 is depicted in this example as being wireless using the ZigBee wireless protocol. Other wireless protocols are also possible.

Figure 1D:
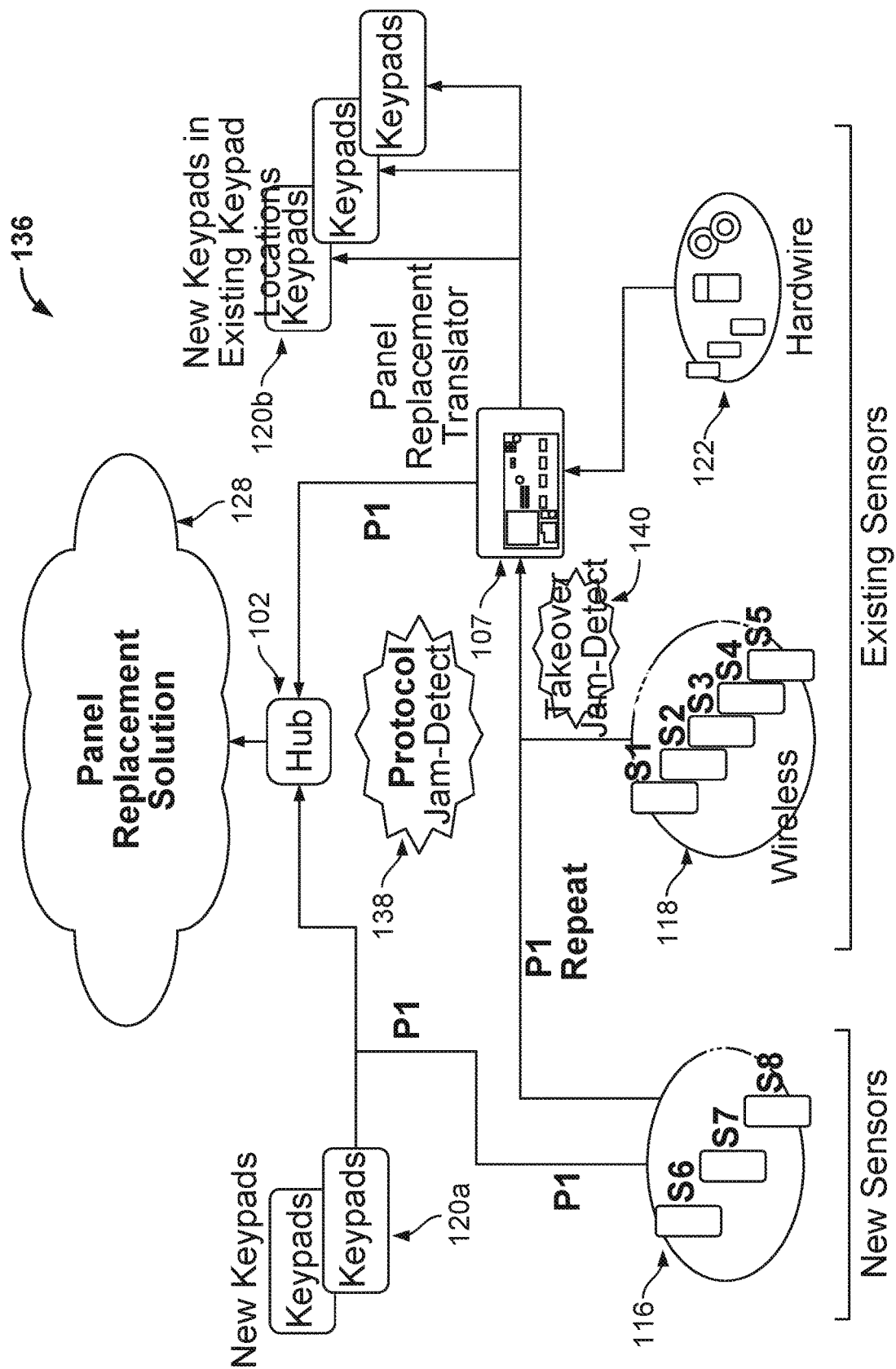

FIG. 1D depicts an example system 136 that is similar to the system 132, but in which a translator 107 incorporates both the wireless translator 104 and the hardwire translator 108 to translate both wireless and hardwire transmissions into a protocol used by the hub 102, which is depicted in this example as the ZigBee protocol (other protocols are also possible). The translator 107 can also perform jam detection 138 and wireless band takeover 140, which can include detecting and repeating wireless transmissions that are transmitted by the wireless sensors 116 and/or 118 using the protocol for the hub 102. For example, the translator 107 can perform ZigBee jam detection and ZigBee wireless band takeover, which can include repeating detected ZigBee transmissions from the sensors 116 and 118.

Example design elements and capabilities for the translator 107 are depicted in Table 1 below. Additional and/or alternative design elements for the translator 107 are also possible, such as different numbers and types of hardwire inputs, different numbers and types of wireless inputs, different wireless functions and robustness, different power outages, different sirens, different battery backups, etc.

TABLE 1

Design Elements and Capabilities

| Design Element | Capability |
| --- | --- |
| Inputs - Hardware | 8 contacts input, 4-wire smokes, any EOL resistor Automatic zone type detection |
| Inputs - Wireless | GE-Interlogix, Honeywell, 2GIG, DSC, Napco, ZigBee |
| Wireless Functions | Translation: Hardware/wireless --> ZigBee Repeating: ZigBee --> ZigBee |
| Wireless Robustness | Jam detection: takeover wireless band and ZigBee band Null prevention: dual diversity antennas Superior range: antenna clearance |
| Power Outage | ZigBee keypads Powered security zones: motions, glass breaks, 4-wire smokes Output current TBD |
| Siren | Dedicated output terminals Output current TBD |
| Battery Backup | 24 hours, auxiliary current TBD Integrated in Translator SKU Automatic: sleep-ship to active-on-power-up |
| Reliability Reporting | Cover and wall tamper, wall power status, battery statuses, sensor supervision |
| Wall Power | 12VDC Class II, included in Translator SKU |
| Account Protection | Programming freeze lock |
| Approvals | UL1023 Burg, UL985 Fire |

Figure 2:
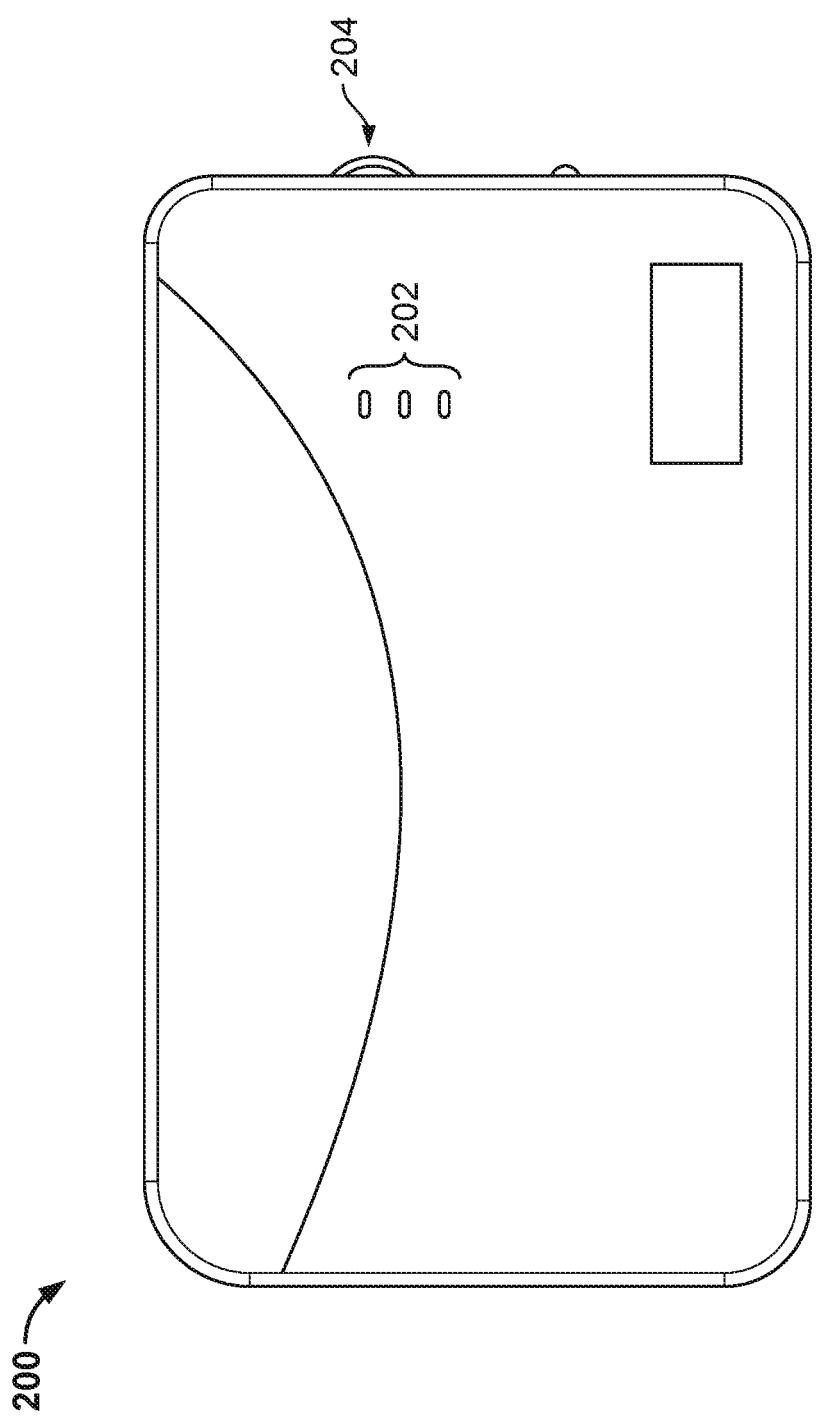
FIG. 2 depicts an example housing for a translator/panel replacement device.

FIG. 2 depicts an example housing 200 for a translator/panel replacement device. The example housing 200 can be used for the example translator/panel replacement devices that are depicted in FIGS. 3-6. The housing 200 includes a minimal user interface that includes a set of status lights 202 (e.g., light-emitting diodes (LEDs)) and a dial/switch 204 that can be used to adjust one or more settings and/or turn the device on/off.

Figure 3:
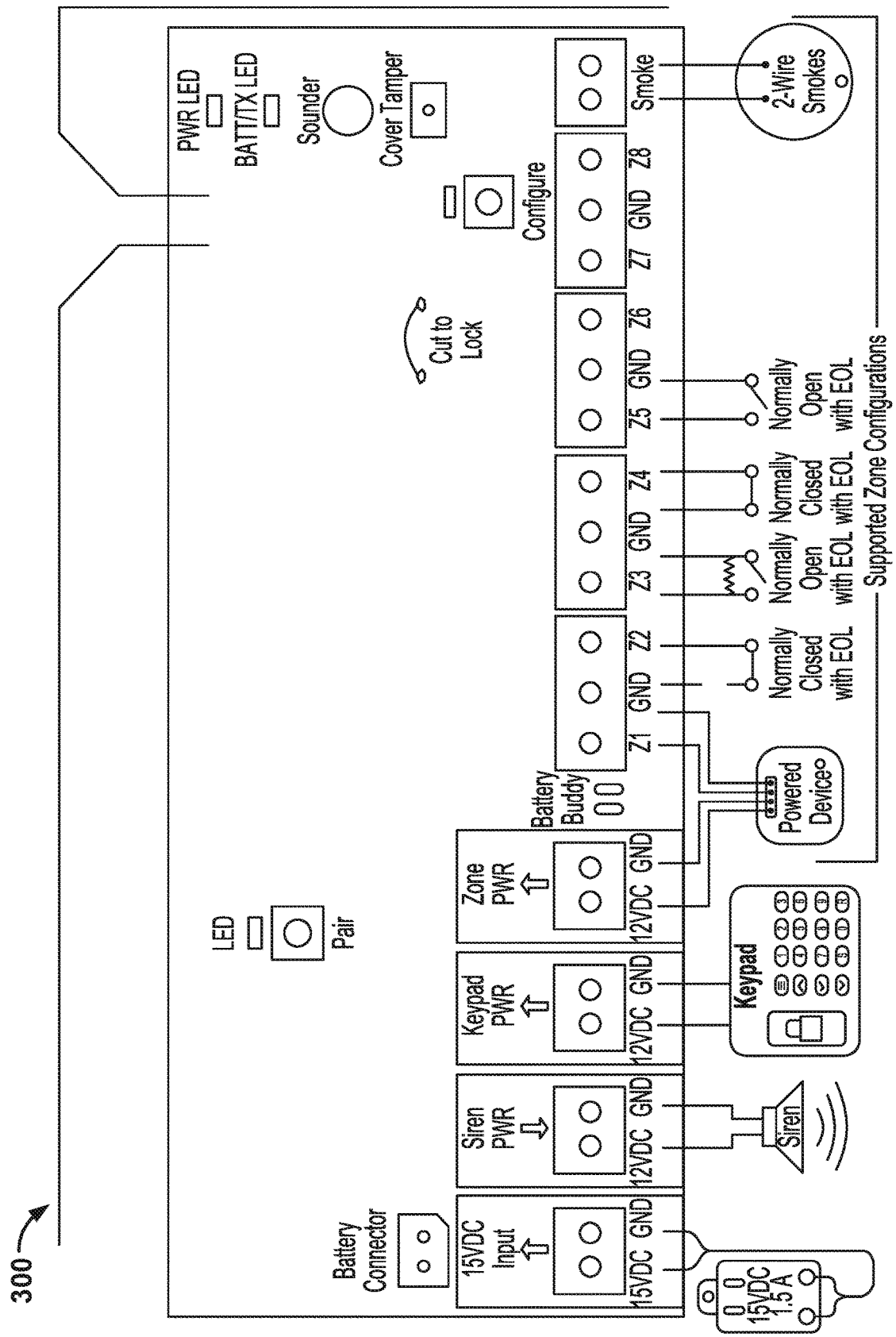
FIG. 3 depicts an example translator/replacement panel device.

FIG. 3 depicts an example translator/replacement panel device 300. This example device 300 includes terminals for hardwiring various sensors, zones, and devices, such as security zones, keypads, sirens, smoke detectors, and/or other powered devices. The example device 300 also includes one or more wireless modules for detecting and transmitting wireless signals using one or more protocols, including wireless signals that are translated to a particular protocol, such as the ZigBee protocol, from a different wired and/or wireless signal protocol. In this example, the device 300 includes a ZigBee pairing button so that the device 300 can be wirelessly paired over the ZigBee protocol with another device, such as the hub 102 and/or the hub 110. In other implementations, one or more protocols that are used to pair with another device can be designated through a selection mechanism instead of being predesignated/preselected for a particular protocol, as in the device 300. The device 300 also includes a wire that an installer can cut to lock the configuration for the device 300 so that it cannot be taken over or otherwise altered at a later date. Other mechanisms for locking the configuration of the device 300 are also possible, such as setting a PIN or code for the device 300, physically disabling/removing other components of the device 300, locking a housing for the device 300 (such as the housing 200), and/or other appropriate mechanisms. The device 300 also includes connections for a primary power supply (e.g., direct current (DC) input) and a backup power supply (battery connections). The example device 300 can be used in the systems 100, 130, 132, and/or 136 described above with regard to FIGS. 1A-D, such as the translator 104, the translator 108, the replacement panel module/translator 106, the combined hub and translator 134, and/or other appropriate devices.

FIGS. 4A-B depict an example translator device 400 that is capable of translating hardwire signals received over various protocols into different protocols that are transmitted wirelessly by the device 400. Similar to the device 300, the device 400 includes terminals for various hardwire connections, such as hardwiring various sensors, zones, and devices, like security zones, keypads, sirens, smoke detectors, and/or powered devices. The device 400 also includes a panel select feature through which an installer can select a particular type of panel to which the device 400 is transmitting the translated protocols. The panel selection determines the protocol to which the device 400 translates the hardwire transmissions for wireless transmission. The selector for the device 400 is an example and other types of selection mechanisms are also possible, such as buttons, graphical user interface (GUI) features, and/or other selection features. As is the case with the device 300, the device 400 includes a feature to lock in the configuration for the device 400.

FIG. 4C shows an example set-up process 450 for setting up and configuring the device 400. Additional and/or alternative steps are also possible.

The device is mounted and wired (452). For example, a technician installing the device 400 can select a mounting position and location for the device 400 and wire zones to be used by the device 400. Wall mounting screw locations of the device can be used for mounting, e.g., with screw slots arranged and angled so as to avoid movement or rotation of the device 400 after installation. The 12 VDC output can be connected to powered zones, if any. The power supply of the device 400 can be connected to the translator. The cover of the translator can remain open before power-up and subsequent configuration steps.

The translator is configured (454). For example, the brand of panel with which the translator is to communicate can be identified, such as by being selected using a panel select knob or some other control. Zones can then be configured as needed. In some installations, no zone configurations may need to be made, such as in installations with normally closed zones that do not require tamper detection. Installations with other zone types can require advanced set-up procedures.

The translator is enrolled with the panel (456). For example, enrollment can start by tripping the translator tamper to enroll the translator into the panel. In another example, a translator ID of the translator can be entered into a panel of the device 400. Zones can then be enrolled into the panel in some installations. For example, with the cover open, each trip zone can be enrolled into the panel. In another example, zone IDs can be entered into the panel. For non-powered zones, the zone IDs can be the translator's base ID, for example, combined with a zone number of one or more digits.

Configuration can be completed (458). For example, the cover on the device 400 can be closed, and proper operation of the sensors can be tested and verified at the panel. The translator can then be locked, such as by cutting and locking a wire, and the cover can covered and fastened, such as with a screw.

Once the device 400 is installed and configured, the example device 400 can be used in the systems 100, 130, 132, and/or 136 described above with regard to FIGS. 1A-D, such as the translator 108 and/or other appropriate devices.

FIGS. 5A-B depict an example translator device 500 that is capable of translating wireless signals received over various protocols into different protocols that are transmitted wirelessly by the device 500. As is the case with the device 400, the device 500 includes a panel select feature through which an installer can select a particular type of panel to which the device 500 is transmitting the translated protocols. The panel selection determines the protocol to which the device 500 translates the incoming wireless transmissions for wireless retransmission. The selectors for the device 500 are examples, and other types of selection mechanisms are also possible, such as buttons, GUI features, and/or other selection features. As is the case with the devices 300-400, the device 500 includes a feature to lock in the configuration for the device 500.

In some implementations, setting up and configuring the device 500 can use the same process as the process 450 described above for FIG. 4C. Additional and/or alternative steps are also possible.

The example device 500 can be used in the systems 100, 130, 132, and/or 136 described above with regard to FIGS. 1A-D, such as the translator 104 and/or other appropriate devices.

FIG. 6 depicts an example translator/replacement panel device 600. This example device 600 includes terminals for hardwiring various sensors, zones, and devices, like security zones, keypads, sirens, smoke detectors, and/or powered devices. The example device 600 also includes one or more wireless modules for detecting and transmitting wireless signals using one or more protocols, including wireless signals that are translated to a particular protocol, such as the Zigbee protocol, from a different wired and/or wireless signal protocol. In this example, the device 600 includes a Zigbee Radio module through which the device 600 can receive and transmit wireless signals using the Zigbee protocol, such as wireless transmissions with the hub 102 and/or the hub 110. Additional wireless protocols may be received by the device 600 and translated into the Zigbee protocol, and the device 600 can also perform Zigbee jamming detection and retransmission for Zigbee protocol transmissions, as described above with regard to FIG. 1D and Table 1. The device 600 also includes a wire that an installer can cut to lock the configuration for the device 600 so that it cannot be taken over or otherwise altered at a later date. The device 600 also includes connections for a primary power supply (DC input) and a backup power supply (battery connections). Example features of the device 600 are described above with regard to Table 1. The example device 600 can be used in the systems 100, 130, 132, and/or 136 described above with regard to FIGS. 1A-D, such as the translator 104, the translator 108, the replacement panel module/translator 106, the combined hub and translator 134, and/or other appropriate devices.

FIG. 7 depicts various views of an example device housing 700. The example housing can be similar to the housing 200 described above, and example dimensions are depicted (other dimensions, scales, and sizes are also possible). The housing 700 can include any of a variety of the following features:
  Easy-level wall mounting without removing the PCB.
  Integrated antennas.
  Battery captured in hinged cover and pre-connected at the factory.
  Integrated cover and wall tamper detection.
  Generous room for wiring.
  Tie-wrap loops providing strain relief points for wiring.
  Easy open latch.

FIG. 8 depicts various views of an example device housing 800. The example housing 800 is similar to the housing 700, but has been modified slightly in order to accept a larger backup battery, and example dimensions are depicted (other dimensions, scales, and sizes are also possible). For example, the example housing 800 can include sufficient room within the enclosure for a Battery Buddy to be included with the translator device.

FIG. 9 depicts a system 900 that includes an example device 902 that is hard-wired to example zones 904 and example keypads 906. The device 902 can provide protocol translation of hard-wired signals and can be to the translator described above with regard to FIGS. 1A-D and 3-6. The device 902 can additionally be connected to a siren 908, a power supply 910, and a backup battery power supply 912.

The translator devices described above with regard to FIGS. 1-9 can each use appropriate power supplies and/or backup power supplies. For example, the power supply can use an output voltage and current specifications of a selected Class VI power supply with a voltage of 15 VDC and a current of 1.5 A. These voltage and current specifications can support the power requirements of translator devices, which can include 1) providing direct power for the device itself, 2) providing 12 VDC output power for peripherals, and 3) providing charging current for the connected backup battery or batteries. The power supply can connect to a set of terminals on the devices. The power supply enclosure itself can also have terminals, which can accommodate any wire length and provides flexibility to the technician. These power supply features can provide a quick, consistent, and secure power connection.

Various backup power supply configurations are also possible. For example, in installations without life saving features (e.g., smoke detectors) that are hardwired to the device, these installations can use NiMH backup battery. Such a battery can be housed in the hinged cover of the devices and can be pre-connected. Such batteries can, for instance, provide 4 hours of backup power for powered, hardwired burg zones (compliant with UL1023). Additionally, such a configuration can provide 24 hours of backup power for all non-powered hardwired zones, translated wireless zones, and the wireless radio (e.g., Zigbee radio). This 24 hour backup can include power for wireless smoke detectors, meeting the requirements of UL985.

In another example, a "Battery Buddy" can be used. The Battery Buddy can include, for example, a 7.2 AH lead-acid battery, a safety fusing, and cables to facilitate connection to the device. Circuitry used to charge, monitor, and connect to the Battery Buddy can be included with the devices. The Battery Buddy housing design (FIG. 8) can be similar to the housing for the devices without the Battery Buddy (FIG. 7). The Battery Buddy can be used in various installations, such as installations needing a 24 hour backup of all zones (e.g., commercial installations) and/or installations needing a 24 hour backup of hardwired life saving devices (e.g., hardwired smoke detectors).

An example technique for installing translators, such as those described above with regard to FIGS. 1-9, can include the following:
  Remove existing panel
  Install device (panel)
  Wire all compatible Zones (Motions, Glassbreaks, Door/Window, etc), Power to circuit board
  Connect and wire provided transformer/power supply
  Connect battery Learn resistors
Pair to TS/HH (e.g., controller device with user interface, such as a TCA-203 and/or a TCA-300)
Program zones via TS/HH (includes add/remove of hardwired/wireless devices) using same process used for enrolling/removing wireless sensors (e.g., Zigbee sensors) on TS/HH
Service/RMA The example translators described in this document can perform wireless discovery, which can include identifying the types and protocols that are used by various wireless and hardwired sensors, devices, and systems. The example components, devices, systems, and techniques described below with regard to FIGS. 10-11, which describe wireless discovery as well as automated configuration/connection, can be incorporated with the example translator, systems, devices, and techniques described above with regard to FIGS. 1-9.

FIG. 10A is a block diagram of an example environment 1000 in which an application computing system discovers sensors. For example, FIG. 10A depicts an example wireless system that can automatically connect to the depicted example wireless sensors. The wireless gateway identified as "Helix" is part of an example wireless system that is able to automatically (or with minimized user assistance) discover, enroll, classify, and configure the system to, responds to, and passes on information from existing sensors, regardless of the sensor manufacturer, protocols, sensing functions, and/or operational models/vintages. The depicted example wireless system can, for example, use a multitude of objective and subjective algorithms to set up the system to utilize these existing sensors, like discovering existing sensors from the sensors' supervisory or responsive wireless transmissions, which can involve numerous steps and phases, and deductions and inferences and interrelationships of pieces of information.

In the example environment 1000, an application computing system 1002 discovers sensors, for example, from a third-party system. As an example, the application computing system 1002 (or system 1002) can be a security system that communicates with various wireless and hardwired sensors, including both security system sensors and other sensors. The system 1002 can be installed at a home, business, or other location, and can immediately and over time discover wireless sensors 1004 as well as operating characteristics of those wireless sensors 1004 and hardwired sensors 1005. The wireless sensors 1004 and hardwired sensors 1005 can be part of a third party system, yet the system 1002 can be programmed to passively detect and enroll the sensors 1004/1005 without participating in or completing a formal enrollment with the third party system. By enrolling existing sensors 1004/1005 from a third party system, the information available to the system 1002 regarding the vicinity can be enhanced without having to install a separate sensor array for system 1002. The system 1002 may generate and provide suggested configuration information for the sensors 1004 and 1005 to set up, use, and continually optimize the operation of the system 1002 based on the sensors 1004/1005. The system 1002 includes a translator 1009 for translating packets received in a first protocol to a second protocol.

The system 1002 includes a wireless application discovery program 1006 for discovering the wireless sensors 1004 and the hardwired sensors 1005. For example, using information received by a wireless transceiver 1007 from signals generated by the wireless sensors 104, the wireless application discovery program 1006 can make guesses as to the types and locations of the wireless sensors 1004. For example, the wireless sensors 1004 can be "closed" in a sense that they may not use a protocol that is standardized among vendors in order to broadcast their identity or other wireless information used to communicate with the sensors 1004. The system 1002 can detect the wireless sensors 1004, determine one or more sensor types that are likely for the sensors 1004, and can enroll the sensors 1004 with the system 1002 so that the system 1002 can use the information generated by the sensors 1004.

The discovery process can include the use of a discovery rule set 108 that includes, among other things, rules that can be used by the wireless application discovery program 1006 for determining the types and locations of the wireless sensors 1004 and hardwired sensors 1005. For example, the rules can indicate that a time duration between an open and close of an alarm indicates that the sensor is, for example, very likely to be a garage door sensor. The rules can also include information that related groups of sensors, such as to identify an entry door and interior doors based on a time sequence of received signals from those sensors. The system 1002 and the discovery rule set 1008 can use any of a variety of techniques for determining likely sensor information (e.g., sensor type, protocol), such as scoring the sensors 1004 along one or more dimensions when one or more rules from the discovery rule set 1008 are satisfied by passively monitored wireless transmissions/behavior for the sensors 1004. For instance, the discovery rule set 108 can include rules that identify transmission scenarios that indicate that a sensor is likely to be a door sensor (e.g., open and close events occur close to each other in time), and can allocate points that correspond to how much the scenario indicates that the sensor is a door sensor. Once a threshold number of door sensor points have been achieved, the system 1002 can determine that the sensor is likely to be a door sensor. Points may be allocated along dimensions corresponding to each type of sensor, as well as being allocated for other sensor characteristics that can be detected/inferred by the system 1002. The system 1002 can be programmed to identify multiple potential sensor types for each sensor, when warranted based on points for the sensor types exceeding a threshold score. Other scoring and rule set evaluation techniques are also possible for the system 1002.

During the discovery process, the wireless application discovery program 1006 can enroll identified sensors, such as in an enrolled sensors data store 1010. Enrollment information can include, for example, sensor identifiers (identifying each sensor to the system 1002), sensor types, sensor locations (absolute within a building and/or relative with regard to other sensors), and other information, as described below. Sensor configuration data 1011 can include, for each enrolled sensor, configuration information such as communication protocols. Enrollment of the sensors 1004 with the system 1002 can cause the system 1002 to persistently monitor for wireless transmissions from the sensors 1004, to process the wireless transmissions (e.g., determine what is happening in a building based on the transmission from the sensor), and to perform further actions based on the processed wireless transmissions (e.g., transmit information to a cloud based system, automatically perform an operation, transmit an alert/notification to the user). The discovery process can continue such that new wireless devices that are later installed in the home can also be observed and assessed for inclusion in any non-security or alternative security solutions.

A user interface device 1016, such as an interactive display provided for use by a user 1018, can display information and receive user inputs. For example, the user interface device 1016 can display "best guess" information, informing the user 1018 of the best guesses as to the types and locations of the sensors discovered by the system 102. The user interface device 1016 can display prompts, including through the wizard described above, that allows the user to provide input associated with sensors and/or confirm assumptions made by the system 1002. In some implementations, the user interface device 1016 is part of the system 1002, such as a panel on a main controller of the system 1002, a remote user interface device that communicates with the system 1002, an app on a mobile device (e.g., a smartphone), or some other device.

In the example environment depicted in FIG. 10, the system 1002 can, for instance, automatically connect to various sensors by accumulating and/or measuring objective, deterministic information that is wirelessly detectable, such as one or more of a frequency of operation, a modulation type, modulation parameters, signal strength, signal strength relative to other sensors, unique identifiers (e.g., serial number, ID), device type, and status bits such as tamper, battery state, alarm state.

The example environment depicted in FIG. 10A can use various pieces of information to form a working theory of where, what, and how sensors are operating in a particular location, such as a home, a building, and/or other location. For instance, the system can progress through a series of logical deductions, inferences, and/or possibilities that can narrow down each sensor's identity (e.g., type, manufacturer, protocol) from a broad range of sensors to a smaller pool of candidate sensors. Multiple iterations of deductions, inferences, and possibilities can be performed that include generating working theories for each sensor, which can be tested (e.g., theories evaluated against wirelessly detected sensor information) and then improved upon to generate better theories, which can be further tested. In some instances, theories can be additionally narrowed through actual requests for information from humans, like a pre-educated set-up wizard.

The system 1002 can deduce a variety of subjective information and/or indirect conclusions, such as one or more of the following: what type of device the sensor is, such as magnetic door/window sensor, a motion sensor, and/or a tilt sensor, whether the sensor is a perimeter sensor (e.g., door or window sensor) or an interior sensor (e.g., motion pointing inside), Where a particular sensor might be located (e.g., garage overhead door, garage entry door, basement motion), and/or What the sensor might be named/referred to as (e.g., "front door").

Such more subjective deductions can be made on less definitive information, such as one or more of the following: 1) the time delay between opening (alarm) and closing (restore), 2) the time of day the sensor sends various information, 3) the interrelationship and relative timing or order between two or more sensors tripping, 4) the minimum time between any two trips of a sensor (e.g., the fact that most wireless motions "lock out" for 3 minutes after any trip, could be used in guessing the sensor is a motion sensor), and/or 5) the state of various status bits in the transmissions may also give clues to the exact type of sensor (e.g., some sensors may default certain unused bits a certain way).

FIGS. 10B-C are conceptual diagrams of the example system 1002 passively detecting and enrolling various preexisting wireless sensors 1056-1062 that are part of a security system a home 1050. Although these figures refer to a preexisting security system in the home 1050, the system 1002 can be used to passively monitor for and enroll sensors from other types of systems within the home 1050. Additionally, the example security system is depicted as being configured to have the sensors 1056-1062 communicate over a closed wireless environment. The system 1002 can be used to detect and enroll sensors both within and outside of closed wireless environments, and to additionally enroll sensors through active monitoring, such as during an active enrollment period.

Referring to FIG. 10B, which generally depicts discovery of wireless sensors, the example and simplified home 1050 includes four different rooms 1052a-d that each include different sensors, such as motion sensors 1056a-d, smoke/heat/air sensors 1058a-b, window sensors 1060a-c, and a door sensor 1062. Additional and/or alternative sensors are also possible. These sensors are part of a closed wireless communication environment in which the sensors 1056-1062 communicate observed information (e.g., door open/close, motion) wirelessly to the security system panel 1054 using closed wireless communication, as indicated by step A (1064). The closed wireless communication can be, for example, communication in which the sensors 1056-1062 transmit over a common wireless channel without broadcasting the SSID, the MAC address, and/or other details relevant for listeners outside closed wireless communication network (e.g., the sensors 1056-1062 and the security system panel 1054) to understand the context of the wireless transmissions. The sensors 1056-1062 and the security system panel 1054 can be preconfigured to communicate with each other across a common closed wireless communication channel, such as being preprogrammed by the manufacturer and/or installer to communicate in this way.

The closed wireless communication (step A, 1064) can include, for example, a stream of wireless communications from the sensors 1056-1062 at various intervals of time depending on the type of sensor. For example, the motion sensors 1056a-d may transmit wireless signals whenever motion is detected and, thus, may provide transmissions at irregular intervals of time. Similarly, the window and door sensors 1060-1062 may transmit wireless signals at regular intervals when a window door is open (e.g., transmit wireless signal every 10 second while the window/door is open) and a wireless signal whenever the door or window subsequently closes. The smoke/air sensors 1058a-b can transmit wireless signals indicating when smoke and/or other potentially harmful air conditions are detected. The sensors 1056-1062 may additionally transmit status signals at regular intervals of time outside of particular events being detected (e.g., motion, door open/close events, smoke detected events) to confirm with the security system panel 1054 that they are powered and functioning properly. The sensors 1056-1062 and the security system panel 1054 can be preprogrammed to communicate using common wireless protocols and data encoding techniques so that the communication from the sensors 1056-1062 are properly received and interpreted by the security system panel 1054.

The application computing system 1002 and its wireless transceiver 1007 can be positioned within the home 1050 to detect the closed wireless communications from the sensors 1056-1062 through passive monitoring of the wireless communication, as indicated by step B (1066). The sensors 1056-1062, their type, and their locations throughout the home 1050 can be unknown to the system 1002. The passive wireless monitoring can include, for example, monitoring wireless transmissions across multiple different wireless channels, identifying wireless packets that are transmitted, and recording wireless packet transmissions, along with timestamps for their occurrence. These wireless packets can be recorded over a period of time (e.g., 102 hours, one day, one week, one month) so as to provide a good sample size of wireless transmissions for the wireless environment from which information about the sensors 1056-1062 can be passively inferred (as opposed to being directly determined, such as through a direct/formal enrollment process with the sensors 1056-1062).

As indicated by step C (1068), the system 1002 can use the detected wireless communications over a period of time to determine the likely type for the preexisting sensors 1056-1062 in the home 1050. For example, the system 1002 can apply the discovery rule set 1008 to the wireless communications to identify wireless communications that indicate the sensor type of the sensor transmitting the communication. Applying the rule set can include, for example, identifying particular wireless transmissions and/or patterns of wireless transmissions that indicate the sensor as being a particular type of sensor. Inferences made based on the discovery rule set 1008 can be made in any of a variety of ways, such as applying tags to particular detected sensors based on particular rules being satisfied and/or using a scoring scheme in which scores are applied and aggregated for sensors across rules being satisfied, and then aggregated scores are evaluated against sensor-type thresholds to determine whether the sensor is likely a particular type. As discussed above, the sensor determination can include not only determining the likely type of sensor, but also other sensor attributes (e.g., perimeter sensor vs. interior sensor, sensor for main entrance vs. secondary entrance).

As indicated by step D (1070), the system 1002 can additionally identify the likely physical relationship among the preexisting sensors. For example, the system 1002 can evaluate the relative timing of various wireless transmissions by the sensors to infer the physical proximity of sensors to each other. Using the recorded timestamps of detected wireless packets, the system 1002 can identify various sensor events that occur in close proximity in time, which can be used to infer physical proximity. The repeated presence of particular patterns of sensor transmissions over time can increase the likelihood that two or more sensors are located near each other within the home 1050. For instance, when a user enters the home, the door sensor 1062 will transmit an open door signal and, shortly thereafter, the motion sensor 1056*d* in the room 1052*d* into which a door monitored by the door sensor 1062 enters will transmit a motion signal. The repeated occurrence of wireless signals being transmitted close in time by the door sensor 1062 and the nearby motion sensor 1056*d* can indicate that these two sensors are located near each other in the home 1050. The system 1002 can identify temporal patterns of sensor transmissions within the home 1050 during an observation period to infer the relative physical layout of sensors within the home 1050.

With the likely sensor types and the likely physical relationship (proximity) of the sensors identified, the system 1002 can output these determinations, as indicated by step E (1072). For example, the system 1002 can output example likely sensor types 1074 and example likely sensor relationships 1076. Although the likely sensor types 1074 are indicated as being one likely sensor type for each detected sensor, sensors may have more than one detected likely sensor type. The sensor relationships 1076 depict groupings of sensors that are determined to be physically near each other, along with other location/relationship information, such as some sensors being perimeter sensors and other sensors being interior sensors. The information 1074-1076 can be output, for example, to the user 1018.

Referring to FIG. 10C, which generally depicts passively enrolling and using preexisting sensors with the system 1002, the user may be prompted by the system 1002 to perform various actions that can be used by the system 1002 to further confirm various hypothesis about sensor type and/or location, as indicated by step F (1078). For example, the system 1002 can output a series of prompts for the user to open the front door and then to open the back door in the home 1050, and then can proceed to monitor the wireless communication (step A, 1064) to detect sensor activity that can be correlated to the locations requested by the system 1002. The system 1002 may prompt the user to perform actions when, for example, there is not a sufficient amount of wireless sensor data to differentiate between multiple hypotheses regarding sensor type, location, and/or other sensor information. System 1002 may not always provide prompts to the user.

Once the system 1002 has obtained sufficient sensor information to arrive at a set of sensor hypotheses for the sensors 1056-1062 within the home 1050, the system 1002 can prompt the user to confirm the inferred sensor types and/or locations, as indicated by step G (1080). The user confirmation can cause the system 1002 to passively enroll the sensors 1056-1062 from the closed wireless communication environment with the system 1002, as indicated by step H (1082). Passive enrollment is different from active enrollment in that, with passive enrollment, the entire enrollment process has been through passive monitoring of wireless sensor transmissions. In contrast, during active enrollment, the sensor would enter an enrollment mode during which it at least identifies itself to the system/device enrolling the sensor and then confirms its enrollment by transmitting/outputting some sort of confirmation of enrollment (e.g., transmit a shared secret between the sensor and the enrolling device). However, with passive enrollment, the system 1002 enrolls the sensors 1058-1062 without any of these steps being available to the system 1002—meaning no enrollment mode being entered for the sensors, no transmission of sensor identity (or other wireless sensor transmission information, such as transmission protocols, data encodings), and no confirmation of enrollment between the sensors 1058-1062 and the system 1002. Enrollment means that the system 1002 knows the identify and parameters for the sensors 1058-1062 (e.g., sensor type, sensor proximity to other sensors), and continually monitors for and interprets wireless transmissions from the sensors 1058-1062 to detect events that are occurring within the home 1050, such as the door being open or closed, a person being located in various rooms 1052*a-d* of the home 1050, and/or emergency situations (e.g., smoke detected in the home).

For example, after enrolling the sensors, the system 1002 can use the enrollment information to continue to passively monitor wireless communications from the enrolled sensors, as indicated by step I (1084). The system 1002 can interpret the sensor communications using the enrollment parameters for the sensors, as indicated by step J (1086). For example, once the system 1002 has identified the sensors 1056*a-d* as motion sensors, the system 1002 can interpret subsequent detected wireless transmissions from theses sensors as motion-related activity within the home 1050. The information on the enrolled sensors that is used by the system 1002 to perform steps I and J can be stored in 1010 and 1011, as described above in FIG. 10A.

The system 1002 can use and/or transmit home information (e.g., events within the home, such as doors being opened, people being present within particular rooms, emergency conditions) that has been determined from monitoring wireless transmissions from the enrolled sensors, as indicated by step K (1088). For example, the system 1002 may provide one or more services locally within the home 1050, such as home automation services, and can use the determined home information to automatically determine various home automation actions to perform, such as closing/opening automated windows, automatically turning lights on/off, automatically locking doors, and/or other home automation techniques. In another example, the system 1002 may transmit information to a remote computer system 1090 (e.g., cloud-based computer system) that obtains home information and provides services to the user 1018, such as home monitoring and/or security services to the user 1018. In some instances, the computer system 1090 may be a hub of home information that makes the home information available to various systems and/or services that use the home information and that are authorized by the user 1018. So instead of each system/service needing to have its own sensor array within the home 1050, the computer system 1002 and the system 1090 can make the home information available to a broader collection of services and/or systems that can leverage the information. The home information can be provided to the computer system 1090 in real time, which can permit services and/or systems using the information to have information on the current state of the home 1050 and to provide appropriate corresponding processing. In another example, the system 1002 can provide the home information directly to the user 1018, such as through a user interface that is part of the system 1002 (e.g., the user interface device 1016) and/or by transmitting the home information to another user computing device (e.g., smartphone, wearable device).

Although the example depicted in FIGS. 10B-C includes a single security system from which the system 1002 is enrolling sensors, the system 1002 can passively enroll sensors from multiple different systems within the home 1050. For example, the system 1002 may passively enroll sensors from both a home security system and from a home automation system within the home 1050. Additionally, the system 1002 can passively enroll sensors from both closed and open wireless communication networks. Although the system 1002 is presented as being used in the home 1050, it can be used in other environments, such as businesses, multi-tenant units (e.g., condos, apartments), extended range sensor environments (e.g., indoor/outdoor sensor systems, such as at an entertainment park), and/or other environments.

Additionally, although the enrollment process (steps B-H, 1066-1082) is depicted as being concluded after step H (1082), it can continually be performed by the system 1002 while using the enrolled sensor information (steps I-K, 1084-1088). For example, while performing steps I-K the system 1002 can continually perform steps B-H to identify new sensors and/or changes to the sensor arrangement within the home 1050, and to further refine/improve upon the enrolled sensor information.

The system 1002 and the closed security system depicted in FIGS. 10B-C can be different from each other and/or part of the same system. For example, the system 1002 can run in parallel to and be separate from the closed security system. In another example, the system 1002 can be part of the closed security system and the steps A-K can be part of the home wireless learning process for setting up a new closed security system. In another example, the system 1002 can be the new security system for the home 1050 and the closed security system can be an old system for the home 1050 that no longer exists or is no longer active. Other configurations are also possible.

FIG. 11 is a flowchart of an example technique 1100 for automatically connecting a wireless system to sensors, such as existing sensors. At least some portions of this technique include wireless discovery, which can be used in combination by the example devices, systems, and techniques described above with regard to FIGS. 1-9. The example technique 1100 can be performed, for example, by the system 1002, as described above.

The wireless energy can be detected and evaluated (1102), and wireless parameters and/or protocols can be determined (1104). For example, the system 1002 can discern the frequency band of detected wireless signals, the modulation method and parameters, and discern from that the particular protocols predominant at the location (e.g., in the home). The sensor manufacturer can be determined (1106). For example, from one or more of the frequency band, modulation method and parameters, particular protocols, and/or other information/wireless characteristics, the system 1002 can determine the sensor manufacturer.

Local sensors—meaning sensors that are being used at the vicinity (e.g., house, building, location) where the wireless systems is installed—can be differentiated from sensors at neighboring vicinities (e.g., neighboring house, building, or unit) (1108). For example, the system 1002 can discover more than one protocol being used in the vicinity. The system can then survey the relative signal strengths of the populations of protocol 1 and protocol 2 sensors, and may conclude that the lower signal strength sensors are from a neighboring house and should generally be ignored. The example system can may even postulate that a neighboring house has the same protocol sensors, but by evaluating and comparing their signal strengths, can determine that those significantly lower signal strengths are from neighbors' sensors and not from the local vicinity.

Sensor IDs and/or types can be determined (1110). For example, using the protocol information for the detected sensors, the system 1002 can start looking at the next layer of information, such as evaluating supervisory check-ins over a period of time (e.g., several hours) to make a listing of the sensor IDs at the vicinity. For instance, since sensors generally send an hourly supervisory check-in, within several hours, the system should know what sensors it can hear well, and can make a confident listing of the sensor IDs in the house. Part of this monitoring and evaluation can also include examining whether the sensor protocol sends device types, which can be catalogued as well. In the absence of device types, the system can start evaluating what the device types might be based on detected patterns. For example, a sensor that closes about 5 seconds after opening might be a door/window sensor. A sensor that closes a split second after it alarms (or never closes at all) might be a motion sensor. If that same sensor has never alarmed twice closer than 3 minutes apart, it is a good guess it's a motion sensor. The example system from FIG. 10A can include a variety patterns that are associated with particular types of sensors, which can guide the evaluation and determination of the device type.

The locations where sensors are placed within the vicinity can be determined (1112). For instance, the system 1002 can evaluate where the sensors are placed, again, based on detected patterns for the particular sensors and/or patterns across multiple sensors. For example, if a sensor is the first one to trip in a series of sensor trips, and the delay between open and close is about 30-60 seconds, it might be the garage door. The next trip might be the garage entry and the following trip might be the motion. Again, the system 1002 can include a variety patterns that are associated with particular sensor locations (absolute and/or relative to each other).

The steps 1102-1112 may be performed across a number of living-experience-days before the system has converged on a determination of the house's likely sensor configuration. Once the system has converged on a solution (e.g., the determined sensor configuration has not deviated more than a threshold amount over a recent period of time, such as an hour, 6 hours, 12 hours, one day), a set-up wizard session can be initiated with the user based on the determined sensor configuration (1114). Such an example set-up wizard can include one or more of the following questions. In a first example, the setup wizard can ask a question along the lines of, "When you come home, you seem to trip the following three sensors: <sensor_A>, <sensor_B>, and <sensor_C>, Might these be the garage door, the garage entry, and kitchen motion detectors?" In another example, the setup wizard can ask a question along the lines of, "These three sensors <sensor_X>, <sensor_Y>, and <sensor_Z> never seem to open, might they be windows?" If the user answers affirmatively in this case, the setup wizard can ask a question along the lines of "Could you please open and close all the windows that have sensors on them? And once you've done that, come back and name them in the same order." In another example, the setup wizard can send a text to the homeowner's phone along the lines of, "You just tripped a sensor. What would you like to call that sensor?"

In some implementations, the system may be able to proceed without the set-up wizard and/or may only perform the set-up wizard when irreconcilable inconsistencies are present in the sensor configuration after a threshold period of time (e.g., several days, one week).

Systems and services outside of security could see value in the information from security sensors. As such, it may not be necessary that the sensors be immediately, or even perfectly configured into the non-security system. It can be tractable for the security sensors to be incorporated gradually over time, as the non-security system learns the security sensors. The system can figure out as much as it can in the background and, if appropriate, can ask a user (e.g., the homeowner) the smallest possible set of configuration information in finalizing the system configuration.

FIG. 12 is a flow chart of an example process 1200 for evaluating packets. For example, packets from sensors can be evaluated as part of an anti-spoofing procedure. Anti-spoofing procedures can be important, for example, because in the security industry there can be multiple unencrypted wireless sensors in a customer's installation. Malicious actors involved in spoofing may use various techniques such as recording sensor traffic using a wireless receiver (e.g., using a vehicle in proximity to the security system) and playing back (or "spoofing") sensor traffic. A malicious action based on these and/or other techniques can be used, for example, to spoof a key fob disarm message, thereby disarming the system. In another example, malicious actors can repeatedly spoof a door or motion sensor message, thereby causing a system to produce multiple false alarms. This could potentially cause a homeowner to have their security system removed, or at the very least stop arming it.

In the case of a dealer installing a translator, various anti-spoofing techniques can be used. For example, a translator typically listens to the sensors on a first protocol and translates information into a second protocol. If the second protocol is encrypted, then the translator has full control of what incoming packets make it to the panel. While there are obvious primary identifiers that can be used for the sensor (e.g., the transmitted ID and device type), there are also secondary identifiers that can be used to verify the identity of the sensor. Secondary identifiers can include, for example, an RF center frequency, a modulation data rate, a modulation depth or amplitude, an RF signal strength, and packet timing characteristics. These secondary identifiers are much more difficult to spoof. Taken as a whole, identifiers can be used to verify that a sensor is an enrolled sensor, and that real transmissions are being received as opposed to spoofed transmissions. If it is determined that a received transmission is a spoof, then the transmission can be ignored.

The process 1200 can begin, for example, when wireless characteristics of each sensor are learned (1202). For example, the ACS 1002 can learn characteristics of the wireless sensors 1004.

An anti-spoofing evaluation of the sensors is completed before any translation and rebroadcast of packets from the sensors is allowed to occur (1204). The ACS 1002, for example, can evaluate each of the wireless sensors 1004 before any transmissions received from the wireless sensors 1004 are used.

A decision is made between translating a packet and ignoring the packet based on the anti-spoofing evaluation (1206). For example, the ACS 1002 can decide, based on the evaluation, whether to translate or ignore a packet received from the wireless sensors 1004. Packets determined to be genuine are translated (1208). Packets determined to be spoofed are ignored (1210).

FIG. 13A is a block diagram of an example environment 1300 for translating protocol. For example, the environment 1300 includes a universal translator device 1302 that can translate multiple protocols 1303*a* and 1303*b*-1303*n* (e.g., Protocols #1, #2, . . . #3, respectively) to multiple protocols 1305 (e.g., Protocols #1, #2, . . . #3)—providing universal translation across a plurality of different protocols so that any combination of protocols could be translated between each other. This includes translating between protocols with mismatched features, such as translating between a first protocol that includes device types and a second protocol that does not include device types, and translating between a third protocol that uses a single packet to represent an event and a fourth protocol that uses multiple packets to represent the same event. In some implementations, the protocols 1303*a* and 1303*b*-1303*n* can be included as sensor-transmitter options 1304, such as on a dial (e.g., a "translate FROM" setting) of a translator that is being installed. In some implementations, the protocols 1305 can be included as system control panel options 1306, such as on a dial (e.g., a "translate TO" setting) of the translator that is being installed.

The universal translator device 1302 can include a variety of features described throughout this document, including combinations and subcombinations of the features described in FIGS. 1-12 and 14-22. For example, the universal translator device 1302 can translate among multiple different protocols by using a universal/intermediate protocol into which an incoming packet is translated and then from which the outgoing packet is translated. For example, the universal translator device 1302 can translate from a first protocol into the universal/intermediate protocol and then from the universal/intermediate protocol into a second protocol. The universal/intermediate protocol can provide a variety of advantages, including efficiently providing a system that can translate between multiple different protocol without requiring specific protocol-to-protocol mappings. For example, if the universal translator device 1302 translates among 5 different protocols, then the universal translator device 1302 would conventionally need 25 protocol-to-protocol mappings to allow for universal translation (translation in every protocol combination). In contrast, by using a universal/intermediate protocol, the universal translator device 1302 permits for universal translation with only 5 protocol-to-protocol mappings where each mapping is a mapping from each protocol to the universal/intermediate protocol. By minimizing the number of mappings that the universal translator device 1302 needs to store and be programmed to use, the storage requirements for the universal translator device 1302 are minimized and the processing requirements for the universal translator device 1302 are reduced. Additionally, fewer mappings reduces complexity for the universal translator device 1302.

FIGS. 13B and 13C illustrate two different example packet, or data, protocols that may be used by a wireless security system, such by the translator devices and systems described throughout this document. Protocol #1 shown in FIG. 13B is described in part in U.S. Pat. No. 5,801,626 to Addy, and Protocol #2 shown in FIG. 13C is described in part in U.S. Pat. No. 4,855,713 to Brunius. The charts of FIGS. 13B and 13C show the order and nature of the bits of data that are sent in a data packet. Protocol #1 is a 64-bit packet, whereas Protocol #2 is a 59-bit packet. The example Protocol #1 and Protocol #2 are examples of the multiple protocols that the translator devices and systems described throughout this document, such as the universal translator device 1302, can translated between.

The data packet protocol in FIG. 13B may be referenced, for illustration purposes, as an existing system protocol that a universal translator translates into another protocol, such as data packet protocol in FIG. 13C, which may be referenced as an expansion system protocol. As such, and referring to FIG. 13A, the existing sensor-transmitters 1304 may use the Protocol #1 of FIG. 13B, and the system control device 1306 may use the Protocol #2 of the FIG. 13C. That said, it will be appreciated that Protocol #2 may be the protocol used by the existing system-sensors, and Protocol #1 is the expansion protocol used by the new system control device and new sensors that may be implemented in the system. In addition, the two protocols may simply both be used in a new system being installed.

Referring to FIG. 13B, Protocol #1 is a 64 bit protocol, and starts with 16 introductory bits that may be referred to as training bits so the receiver sees that a message is coming (bits B0 through B15). The introductory bits include one pre-start bit (B0), 14 synchronization bits (B1-B14), and one start bit (B15). The synchronization bits have a predefined pattern and may be used to allow a receiver (for example, a system control device) to synchronize its detection capabilities with the timing of the transmission so that the information provided later in the data packet can be accurately and reliably detected. These synchronization bits may also be used to give the receiver time to settle its AGC (automatic gain control) and antenna switching activities in preparation for the data bits to come. Bits B16-B39 provide a unique identifier code for the particular sensor-transmitter device, or in other words, a device ID code. These numbers may be randomly assigned at a factory (with $1 \times 2^{24}$ different numbers possible), with the idea being that it is extremely unlikely that two sensor-transmitters with the same identity code will be distributed by the manufacturer for installation in or near the same wireless security system installation, and hence, every sensor-transmitter in a given system will have a unique identifier code that distinguishes it from the identifier codes of the other sensor-transmitters in the system and any sensor-transmitters used in any neighboring systems.

In some cases, a manufacturer may not utilize all possibilities of identity codes (that is, all of the $1 \times 2^{24}$ different ID codes) for fielded systems. For example, some ID codes (or ranges of ID codes) may be reserved for future use, testing, or some other reason. There may also be restrictions in certain alarm panels (system control devices) on acceptable or valid ID codes, and as such, an integration device may need to be aware of this. For example, if an integration device blindly translates an ID code for a sensor-transmitter (for example, a Protocol #1 sensor-transmitter) into another format (for example, Protocol #2), the integration device may translate the ID code (for example, for a Protocol #1 sensor-transmitter) to a rejected ID code on that panel (for example, a panel that is designed to communicate using Protocol #2), and thus would be rejected by the control panel. Accordingly, in these cases the integration device may check for these cases and ensure that all transmitted IDs in Protocol #2 are valid ID codes that will be received by a Protocol #2 control panel.

It also deserves mention that while some protocols have device type indicator bits, Protocol #1 shown in FIG. 13B does not, on its face, utilize a device type indicator. Typical device types may be, for example, a door-window sensor, a smoke sensor, a key fob device, etc. Device type information may useful to the system control device, so that the system control device is able to interpret the sensor state information unique to that device type provided by a particular sensor-transmitter, and react appropriately. Although the identity code information would not appear to utilize a device type indicator, it may be in some cases that the assignment of identity codes is not entirely random, and that certain sets of identity codes (ranges of ID codes, for example) may be put only in a certain type of sensor-transmitter. In such a case, the 24-bit identity code may contain sensor type information that a system control device would interpret as such (for example, because the ID code is within a range specifically for the particular device type).

Protocol #1 includes eight sensor state information bits (B40-B47). This group of bits provides information about the sensor and sensed conditions made by the sensor. The first four of these bits (B40-B43) are state bits for particular pins that may be in the sensor device and connected to a sensing point. For example, one pin may be connected to a reed switch that is able to detect if a door or window is open or closed. In other words, if the door is open (and the reed switch is normally closed when the door is closed), the pin would be high (and the bit would be 1), whereas the pin would be low when the door is closed (and the bit would be 0). Another pin may be tied to a tamper switch, intended to detect a situation wherein someone is trying to destroy or open up a sensor housing to disable the sensing and transmitting components. Another pin may be tied, for example, to external contacts provided on the sensor-transmitter housing. For example, a single sensor-transmitter may have a built-in reed switch monitoring a door, and its external contact may be wired to another reed switch that monitors a nearby window, for example. Not all the pins for which state information is provided need be used. Indeed, it is often the case that one or more of the pins are configured so that they are not used, and are always a 1 (tied high) or always a 0 (tied low), for example.

The next sensor state information bit B44 is a low-battery indicator. As described previously, the sensor-transmitters may be battery operated, and this information may be provided so as to inform a facility operator, for example a homeowner, and/or a monitoring company that a battery of a particular one of the sensor-transmitters needs to be replaced. A one (1) being transmitted for this bit may indicate, for example, that the battery is low. The next bit B45 is a supervisory bit, which indicates, for example, that the transmission is one that is a periodic "checking in," or supervisory transmission, instead of a transmission that was prompted by a state change. Each of the sensor-transmitters may provide a supervisory transmission periodically, for example, every half hour or so, or other periodic intervals.

The next state information bit B47 is a power-up indicator, which indicates that the sensor-transmitter has just powered up, for example, a battery has just been put in the sensor-transmitter, and this is the first transmission being made by the sensor-transmitter. A power-up transmission may be used, for example, in the enrollment process in which sensors to be used with a security system are enrolled into a system control device, as will be explained in more detail later. The last bit B47 of the sensor state information is a bit that indicates that the sensor-transmitter has supervisory transmission capability, given that some-sensor transmitters may be configured so that they do not make frequent supervisory transmissions, which may be desirable to save battery power. In addition, sensors that are taken off-site are typically not supervised. This may include key fobs, for example.

The final 16 bits are error checking bits, which may be, for example, a cyclical redundancy check (CRC). These bits provide information to ensure that all of the preceding bits were received and detected accurately as a one or a zero, as the case may be. If there is a discrepancy, a received packet may be ignored, and the next received packet will be used instead.

In operation, a sensor-transmitter using protocol #1 may make a transmission immediately following the occurrence of a state change, for example, a door has opened, thus changing the state of a corresponding reed switch, and the state of a pin tied to that reed switch. The transmission may be done in two sets of five redundant transmissions of the entire data packet of 64 bits. For example, upon a door opening, a sensor-transmitter may send a first set of five identical packets of 64 bits each in rapid succession, followed by a pause, and then a second set of five of the same identical packets. Thus, in total, a transmission corresponding to a state change may trigger the sending of ten identical, redundant packets. This redundancy accounts for the fact that multiple different sensor-transmitters may be in the environment transmitting at the same time, and so there may be collisions of those transmissions that prevent data from being received and interpreted properly. In one manner in which this protocol may be utilized in practice, once a particular data packet configuration is determined, all 10 subsequent transmissions will be the same, and will not be interrupted despite that a change in state may have occurred during the course of the 10 packets being transmitted.

A supervisory transmission sequence may consist of only one set of five redundant packets sent in rapid succession, in that it may not be important that any one supervisory transmission be missed. Although half the number of packets as set when there is a change of state, the operation for supervisory transmissions is similar in that all five packets are sent with the same packet information, despite that state information may have changed during the course of transmitting all five of these identical packets.

Referring now to FIG. 13C, Protocol #2 is a 59-bit protocol, and starts with 16 introductory bits of data (bits B0 through B15). The introductory bits include 15 synchronization bits (B0-B14), and one start bit (B15). As with Protocol #1, the synchronization bits of Protocol #2 are provided in a predefined pattern and may allow the receiver (system control device, for example) to synchronize its detection capabilities with the timing of the transmission so that the information provided later in the data packet can be accurately and reliably detected, and/or give the receiver time to settle its AGC and antenna switching activities in preparation for the data bits to come.

The next set of bits B16-B35 provide a unique identifier code for the particular sensor-transmitter device. As with Protocol #1, these identifier code numbers may be randomly assigned at a factory (with $1 \times 2^{20}$ different numbers possible for this protocol), with the idea being again that it is extremely unlikely that two sensor-transmitters with the same identity code will be distributed by the manufacturer for installation in or near the same wireless security system installation. As such, every sensor-transmitter in a given system will have a unique identifier code that distinguishes it from the identifier codes of the other sensor-transmitters in the system and any sensor-transmitters used in any neighboring systems.

Bits B36-B39 in Protocol #2 are a four-bit device type indicator. Typical device types may be, for example, a door-window sensor, a smoke sensor, a key fob device, etc. Sixteen different device types are possible with protocol #2, owing to the fact that four bits define the device type. Device type information may need to be known by the system control device 106, so that the system control device 106 is able to interpret the sensor state information provided by a particular sensor-transmitter. For example, in one device type, an external contact switch may be associated with certain sensor state information bit (for example, bits B50-B51), whereas in a different device type, those bits may be unused. In another example, the interpretation of a key fob may be programmed to be completely different than a door-window sensor; for example, the key fob can arm/disarm the security system while the door-window sensor does not typically have this ability.

The next set of three bits (B40-B42) are packet count bits. These bits increment on each packet that is transmitted. This allows a receiver to determine if a packet was missed, or that the receiver is receiving a duplicate transmission of a set of eight packets and thus the transmission can be ignored.

Protocol #2 includes twelve sensor state information bits (B43-B54), four more than Protocol #1. This group of bits in Protocol #2 provides information about the sensor and sensed conditions of the sensor as is the case with the eight sensor state information bits from Protocol #1, but the nature of the state information is quite different between the two protocols. For example, Protocol #1 provides information about the recent past (a latch state) in addition to the currently existing state of the sensor.

The sensor state information bits of Protocol #2 begin with a low battery indicator bit (B43), similar to bit B44 from Protocol #1. The remaining 11 bits (B44-B54) of the sensor state information for Protocol #2 provides state and latch information for five separate channels F1 to F5. These five channels are similar to the pins in Protocol #1, and may be tied to one or two reed switches, an external switch, a tamper switch, etc. The F3 channel may be tied to a tamper switch in all device types. Not all of the channels need to be used with every sensor-transmitter.

A state bit for a channel indicates the current state for a particular channel. For example, if a reed switch for a door tied to channel F1 indicates that the door is currently closed, the state bit for F1 (B44) will have a value that indicates a closed state for the door. A latch bit for a channel reflects a latch having been set associated with the channel going into a state that may in some cases be an alarm condition, such as the opening of the door. Thus, if a door associated with channel F1 is opened, state bit B44 will have a value that indicates the state of the door is open, and the latch bit B45 will have a value that indicates the door has been recently opened (for example, a value of one). The opening of the door sets the latch regardless of whether the opening of the door is an alarm condition or not. That is because if the system control device has been armed, the opening of the door will be considered an alarm, but if the system is not armed, the opening of the door will not be considered to be an alarm. The door sensor-transmitter does not know, however, whether the system is armed or not; hence, the latch is set whenever the door is opened.

The opening of the door initiates the transmission of multiple 59-bit data packets in rapid succession, as with Protocol #1. In particular, a counter device of the sensor-transmitter may be set to eight, and is decremented by one as each packet is sent, and so assuming the opened door is not immediately closed again, the opening of the door will cause eight 59-bit packets to be sent in rapid succession. The latch is reset (from 1 to 0, for example) when the packet counter decrements zero.

If, before the packet counter device decrements all the way to zero, the opened door is then closed, the counter in the sensor-transmitter will be reset to eight again, so that a full complement of eight packets are sent for the newly closed condition of the door. The latch bit will remain set (for example, with a value of one) reflective of the fact that the door was recently opened, because as mentioned, the latch bit does not reset (to a zero value, for example) until the transmission counter device decrements all the way to zero. If the open door, instead of being closed again before eight packets are sent, instead is closed only after all of the eight packets are sent, and the latch bit is reset to zero, then the change of state of the door (that is, the closing of the door) still initiates a new set of eight 59-bit packets. In this case, however, the latch bit is not set to one, because the closing of a door is not a condition that is indicative of an alarm condition.

As shown in FIG. 13C, each of the first four channels F1 to F4 has a state bit and a single latch bit. That is because each of these channels is associated with a normally closed contact. The fifth and final channel F5 has a state bit and two complementary latch bits, a positive latch bit (B52) and a negative latch bit (B52). That is because this channel F5 is associated with an external contact that may have a normally closed contact or a normally open contact. In that a normally closed contact will want its latch set upon the contact being opened (an alarm condition), the positive latch and associated latch bit B53 serves that purpose. In that a normally open contact will want its latch set upon the contact being closed (an alarm condition), the negative latch and negative latch bit B52 serves that purpose.

The next three bits (B55-57) of Protocol #2 are parity bits for error checking on the bits sent in the preceding bits of information. The final bit (B58) for Protocol #2 is a stop bit.

FIG. 14 is a diagram of an example box 1400 for the universal translator device 1302 of FIG. 13A. The box 1400 includes a door 1402 which, when open (such as during installation of the translator), permits particular functionality, such as actions and/or operations that support identification of sensor types and setting up protocol translations.

FIG. 15 is a schematic diagram of an example translation configuration 1500 for the universal translator device 1302 of FIG. 13A. As shown, the universal translator device 1302 can translate signals 1501 received from sensors and can store sensor-state information 1502 (e.g., BC-1 through BC-n), including states 1504. As shown, the sensor-state information 1502 and the states 1504 can correspond to a single sensor or multiple sensors. Packet translation processing 1506, e.g., a firmware module within the universal translator device 1302, can use the sensor-state information 1502, including the states 1504, to generate transmissions 1508 (e.g., to be received at a control panel of a security system).

When an input changes or it is time to send a supervisory, a sensor transmits a message. Sensors typically transmit the same message multiple times. Each try is called a "packet." The translator receives packets from multiple sensors, and transmits the resulting translated packets out of its own transmitter, e.g., through a buffering process.

Buffering is required in the translator for at least the following reasons. 1) Packets can come in more quickly than they can be transmitted out. FCC rules limit the speed at which the packets can be transmitted by a sensor or translator. There must be 100 ms between packets. Because there are multiple sensors and only one translator, the translator can be a bottleneck. 2) Multiple different events can be received from a sensor and must be retransmitted in the correct order. 3) Packets from multiple sensors can be received in the same timeframe and must be handled properly. 4) The translator must transmit each sensor message multiple times, just like the sensors do.

The buffer in the translator is meant to handle many messages from many sensors. When a message is received from a sensor, the message is placed in the buffer for retransmission. The following table provides an example that includes 10 sensor buffers, with each buffer storing up to four different states for the sensor.

TABLE 2

Sensors and States

| Sensor 1 | State 1 |
| | State 2 |
| | State 3 |
| | State 4 |
| Sensor 2 | State 1 |
| | State 2 |
| | State 3 |
| | State 4 |
| Sensor 3 | State 1 |
| | State 2 |
| | State 3 |
| | State 4 |
| Sensor 4 | State 1 |
| | State 2 |
| | State 3 |
| | State 4 |
| Sensor 5 | State 1 |
| | State 2 |
| | State 3 |
| | State 4 |
| Sensor 6 | State 1 |
| | State 2 |
| | State 3 |
| | State 4 |
| Sensor 7 | State 1 |
| | State 2 |
| | State 3 |
| | State 4 |
| Sensor 8 | State 1 |
| | State 2 |
| | State 3 |
| | State 4 |
| Sensor 9 | State 1 |

TABLE 2-continued

Sensors and States

|  |  |
|---|---|
|  | State 2 |
|  | State 3 |
|  | State 4 |
| Sensor 10 | State 1 |
|  | State 2 |
|  | State 3 |
|  | State 4 |

Typically, more than one sensor will not need messages translated at the same time. However, it can be the case that many sensors trip at roughly the same time and need to be transmitted back out. Further, any given sensor may transmit multiple different states in succession. The translator can handle this by being able to store multiple sensors and multiple states for each in its buffer.

Assuming that four different sensors are activated multiple times in rapid succession, the following table shows the four sensors, and bolding is used to indicate states (e.g., Open, Close, Tampered) that are received by the translator:

TABLE 3

Sensors and Activated States

| Sensor 1 | Open |
|---|---|
|  | Close |
|  | State 3 |
|  | State 4 |
| Sensor 2 | Open |
|  | State 2 |
|  | State 3 |
|  | State 4 |
| Sensor 3 | Tampered |
|  | Open |
|  | Close |
|  | State 4 |
| Sensor 4 | Close |
|  | State 2 |
|  | State 3 |
|  | State 4 |

The translator in this case will transmit packets by hopping between the sensors. The translator will transmit multiple packets for each sensor/state combination. In this example, the translator will transmit in this order: Sensor 1—Open, Sensor 2—Open, Sensor 3—Tampered, Sensor 4—Close, Sensor 1—Open, Sensor 2—Open, and so on.

The translator will repeat this pattern until one of the sensor/state pairs has transmitted enough packets (e.g., typically eight). Then, that state for that sensor is complete, and the next state for that sensor begins transmission. If there are no further states for that sensor to be transmitted, then that buffer is freed up, and falls out of the transmit rotation.

When transmitting packets, the translator rotates between the sensors in its buffer because this limits latency as much as possible. The other alternative would be to first transmit all packets for Sensor 1, then all packets for Sensor 2, etc. But this would result in large latency for sensors further down the list.

Another challenge of buffering in a universal translator is the large number of protocol combinations possible. With five possible sensor protocols and five possible panel protocols, there are 25 possible pairs. The mappings between them become complicated and unwieldy. In order to simplify this, the translator can implement an algorithm whereby incoming sensor packets are converted to a common format, regardless of what protocol is received. This common format represents a superset of all characteristics that can be present in the incoming protocols. As a result, the complex firmware that places sensors and states in the buffer for transmission need only to be written only once for that common format. This makes the code much simpler to write, debug, and maintain. Further, this approach simplifies adding support for new protocols in the future, because the new protocols only need to be adapted to the common format. The complete buffering code does not need to be written for each.

FIG. 16A is a flowchart of an example process 1600 for buffer processing. The process 1600 can be executed, for example, by the universal translator device 1302.

A transmission from a wireless sensor-transmitter is received (1602). For example, the universal translator device 1302 can receive a transmission from a wireless sensor 1004.

A determination is made as to whether a buffer maintained by the translator already includes a message from the same sensor-transmitter (1604). If not, the universal translator device 1302, for example, can go to the first available buffer (1606). The universal translator device 1302, for example, can store a message for transmission in the buffer with state information (1608).

If the buffer maintained by the translator already includes a message from the same sensor-transmitter, then a determination is made as to whether the state of the received message already in the buffer is the same as the state identified in the received transmission (1610). If not, then the new state is included in the buffer (1612), such as indicated in Table 3 above. However, if the buffer maintained by the translator already includes a message from the same sensor-transmitter, then the received transmission can be determined to be a duplicate transmission, and the received transmission can be disregarded (1614). At this time, once the transmission is processed, the next transmission received by the translator can be processed, at step 1602.

FIG. 16B is a flowchart of an example process 1630 for message processing. The process 1630 can be executed, for example, by the universal translator device 1302.

A message stored in the buffer for one state is selected (1632). For example, the universal translator device 1302 can select one of the messages in the buffer represented by Table 3.

The message is translated from an original protocol (1634). For example, the message can be translated from Protocol #1 to an intermediate protocol (e.g., a superset protocol that includes capabilities of all know protocols).

The message in the intermediate protocol is translated to a protocol used by the control panel (1636). For example, the universal translator device 1302 can translate the message from the intermediate protocol into Protocol #2 used by the control panel.

The message is transmitted to the control panel using Protocol #2 (1638). For example, the universal translator device 1302 can transmit the translated message to the control panel of the security system.

FIG. 16C is a flowchart of an example process 1660 for buffer mapping. The process 1660 can be executed, for example, by the universal translator device 1302, such as to automatically skip over duplicate messages in the buffer for a certain sensor.

The first buffer channel is accessed (1662). The second buffer channel is accessed (1664). The Nth buffer channel is accessed (1666).

The message translation process 1630 of FIG. 16B is performed on the message buffer for one state (1668).

A determination is made as to whether the state is the only state in the buffer channel (1670). If not (a duplicate exists, or this is the first state), then the message is not processed, and the next state in the buffer is accessed (1672).

If a previous state exists, then the buffer channel is reset for the next new sensor transmission (1674). The next new buffer channel is accessed (1676).

Some sensor protocols allow the usage of more than one input per sensor. Sensor protocols can typically handle this by having multiple bits, each bit giving the state of one input. For example, a door/window sensor may allow three inputs—a reed switch and two external contacts.

In a translator, there is difficulty when translating from such a protocol to one that allows only one sensor input. One way to handle this is to simple "OR" the several inputs into the one outgoing bit. This can be done effectively if the usage of the bits on the incoming sensor protocol is strictly known. However, in some sensor protocols, different types of devices can use different inputs (e.g., mapping to different bits in the protocol), and unused bits on various types of devices may not be consistent in how they are defaulted. Since the translator may not know which type of device is being received, the translator does not have the information it needs to know how to handle the incoming bits. To simplify this problem, the limitation can be imposed to only allow usage of one input on the sensor. However, the translator still does not inherently know which input on the incoming sensor is being used. The net result of this is that the translator has no means of determining which bit from the incoming sensor packet to map into the outgoing protocol's one status bit.

The problem could possibly be solved with a user interface on the translator. For each sensor, the installer could be asked to specify the type or model of the sensor, and which input on the sensor is being used. This information could be used by the translator to know which bit to map into the outgoing protocol. However, such a user interface is expensive. Further, this type of solution places a burden on the installer, costing time and energy to input this information for each sensor in the system.

To solve this problem, the translator can use an adaptive scheme. The sensor is allowed to be enrolled into the translator by usual means. The installer is not required to give any special information. Post enrollment, the translator can observe the sensor behavior to determine which input is being used on the sensor. If a bit changes, indicating a transition of state on a given input, then the translator assumes that input is the one being used. The translator can store that fact in its memory and can observe that bit going forward.

Typically, the only reason for the translator cover to be open is when the installer is setting up the system. The translator can use this supposition to automatically enable two setup features when the cover is open.

The first feature is the transmission of "enrollable" packets to the panel upon reception of any packet from a sensor that is enrolled in the translator. Examples of "enrollable" packets are tamper packets, or multiple state changes in a short time, such as open-close-open. The translator can automatically synthesize information from these received packets and may also tailor the information for quicker and easier enrollment of sensors into the panel. For example, fewer packets received at a smaller spacing can lead to enrollment that is accomplished quickly. These techniques allow the installer to easily and quickly enroll sensors in the panel by simply tripping the sensor. Installers are not required to perform special enrollment actions at the sensor such as tamper or open-close-open. This can be helpful with already-installed sensors, because such sensors may be out of reach or hard to access. Once the cover is closed, the translator can go back to a direct translation of incoming sensor packets to outgoing packets.

The second feature is to require a certain signal strength or signal-to-noise ratio on a sensor reception in order to blink the "receive" LED and pass the signal forward. This can help to ensure the integrity of the installation and can make it easy for the installer to test the system by requiring some margin in the wireless link from the sensor to the translator. If that margin does not exist, then the enrollment transmissions are not passed on to the panel, and the sensor is not enrolled into the panel. Once the cover is closed, this requirement is dropped, and any sensor reception is translated regardless of signal strength.

FIG. 17 is a flow chart of an example process 1700 for enrollment with translator assistance. The process 1700 can be executed, for example, by the universal translator device 1302.

The control panel is placed in enrollment mode to enroll sensors (1702). For example, while the door 1402 is open on the universal translator device 1302, the installer can select a control to put the universal translator device 1302 in enrollment mode.

The assist device is placed in assist mode (e.g., door of assist device open) (1704). For example, while the door of an assist device is open, the installer can select a control to put the assist device in enrollment mode.

Triggered sensor transmission is received at the assist device when in assist mode (1706). For example, the universal translator device 1302 can receive a transmission from a sensor.

A special transmission is generated from the assist device to the control panel that triggers enrollment of the given transmission protocol of the control panel (1708). The assist device can send a message that indicates that the transmission is to be used in enrollment.

A determination is made as to whether the current sensor is the last sensor to be enrolled (1710). The universal translator device 1302 can determine is other sensors are to be enrolled. If so, then the process 1700 can resume at step 1702. If not, assist mode can be existed (e.g., by closing the door) (1712). Enroll mode for control panel can be exited (1714).

FIG. 18 is a flow chart of an example process 1800 for multi-input sensor enrollment with translator assistance. The process 1800 can be executed, for example, by the universal translator device 1302.

The device (control panel and/or translator) is placed in sensor enroll mode (1802). For example, one or both of the security device or the universal translator device 1302 can be placed in enrollment mode.

A transmission is received from the multi-input sensor for enrollment (1804). The universal translator device 1302, for example, can receive a transmission from a sensor.

The sensor info is enrolled into the device (1806). Information received from at universal translator device 1302 can be stored, e.g., to enroll the sensor.

Subsequent transmissions are evaluated for state changes to determine inputs(s) of sensor being utilized (1808). The universal translator device 1302, for example, can receive additional transmissions from the sensor, such as transmissions that indicate which bits are being used to communicated changes in state of the sensor.

The enrolled sensor is further configured in the device with information regarding the input(s) being utilized (1810). The universal translator device 1302, for example, can update the enrollment information for the sensor.

Certain setup features can be enabled only right after power-up. This can limit accidental entry into unwanted modes during normal operation, and can also give the installer convenient indications during his setup time. For example, during this time period, the system can allow configuration mode to be entered, enable automatic setup features when the cover is open, and suppress reporting of a low battery condition to the panel. The system can differentiate between a low battery and a missing battery, and also suppress the low battery but not the missing battery indication to the panel for the first 24 hours after power up. Doing so can allow time for a low battery to charge up but will warn an installer immediately if the battery is not connected.

In some implementations, added functionality can be used for "similar protocol" settings. For example, a Manufacturer 1 installation may be comprised of both wireless Manufacturer 1 and hardwire sensors. As such, a Manufacturer 1 to hardwire translator setting not only translates Manufacturer 1 sensors to hardwire format, but can also repeat hardwire sensors.

If a repeater is concurrent with a wireless translation device, then the repeater can also repeat whatever protocol is the "Panel Type" (or "TO") protocol. If a repeater is concurrent with hardwire translation, then the device can also repeat whatever protocol is the "Panel Type" (or "TO") protocol.

FIG. 19 is a flow chart of an example process 1900 for extending the battery life of a backup battery for a translator assistance. The process 1900 can be executed, for example, by the universal translator device 1302 and/or by the system 1002.

The device can detect that it has transitioned from operating using an external power source to using a battery backup (1902). The device and its peripheral devices can operate on the battery backup normally (meaning, without power being cut off to any peripheral devices) until the charge in the battery has been drawn down to or below a threshold level (1903). The current charge of the battery can be determined, for example, based on evaluating an amount of time that the battery has been supplying power for the system and/or by checking the remaining charge of the battery. In response to detecting that the battery has been drawn down to or below the threshold level, the device can power down interior powered sensors and devices (1904). For example, powered sensors and devices can draw power from the device, which may be required to operate off of backup battery power for at least a threshold period of time (e.g., at 4 hours).

In order to conserve power and extend the time period over which a charge on the backup battery will permit the device to operate and provide services (e.g., security monitoring, protocol translation for security devices and a security panel), the device can power down some of the devices that may, at that point in time, be less critical than others. For example, instead of operating (powering) all powered sensors and devices, the device can power down (turn off) interior sensors within a building (e.g., home) while continuing to power and monitor perimeter and exterior sensors and devices (1906). Once a breach in the perimeter is detected from the perimeter sensors, which may be contact sensors that draw little power, the device can transition to powering up the interior sensors (1908). For example, once the perimeter has been breached, as indicated by a perimeter sensor being tripped, then the status of the interior sensors can become critical and power can be allocated to those sensors/devices.

To ensure that powering the interior sensors/devices will not draw too much power from the battery, which may cause the backup battery to not meet its required minimum period of operation, the device can determine whether there is sufficient charge left in the backup battery to power on the internal sensors/devices (1910). Sufficient charge can be determined using any of a variety of techniques, such as comparing the charge remaining in the backup battery, the expected rate the charge will be drained from the battery, and the time remaining until the required minimum backup period of operation will expire. If the charge is not sufficient, then the device can continue to monitor the perimeter and exterior without powering up the interior sensors (1906). However, if there is sufficient charge, then the device can power up the interior sensors (1916) and can then monitor the perimeter, interior, and exterior of a building (1918).

FIG. 20 is a flow chart of an example process 2000 for automatically detecting hardwire configurations for hardwired sensors/devices. The process 2000 can be executed, for example, by the universal translator device 1302 and/or by the system 1002.

A particular hardwired sensor or device can be selected (2002) and power to the selected device can be dropped on the wires powering the selected device (2004). After dropping the power, the device can monitor for changes in the electrical behavior (e.g., voltage, current, and/or impedance) on the other wires for the selected device (2006). The device type for the selected device can be determined based on whether the voltage on these other wires changes and, if so, by how much (2008). The process 2000 can be used to determine, for example, whether the selected device is a powered device and/or an alarm device. For example, with a 4-wire connection with a sensor/device, 2 wires can provide power to the device and 2 can provide state information. When power is dropped on the 2 power wires, the change in the voltage on the other two wires can indicate the type of device/sensor that is connected, such as being used to differentiate between whether the device is powered and/or an alarm device.

FIG. 21 is a flow chart of an example process 2100 for automatically changing the mode of operation for a device after powering-up. The process 2100 can be executed, for example, by the universal translator device 1302 and/or by the system 1002.

The device can detect that it is being powered-up (from a powered-off state) (2102) and, in response to this detecting, can automatically transition to a special mode of operation that will persist for a period of time, which can be monitored by a timer that is started (2104). The special mode of operation can include, for example, an enrollment mode of operation during which enrollment sequences (e.g., open, close, open, close for a sensor) can be simulated and prioritized by the universal translator device 1302 instead of operating according in a normal mode, such as transmitting packets by rotating through buffers for multiple different sensors. The special mode of operation can persist for a period of time and, when the timer has expired (2106), the device can automatically transition back to the normal mode of operation (2108).

FIG. 22 is a block diagram of example computing devices 2200, 2250 that may be used to implement the systems and methods described in this document, as either a client or as a server or plurality of servers. Computing device 2200 is intended to represent various forms of digital computers, such as laptops, desktops, workstations, personal digital assistants, servers, blade servers, mainframes, and other appropriate computers. Computing device 2200 is further intended to represent any other typically non-mobile devices, such as televisions or other electronic devices with one or more processers embedded therein or attached thereto. Computing device 2250 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 2200 includes a processor 2202, memory 2204, a storage device 2206, a high-speed controller 2208 connecting to memory 2204 and high-speed expansion ports 2210, and a low-speed controller 2212 connecting to low-speed bus 2214 and storage device 2206. Each of the components 2202, 2204, 2206, 2208, 2210, and 2212, are interconnected using various busses, and may be mounted on a common motherboard or in other manners as appropriate. The processor 2202 can process instructions for execution within the computing device 2200, including instructions stored in the memory 2204 or on the storage device 2206 to display graphical information for a GUI on an external input/output device, such as display 2216 coupled to high-speed controller 2208. In other implementations, multiple processors and/or multiple buses may be used, as appropriate, along with multiple memories and types of memory. Also, multiple computing devices 2200 may be connected, with each device providing portions of the necessary operations (e.g., as a server bank, a group of blade servers, or a multi-processor system).

The memory 2204 stores information within the computing device 2200. In one implementation, the memory 2204 is a computer-readable medium. In one implementation, the memory 2204 is a volatile memory unit or units. In another implementation, the memory 2204 is a non-volatile memory unit or units.

The storage device 2206 is capable of providing mass storage for the computing device 2200. In one implementation, the storage device 2206 is a computer-readable medium. In various different implementations, the storage device 2206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2204, the storage device 2206, or memory on processor 2202.

The high-speed controller 2208 manages bandwidth-intensive operations for the computing device 2200, while the low-speed controller 2212 manages lower bandwidth-intensive operations. Such allocation of duties is an example only. In one implementation, the high-speed controller 2208 is coupled to memory 2204, display 2216 (e.g., through a graphics processor or accelerator), and to high-speed expansion ports 2210, which may accept various expansion cards (not shown). In the implementation, low-speed controller 2212 is coupled to storage device 2206 and low-speed bus 2214. The low-speed bus 2214 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 2200 may be implemented in a number of different forms and/or virtualized, as shown in the figure. For example, it may be implemented as a standard server 2220, or multiple times in a group of such servers. It may also be implemented as part of a rack server system 2224. In addition, it may be implemented in a personal computer such as a laptop computer 2222. Alternatively, components from computing device 2200 may be combined with other components in a mobile device (not shown), such as computing device 2250. Each of such devices may contain one or more of computing devices 2200, 2250, and an entire system may be made up of multiple computing devices 2200, 2250 communicating with each other.

Computing device 2250 includes a processor 2252, memory 2264, an input/output device such as a display 2254, a communication interface 2266, and a transceiver 2268, among other components. The computing device 2250 may also be provided with a storage device, such as a micro-drive or other device, to provide additional storage. Each of the components 2250, 2252, 2264, 2254, 2266, and 2268, are interconnected using various buses, and several of the components may be mounted on a common motherboard or in other manners as appropriate.

The processor 2252 can process instructions for execution within the computing device 2250, including instructions stored in the memory 2264. The processor may also include separate analog and digital processors. The processor may provide, for example, for coordination of the other components of the computing device 2250, such as control of user interfaces, applications run by computing device 2250, and wireless communication by computing device 2250.

Processor 2252 may communicate with a user through control interface 2258 and display interface 2256 coupled to a display 2254. The display 2254 may be, for example, a TFT LCD display or an OLED display, or other appropriate display technology. The display interface 2256 may comprise appropriate circuitry for driving the display 2254 to present graphical and other information to a user. The control interface 2258 may receive commands from a user and convert them for submission to the processor 2252. In addition, an external interface 2262 may be provided in communication with processor 2252, so as to enable near area communication of computing device 2250 with other devices. External interface 2262 may provide, for example, for wired communication (e.g., via a docking procedure) or for wireless communication (e.g., via Bluetooth® or other such technologies).

The memory 2264 stores information within the computing device 2250. In one implementation, the memory 2264 is a computer-readable medium. In one implementation, the memory 2264 is a volatile memory unit or units. In another implementation, the memory 2264 is a non-volatile memory unit or units. Expansion memory 2274 may also be provided and connected to computing device 2250 through expansion interface 2272, which may include, for example, a subscriber identification module (SIM) card interface. Such expansion memory 2274 may provide extra storage space for computing device 2250, or may also store applications or other information for computing device 2250. Specifically, expansion memory 2274 may include instructions to carry out or supplement the processes described above, and may include secure information also. Thus, for example, expansion memory 2274 may be provided as a security module for computing device 2250, and may be programmed with instructions that permit secure use of computing device 2250. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2264, expansion memory 2274, or memory on processor 2252.

Computing device 2250 may communicate wirelessly through communication interface 2266, which may include digital signal processing circuitry where necessary. Communication interface 2266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 2268 (e.g., a radio-frequency transceiver). In addition, short-range communication may occur, such as using a Bluetooth®, WiFi, or other such transceiver (not shown). In addition, GPS receiver module 2270 may provide additional wireless data to computing device 2250, which may be used as appropriate by applications running on computing device 2250.

Computing device 2250 may also communicate audibly using audio codec 2260, which may receive spoken information from a user and convert it to usable digital information. Audio codec 2260 may likewise generate audible sound for a user, such as through a speaker, e.g., in a handset of computing device 2250. Such sound may include sound from voice telephone calls, may include recorded sound (e.g., voice messages, music files, etc.) and may also include sound generated by applications operating on computing device 2250.

The computing device 2250 may be implemented in a number of different forms, as shown in the figure. For example, it may be implemented as a cellular telephone 2280. It may also be implemented as part of a smartphone 2282, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An assistance device for use with a security system, the assistance device comprising:
   a housing;
   at least one peripheral device interface configured to wirelessly communicate with one or more peripheral devices, the at least one peripheral device interface positioned within the housing;
   a processor configured to process data packets received at the at least one peripheral device interface from the one or more peripheral devices, the processor positioned within the housing and in communication with the at least one peripheral device interface; and
   an openable cover of the housing, wherein the openable cover is normally in a closed position and when the openable cover is in an open position a user selectable assist mode is selected,
   wherein the assistance device is configured to:
      receive, when the openable cover is in the open position, a first wireless transmission from a peripheral device comprising a sensor-transmitter at the at least one peripheral device interface, and
      upon receiving the first wireless transmission, process the first wireless transmission at the processor and transmit subsequent wireless transmissions on behalf of the sensor-transmitter and for receipt by an external control panel of the security system.

2. The assistance device of claim 1, wherein the subsequent wireless transmissions have a predefined characteristic that causes a configuration process to be performed with respect to the sensor-transmitter at the external control panel.

3. The assistance device of claim 2, wherein the first wireless transmission received at the at least one peripheral device interface is a special transmission predefined in a configuration process for the sensor-transmitter.

4. The assistance device of claim 1, wherein the processor is further configured to translate the data packets received from the one or more peripheral devices.

5. The assistance device of claim 4, wherein the processor translates the data packets using a firmware module.

6. The assistance device of claim 4, wherein the processor is further configured to generate transmissions to be received at an external control panel of the security system.

7. The assistance device of claim 1, the assistance device further comprising a memory configured to store state information of the one or more peripheral devices received at the at least one peripheral device interface.

8. The assistance device of claim 7, wherein the at least one peripheral device interface is further configured to receive wireless communications, wherein the assistance device is configured to:
   determine, using the stored state information in the memory and the received wireless communications at the at least one peripheral device interface, a change in the stored state information for a sensor-transmitter of the one or more peripheral devices; and
   generate, at the processor, a transmission to an external control panel of the security system, the transmission induced by the change in state of a sensor associated with the sensor-transmitter.

9. An assistance device for use with a security system, the assistance device comprising:
   a housing;
   at least one peripheral device interface configured to wirelessly communicate with one or more peripheral devices, the at least one peripheral device interface positioned within the housing;
   a processor configured to process data packets received at the at least one peripheral device interface from the one or more peripheral devices, the processor positioned within the housing and in communication with the at least one peripheral device interface; and
   an openable cover of the housing, wherein the openable cover is normally in a closed position and when the openable cover is in an open position a user selectable assist mode is selected,
   wherein the assistance device is further configured to enroll a sensor-transmitter with the security system when the openable cover is in the open position and the user selectable assist mode is selected.

10. The assistance device of claim 9, wherein the assistance device is configured to enroll the sensor-transmitter by:
   receiving, at the at least one peripheral device interface, a first wireless transmission from the sensor-transmitter, the first wireless transmission received when the openable cover is in the open position; and
   generating, at the processor, a second wireless transmission to an external control panel of the security system to trigger enrollment protocols of the external control panel.

11. The assistance device of claim 10, wherein the assistance device is further configured to translate the first wireless transmission from the sensor-transmitter at the processor prior to generating the second wireless transmission.

12. The assistance device of claim 11, wherein the first wireless transmission received at the at least one peripheral device interface is a special transmission predefined in a configuration process of the sensor-transmitter.

13. The assistance device of claim 10, wherein the assistance device is further configured to:
   determine whether the sensor-transmitter is a last sensor-transmitter to be enrolled with the external control panel of the security system.

14. The assistance device of claim 13, wherein upon determining that the sensor-transmitter is the last sensor-transmitter to be enrolled with the external control panel of the security system, the assistance device is configured to:
   exit from the user selectable assist mode.

15. The assistance device of claim 13, wherein upon determining that the sensor-transmitter is not the last sensor-transmitter to be enrolled with the external control panel of the security system, the assistance device is configured to
   receive, at the at least one peripheral device interface, a third wireless transmission from a second sensor-transmitter;
   translate, at the processor, the third wireless transmission from the second sensor-transmitter; and generate, at the processor, a fourth wireless transmission to the external control panel of the security system to trigger enrollment protocols of the external control panel.

16. The assistance device of claim 10, wherein different protocols are used in the assistance device for receiving first wireless transmissions at the at least one peripheral device interface and transmitting second wireless transmissions from the assistance device.

17. The assistance device of claim 16, wherein the received first wireless transmission is a special wireless transmission predefined in a configuration process for the sensor-transmitter.

18. The assistance device of claim 16, wherein a transmission protocol used by the assistance device in transmitting wireless transmissions to the external control panel is in an on-off sequence predefined to enroll the sensor-transmitter.

19. The assistance device of claim 16, wherein the received first wireless transmission is a transmission induced by a change in state of a sensor associated with the sensor-transmitter.

* * * * *